United States Patent [19]

Andersen et al.

[11] Patent Number: 5,714,217
[45] Date of Patent: *Feb. 3, 1998

[54] SEALABLE LIQUID-TIGHT CONTAINERS COMPRISED OF COATED HYDRAULICALLY SETTABLE MATERIALS

[75] Inventors: Just Andersen; Simon K. Hodson, both of Santa Barbara, Calif.

[73] Assignee: E. Khashoggi Industries, Santa Barbara, Calif.

[*] Notice: The term of this patent shall not extend beyond the expiration date of Pat. No. 5,514,430.

[21] Appl. No.: 478,364

[22] Filed: Jun. 7, 1995

Related U.S. Application Data

[60] Division of Ser. No. 105,851, Aug. 10, 1993, abandoned, which is a continuation-in-part of Ser. No. 19,151, Feb. 17, 1993, Pat. No. 5,453,310, and a continuation-in-part of Ser. No. 95,662, Jul. 21, 1993, Pat. No. 5,385,764.

[51] Int. Cl.$^6$ .............................. B32B 13/02; C04B 14/00
[52] U.S. Cl. .................. 428/34.5; 428/34.7; 428/35.4; 428/36.5; 428/36.6; 428/312.4; 428/319.3; 428/703; 206/449; 206/524.3; 206/524.6; 206/524.7
[58] Field of Search ..................... 428/34.4, 34.5, 428/34.7, 35.4, 36.5, 36.6, 312.4, 319.3, 703; 106/400, 638; 206/449, 524.3, 524.6, 524.7

[56] References Cited

U.S. PATENT DOCUMENTS

| | | |
|---|---|---|
| 109,669 | 11/1870 | Rowland . |
| 128,980 | 7/1872 | Rowland . |
| 591,168 | 10/1897 | Heinzerling . |
| 882,538 | 3/1908 | Sargent . |
| 1,223,834 | 4/1917 | Sanger . |
| 1,234,692 | 7/1917 | Poznanski . |
| 1,427,103 | 8/1922 | Haenicke et al. . |
| 1,874,974 | 8/1932 | Hammenecker . |
| 1,932,150 | 10/1933 | Tada . |
| 1,954,117 | 4/1934 | Caldwell . |
| 1,965,538 | 7/1934 | Stewart . |
| 2,045,099 | 6/1936 | Pond . |

(List continued on next page.)

FOREIGN PATENT DOCUMENTS

| | | |
|---|---|---|
| 0263723 A2 | 4/1988 | European Pat. Off. . |
| 0290007 A1 | 11/1988 | European Pat. Off. . |
| 0340707 A2 | 11/1989 | European Pat. Off. . |
| 0340765 A2 | 11/1989 | European Pat. Off. . |
| 0497151 A1 | 8/1992 | European Pat. Off. . |

(List continued on next page.)

OTHER PUBLICATIONS

Alexanderson, Self–Smoothing Floors Based on Polymer Cement Concrete, Concrete International (Jan. 1990).
Andersen, *Control and Monitoring of Concrete Production–A Study of Particle Packing and Rheology,* The Danish Academy of Technical Sciences (1990).

(List continued on next page.)

*Primary Examiner*—Marion E. McCamish
*Assistant Examiner*—Blaine R. Copenheaver
*Attorney, Agent, or Firm*—Workman, Nydegger & Seeley

[57] ABSTRACT

Sealable liquid-tight containers and methods for economically manufacturing such containers for storing and dispensing substances and any other purposes for which conventional sealable liquid-tight containers are utilized. The containers are readily and economically formed from mixtures of hydraulically settable binders such as hydraulic cement, gypsum and clay with water. Appropriate additives can also be added to the mixture which impart desired characteristics and properties to both the mixture and the hardened containers. The mixtures can be utilized to form containers by various methods. One method involves forming the containers without substantial mixing of the mixture, compacting the mixture and hydrating the mixture. Other methods involve molding the mixture, extruding the mixture and forming sheets from the mixture to be converted into containers. The components may also be dried, coated, lined, laminated and/or receive printing.

67 Claims, 9 Drawing Sheets

U.S. PATENT DOCUMENTS

| | | |
|---|---|---|
| 2,170,102 | 8/1939 | Thompson . |
| 2,205,735 | 6/1940 | Scherer, Jr. . |
| 2,307,629 | 1/1943 | MacIldowie . |
| 2,432,971 | 12/1947 | Ruthman et al. . |
| 2,496,895 | 2/1950 | Staley . |
| 2,549,507 | 4/1951 | Morgan et al. . |
| 2,629,667 | 2/1953 | Kaveler et al. . |
| 2,700,615 | 1/1955 | Heijmer et al. . |
| 2,793,957 | 5/1957 | Mangold et al. . |
| 2,820,713 | 1/1958 | Wagner . |
| 2,837,435 | 6/1958 | Miller et al. . |
| 2,917,778 | 12/1959 | Lyon, Jr, et al. . |
| 2,959,489 | 11/1960 | Wagner . |
| 3,006,615 | 10/1961 | Mason, Jr. . |
| 3,027,266 | 3/1962 | Wikne . |
| 3,030,258 | 4/1962 | Wagner . |
| 3,042,578 | 7/1962 | Denning . |
| 3,149,986 | 9/1964 | Zelmanoff . |
| 3,169,877 | 2/1965 | Bartoli et al. . |
| 3,215,549 | 11/1965 | Ericson . |
| 3,305,613 | 2/1967 | Spence . |
| 3,306,961 | 2/1967 | Spence . |
| 3,356,779 | 12/1967 | Schulze . |
| 3,393,261 | 7/1968 | Herzig et al. . |
| 3,432,317 | 3/1969 | Kelly et al. . |
| 3,468,993 | 9/1969 | Bierlich . |
| 3,470,005 | 9/1969 | Flachsenberg et al. . |
| 3,492,385 | 1/1970 | Simunic . |
| 3,520,707 | 7/1970 | Steinberg et al. . |
| 3,526,172 | 9/1970 | Stuart . |
| 3,579,366 | 5/1971 | Rehmar . |
| 3,683,760 | 8/1972 | Silva . |
| 3,689,294 | 9/1972 | Brannauer . |
| 3,697,366 | 10/1972 | Harlock et al. . |
| 3,745,891 | 7/1973 | Bodendoerfer . |
| 3,753,749 | 8/1973 | Nutt . |
| 3,754,954 | 8/1973 | Gabriel et al. . |
| 3,759,729 | 9/1973 | Fahn . |
| 3,770,859 | 11/1973 | Bevan . |
| 3,806,571 | 4/1974 | Ronnmark et al. . |
| 3,819,389 | 6/1974 | Uchikawa et al. . |
| 3,824,107 | 7/1974 | Weiant . |
| 3,827,895 | 8/1974 | Copeland . |
| 3,841,885 | 10/1974 | Jakel . |
| 3,855,908 | 12/1974 | Schmidt et al. . |
| 3,857,715 | 12/1974 | Humphrey . |
| 3,902,912 | 9/1975 | Wolf . |
| 3,904,341 | 9/1975 | Putti . |
| 3,908,523 | 9/1975 | Shikaya . |
| 3,914,359 | 10/1975 | Bevan . |
| 3,917,781 | 11/1975 | Gabriel et al. . |
| 3,927,163 | 12/1975 | Gabriel et al. . |
| 3,954,490 | 5/1976 | Cockram . |
| 3,989,534 | 11/1976 | Plunguian et al. . |
| 4,002,482 | 1/1977 | Coenen . |
| 4,017,321 | 4/1977 | Reighter . |
| 4,017,324 | 4/1977 | Eggers . |
| 4,028,454 | 6/1977 | Davidovits et al. . |
| 4,040,851 | 8/1977 | Ziegler . |
| 4,046,584 | 9/1977 | Snyder et al. . |
| 4,053,346 | 10/1977 | Amberg et al. . |
| 4,070,199 | 1/1978 | Downing et al. . |
| 4,070,953 | 1/1978 | Richards et al. . |
| 4,072,549 | 2/1978 | Amberg et al. . |
| 4,073,658 | 2/1978 | Ohtani et al. . |
| 4,077,809 | 3/1978 | Plunguian et al. . |
| 4,084,980 | 4/1978 | Motoki . |
| 4,093,690 | 6/1978 | Murray . |
| 4,117,059 | 9/1978 | Murray . |
| 4,117,060 | 9/1978 | Murray . |
| 4,121,402 | 10/1978 | Cress et al. . |
| 4,132,555 | 1/1979 | Barrable . |
| 4,133,619 | 1/1979 | Wise . |
| 4,135,940 | 1/1979 | Peltier . |
| 4,157,998 | 6/1979 | Berntsson et al. . |
| 4,158,989 | 6/1979 | Barr . |
| 4,159,302 | 6/1979 | Greve et al. . |
| 4,185,923 | 1/1980 | Bouette et al. . |
| 4,187,768 | 2/1980 | Suzuki . |
| 4,188,231 | 2/1980 | Valore . |
| 4,190,454 | 2/1980 | Yamagisi et al. . |
| 4,196,161 | 4/1980 | Toffolom et al. . |
| 4,202,857 | 5/1980 | Lowe . |
| 4,209,336 | 6/1980 | Previte . |
| 4,225,247 | 9/1980 | Hodson . |
| 4,225,357 | 9/1980 | Hodson . |
| 4,230,502 | 10/1980 | Lustig et al. . |
| 4,233,080 | 11/1980 | Koeppel . |
| 4,233,368 | 11/1980 | Baehr et al. . |
| 4,234,344 | 11/1980 | Tinsley et al. . |
| 4,239,716 | 12/1980 | Ishida et al. . |
| 4,257,814 | 3/1981 | Kellet et al. . |
| 4,261,754 | 4/1981 | Krenchel et al. . |
| 4,264,367 | 4/1981 | Schutz . |
| 4,264,368 | 4/1981 | Schutz . |
| 4,272,198 | 6/1981 | Velikov et al. . |
| 4,279,695 | 7/1981 | Winterbottom . |
| 4,287,247 | 9/1981 | Reil et al. . |
| 4,299,790 | 11/1981 | Greenberg . |
| 4,305,758 | 12/1981 | Powers et al. . |
| 4,310,996 | 1/1982 | Mulvey et al. . |
| 4,326,891 | 4/1982 | Sadler . |
| 4,353,746 | 10/1982 | Birchall et al. ............... 106/89 |
| 4,353,747 | 10/1982 | Birchall et al. ............... 106/89 |
| 4,353,748 | 10/1982 | Birchall et al. ............... 106/89 |
| 4,362,679 | 12/1982 | Malinowski . |
| 4,367,860 | 1/1983 | Harper et al. . |
| 4,370,166 | 1/1983 | Powers et al. . |
| 4,373,957 | 2/1983 | Pedersen . |
| 4,377,440 | 3/1983 | Gasland . |
| 4,383,862 | 5/1983 | Dyson . |
| 4,406,703 | 9/1983 | Guthrie et al. . |
| 4,410,366 | 10/1983 | Birchall et al. ............... 106/90 |
| 4,415,366 | 11/1983 | Copening . |
| 4,427,610 | 1/1984 | Murray . |
| 4,428,741 | 1/1984 | Westphal . |
| 4,428,775 | 1/1984 | Johnsion et al. . |
| 4,444,593 | 4/1984 | Schutz . |
| 4,452,596 | 6/1984 | Clauss et al. . |
| 4,460,348 | 7/1984 | Iioka et al. . |
| 4,462,835 | 7/1984 | Car . |
| 4,481,037 | 11/1984 | Beale et al. . |
| 4,490,130 | 12/1984 | Konzal et al. . |
| 4,497,662 | 2/1985 | Chisholm et al. . |
| 4,504,315 | 3/1985 | Allemann et al. . |
| 4,508,595 | 4/1985 | Gasland . |
| 4,522,772 | 6/1985 | Bevan . |
| 4,524,828 | 6/1985 | Sabins et al. . |
| 4,529,663 | 7/1985 | Lancaster et al. . |
| 4,533,393 | 8/1985 | Neuschaeffer et al. . |
| 4,536,173 | 8/1985 | Puls . |
| 4,552,463 | 11/1985 | Hodson . |
| 4,571,233 | 2/1986 | Konzal . |
| 4,581,003 | 4/1986 | Ito et al. . |
| 4,585,486 | 4/1986 | Fujita et al. . |
| 4,588,443 | 5/1986 | Bache . |
| 4,613,627 | 9/1986 | Sherman et al. ............... 521/61 |
| 4,619,636 | 10/1986 | Bogren . |
| 4,621,763 | 11/1986 | Brauner . |
| 4,622,026 | 11/1986 | Ito et al. . |
| 4,623,150 | 11/1986 | Moehlman et al. . |
| 4,636,345 | 1/1987 | Jensen et al. . |

| | | |
|---|---|---|
| 4,640,715 | 2/1987 | Heitzmann et al. |
| 4,642,137 | 2/1987 | Heitzmann et al. |
| 4,650,523 | 3/1987 | Kikuchi et al. |
| 4,655,981 | 4/1987 | Nielsen et al. |
| 4,680,023 | 7/1987 | Varano |
| 4,707,187 | 11/1987 | Tsuda et al. |
| 4,746,481 | 5/1988 | Schmidt |
| 4,754,589 | 7/1988 | Leth |
| 4,755,494 | 7/1988 | Ruben |
| 4,772,439 | 9/1988 | Trevino-Gonzalez |
| 4,784,693 | 11/1988 | Kirkland et al. |
| 4,786,670 | 11/1988 | Tracy et al. |
| 4,789,244 | 12/1988 | Dunton et al. |
| 4,797,161 | 1/1989 | Kirchmayr et al. |
| 4,799,961 | 1/1989 | Friberg |
| 4,836,940 | 6/1989 | Alexander |
| 4,840,672 | 6/1989 | Baes |
| 4,842,649 | 6/1989 | Heitzman et al. |
| 4,872,913 | 10/1989 | Dunton et al. |
| 4,888,059 | 12/1989 | Yamaguchi et al. |
| 4,889,428 | 12/1989 | Hodson |
| 4,892,589 | 1/1990 | Kirkland et al. |
| 4,895,598 | 1/1990 | Hedberg et al. |
| 4,912,069 | 3/1990 | Ruben |
| 4,923,665 | 5/1990 | Andersen et al. |
| 4,927,043 | 5/1990 | Vanderlaan |
| 4,927,573 | 5/1990 | Alpár et al. |
| 4,939,192 | 7/1990 | t'Sas |
| 4,944,595 | 7/1990 | Hodson |
| 4,948,429 | 8/1990 | Arfaei |
| 4,976,131 | 12/1990 | Grims et al. |
| 4,979,992 | 12/1990 | Bache |
| 4,985,119 | 1/1991 | Vinson et al. |
| 4,999,056 | 3/1991 | Rasmussen |
| 5,018,379 | 5/1991 | Shirai et al. |
| 5,021,093 | 6/1991 | Beshay |
| 5,030,282 | 7/1991 | Matsuhashi et al. |
| 5,039,003 | 8/1991 | Gordon et al. |
| 5,039,560 | 8/1991 | Durgin et al. |
| 5,047,086 | 9/1991 | Hayakawa et al. |
| 5,051,217 | 9/1991 | Alpár et al. |
| 5,085,366 | 2/1992 | Durgin et al. |
| 5,089,198 | 2/1992 | Leach |
| 5,102,596 | 4/1992 | Lempfer et al. |
| 5,106,423 | 4/1992 | Clarke |
| 5,106,880 | 4/1992 | Miller et al. |
| 5,108,677 | 4/1992 | Ayres |
| 5,108,679 | 4/1992 | Rirsch et al. |
| 5,141,771 | 8/1992 | Wada |
| 5,154,771 | 10/1992 | Wada et al. |
| 5,167,894 | 12/1992 | Baumgarten |
| 5,169,566 | 12/1992 | Stucky et al. |
| 5,184,995 | 2/1993 | Kuchenbecker |
| 5,232,496 | 8/1993 | Jennings et al. |
| 5,269,845 | 12/1993 | Grunau et al. |
| 5,290,355 | 3/1994 | Jakel |
| 5,385,764 | 1/1995 | Andersen et al. ........ 428/34.4 |
| 5,453,310 | 9/1995 | Andersen et al. ........ 428/34.4 |

FOREIGN PATENT DOCUMENTS

| | | |
|---|---|---|
| 2841172 | 9/1978 | Germany |
| 3011330 | 3/1980 | Germany |
| 47-20190 | 9/1972 | Japan |
| 51-2729 | 1/1976 | Japan |
| 53-16730 | 2/1978 | Japan |
| 54-31320 | 3/1979 | Japan |
| 54-48821 | 4/1979 | Japan |
| 55-37407 | 3/1980 | Japan |
| 55-100256 | 7/1980 | Japan |
| 56-17965 | 2/1981 | Japan |
| 58-120555 | 7/1983 | Japan |
| 62-36055 | 8/1985 | Japan |
| 62-36056 | 8/1985 | Japan |
| 60-260484 | 12/1985 | Japan |
| 60-264375 | 12/1985 | Japan |
| 62-253407 | 4/1986 | Japan |
| 62-39204 | 2/1987 | Japan |
| 62-46941 | 2/1987 | Japan |
| 62-151304 | 7/1987 | Japan |
| 63-129079 | 1/1988 | Japan |
| 63-123851 | 5/1988 | Japan |
| 63-210082 | 8/1988 | Japan |
| 63-218589 | 9/1988 | Japan |
| 63-248759 | 10/1988 | Japan |
| 63-310780 | 12/1988 | Japan |
| 64-37478 | 2/1989 | Japan |
| 2-51460 | 2/1990 | Japan |
| 2-141484 | 5/1990 | Japan |
| 2-190304 | 7/1990 | Japan |
| 3-80141 | 4/1991 | Japan |
| 3-153551 | 7/1991 | Japan |
| 3-187962 | 8/1991 | Japan |
| 3-202310 | 9/1991 | Japan |
| 3-202313 | 9/1991 | Japan |
| 3-208847 | 9/1991 | Japan |
| 4-70304 | 3/1992 | Japan |
| 453555 | 1/1936 | United Kingdom |
| 490820 | 8/1938 | United Kingdom |
| 206748 | 5/1982 | United Kingdom |
| 219392 A | 1/1988 | United Kingdom |
| 2 220 934 | 1/1990 | United Kingdom |
| WO 87/00828 | 2/1987 | WIPO |
| WO 91/12186 | 8/1991 | WIPO |

OTHER PUBLICATIONS

Andersen, *Effect of Oganic Superplasticizing Admixtures and Their Components on Zeta Potential and Related Properties of Cement Materials*, Master of Science thesis, Pennsylvania State University (1987).

Andersen, *Effects of W/C–Ratio and Dispersion on the Pore Size Distribution of Cement Paste and Concrete*, Paper prepared for MRL by Per Just Anderson (Aug. 1988).

Andersen, *Rheology of Cement Paste, Mortar and Concrete* (Undated).

Andersen, et at, *Tailoring of Cement–Bound Materials By the Use of Packing and Rheological Models*, American Ceramic Society (1988).

Andersen, *Tailoring of Concrete Materials*, R&H Annual Review (1988).

Attwood, *Paperboard*, in Wiley Encyclopedia of Packaging Technology, 500–506 (Marilyn Bakker ed., 1986).

Ashby, *Minerals Selection in Engineering Design*, Indian Journal of Technology, vol. 28 (Jun.–Aug. 1990).

Ashby, *Overview No. 80: On the Engineering Properties of Materials*, Acta Metall. vol. 3, No. 5, 1273–1293 (1989).

Bach, *Cement–Based Products Processed the Plastics Way.* (no date).

Bache, *Densified Cement/Ultra–Fine Particle–Based Materials*, Presented at the Second International Conference on Superplasticizers in Concrete, in Ottawa, Canada (Jun. 10–12, 1981).

Bajza, *On The Factors Influencing the Strength of Cement Compacts*, Cement and Concrete Research, vol. 2, 67–78 (1972).

Fordos, *Natural or Modified Cellulose Fibres as Reinforcement in Cement Composites*, Concrete Technology & Design vol. 5, Natural Fiber Reinforced Cement and Concrete(1988).

Green, *Developments in Soft Drinks Technology–1*, 143–170 (1978).

Greminger, Jr. et al., *Alkyl and Hydroxyalkylalkylcellulose*, Dow Chemical U.S.A., Midland, Oregon (no date).

Griff, *Carbonated Beverage Packaging*, in *The Wiley Encylopedia of Packaging Technology*, 121–124 (Marilyn Bakker ed., 1986).

Griff, *Cans, Plastic*, in *The Wiley Encylopedia of Packaging Technology*, 108–109 (Marilyn Bakker ed., 1986).

Hambley, *Glass Container Design*, in *The Wiley Encyclopedia of Packaging Technology*, 370–374 (Marilyn Bakker ed., 1986).

Hanlon, *Handbook of Package Engineering*, 7–1 to 7–15 (2d ed. 1984).

Hewlett, *Physico–Chemical Mechanisms of Admixtures Lecture*, CGLI Advanced Concrete Technology Course, Cement and Concrete Association Training Centre (1975).

Hlavac, *The Techology of Ceramics*, Glass Science and Technology, 4: The Technology of Glass and Ceramics, Elsevier Publishing (1983).

Hotchkiss, *Canning Food*, in *The Wiley Encyclopedia of Packaging Technology*, 86–91 (Marilyn Bakker ed.,1986).

Iler, *The Chemistry of Silica*, The Chemistry of Silica: Solubility, Polymerization, Colloid and Surface Properties . . . , John Wiley & Sons, 1979.

Johansen, et al., *Particle Packing and Concrete Properties*, Materials Science of Concrete II, 111–147 (no date).

Jones, et at, *Raw Materials Processing*, Ceramics: Industrial Processing and Testing, Iowa State University Press (1972).

Kline, *Packaging in Paper and Paperboard: Manufacturing and Converting Fundamentals*, 196–211 (2d ed. 1991).

Knab, et al., *Effects of Maximum Void Size and Aggregate Characteristics on the Strength of Mortar*, Cement and Concrete Research. vol. 13, 383–390 (1983).

Kohn et al, *Cans Fabrication*, in *The Wiley Encyclopedia of Packaging Technology*, 100–108 (Marilyn Bakker ed., 1986).

Lavin, *Cans Composite, Self–manufactured*, in *The Wiley Encyclopedia of Packaging Technology*, 98–100 (Marilyn Bakker ed., 1986).

Balaguru, et al., *Flexural Behavior of Slurry Infiltrated Fiber Concrete (SIFCON) Made Using Condensed Silica Fume* (no date).

Baum, et al., *Paper in Kirk–Othmer Concise Encyclopedia of Chemical Technology*, 834–836 (Martin Grayson ed., 1985).

Benbow, et al., *The Extrusion Mechanics of Pastes–The Influence of Paste Formulation on Extrusion Parameters*, Chemical Engineering Science, vol. 42, No. 9, 2151–2162 (1987).

Berger, et al., *Acceleration of Hydralion of Calcium Silicates by Carbon Dioxide Treatment*, Nature Physical Science, vol. 240 (Nov. 6, 1972).

Blaha, *Ideas in Concrete*, Concrete Products (Sep. 1992).

Brady, et al., *Materials Handbook*, 588–594 (1991).

Brown, et al., *An Investigation of a High Speed Shear Mixer on Selected Pastes and Mortars*, Mat. Res. Soc. Symp. Proc vol. 137 (1989).

Bukowski, et al., *Reactivity and Strength Development of $CO_2$ Activated Non–Hydraulic Calcium Silicates*, Cement and Concrete Research, vol. 9, 57–68 (1979).

Clauson–Kaas, *Ekstrudering afFiberbeton–delrapport*, Byggeteknik, Teknologisk Institut (no date).

*English Translation:* Clauson–Kaas, *Extrusion of Fiber Concrete–Interim Report*, Department of Building Technology, Technological Institute of Denmark.

Clauson–Kass, *Opsprojtet Glasfiberton i Byggeriet* (1987) (no date).

Collepardi, et al., *Influence of Polymerization of Sulfonated Naphthalene Condenate and its Interaction with Cement* (no date).

Davidson, et al., *Water–Soluble Resins*, New York: Reinhold Publishing Corp., Chapman & Hall, Ltd., London (no date).

Dow Plastics, *Thermoforming Process Guide* (no date).

Eriksen et al., *Foam Stability Experiments on Solutions Containing Superplasticizing and Air–entraining Agents for Concrete*, The Technological Institute, Department of Building Technology, Taastrup, Denmark (no date).

Eubanks, *Cans, Composite*, in *The Wiley Encyclopedia of Packaging Technology*, 94–98 (Marilyn Bakker ed., 1986).

Ferretti, *Distributed Reinforcement Concrete Pipes: An Innovative Product*, MRS, 44 48 (May 1993).

Lawrence, *The Properties of Cement Paste Compacted Under High Pressure: Research Report 19*, Cement and Concrete Association Research Report 19 (Jun. 1969).

Lecznar, et al., *Strength of Neat Cement Pastes Molded Under Pressure*, Journal of the American Concrete Institute Concrete Briefs (Feb. 1961).

Lewis, et al., *Microstructure Property Relationships in Macro–Defect–Free Cement*, MRS Bulletin (Mar. 1993).

Lewis, Sr., *Condensed Chemical Dictionary*, 870 (12th ed. 1993).

Litvan, et al., *Particulate Admixture for Enhanced Freeze–Thaw Resistance of Concrete*, Cement and Concrete Research, vol. 8, 53–60, Pergamon Press, Inc. (1978).

Manson, et al., *Use of Polymers in Highway Concrete*, National Cooperative Highway Research Program Report 190 (1978).

Maries, *The Activation of Portland Cement by Carbon Dioxide* (no date).

Maycock, et al., *Carbonation of Hydrated Calcium Silicates*, Cement and Concrete Research, vol. 4, 69–76(1974).

Miyake, et al., Sakai, *Superplasticized Concrete Using Refined Lignosulfate and its Action Mechanism*, Cement and Concrete Research, vol. 15 (1985).

Naaman, et al., *Tensile Stress–Strain Properties of SIFCON*, ACI Materials Journal (May–Jun. 1989).

Nain et al., *Closures, Bottle and Jar*, in *The Wiley Encyclopedia of Packaging Technology*, 172–185 (Marilyn Bakker ed., 1986).

Nieder, *Cans, Aluminum*, in *The Wiley Encyclopedia of Packaging Technology*, 93–94 (Marilyn Bakker ed., 1986).

Niel, *Supplementary Paper II–117. The Influence of Alkali––Carbonate on the Hydration of Cement* (1968).

Odler, et al., *Hardened Portland Cement Pastes of Low Porosity. IV. Surface Area and Pore Structure*, Cement and Concrete Research, vol 2, pp. 577–589, 1972.

Ono, *Modern Design And Treatment Of Bottles Used For Carbonated Drinks*, Developments In Soft Drinks Technology–3, Elsevier Applied Science Publishers, London and New York, 1984.

Philips, et al., *Carbonated Beverage Packaging*, Beverages: Carbonated And Noncarbonated, Revised Editon, AVI Publishing Company, Westport, Conn, 1981.

Strabo, et al., *Fiberbeton Teknologi*, Teknologisk Institut, Byggeteknik TR–Projekt 133/117–82.042 (1986).

English Tranlation–Strabo, et al., *Fiber Concrete Technology*, Technological Institute of Denmark, Department of Building Technology, TR–Project 133/117–82.042 (1986).

Strabo, et al., *Nye Formbivningsmetoder til Fiberbeton*, Teknologisk Institut, Byggeteknik, TR-Projekt 1984-133/117-84.028 (Apr. 1987).

*English Translation*–Strabo, et al, *New Design Methods for Fiber Concrete*, Technological Institute of Denmark, Department of Building Technology, TR-Project 1984-133/117-84.028 (Apr. 1987).

Studt, *New Advances Revive Interest In Cement-based Materials*, R&D Magazine (Nov. 1992).

Sun, et al., *The Composition of Hydrated DSP Cement Paste* (no date).

Suzuki, et al., *Formation and Carbonation of C-S-H In Water*, Cement and Concrete Research, vol. 15, 213-224 (1985).

Unwalla, et al., editors, *Recycled Materials for Making Concrete*, The Indian Concrete Journal, vol. 53, No. 9 (Sep. 1979).

Verbeck, *Carbonation of Hydrated Portland Cement*, Cement and Concrete Special Technical Publication No. 203 (1958).

Vrana, *Khashoggi kin Reported Planning Private Placement of Shares in New Container Firm*, (Mar. 28, 1993).

Wagner, *Polymer Modification of Portland Cement Systems*, Chemtech (Feb. 1973).

Weiss, et al., *High Tensile Cement Pastes as a Low-Energy Substitute for Metals, Plastics, Ceramics, and Wood. Phase 1: Preliminary Technological Evaluation*, CTL Project CR7851-4330, Final Report, Prepared for U.S. Dept. of Energy (Nov. 1984).

Westman, *The Packing of Particles*, 1930.

Young, *Research on Cement-Based Materials: Expanding Our Horizons*, MRS Bulletin, (Mar. 1993).

Young et al., *Introduction to MDF Cement Composites*, ACBM vol. 1, No. 2 (Fall 1989).

Yudenfreund, et al., *Hardened Portland Cement Pastes of Low Porosity. II. Exploratory Studies. Dimensional Changes*, Cement and Concrete Research, vol. 2, 331-348 (1972).

Zukowski, et al., *Rheology of Cementitious Systems*, MRS Bulletin (Mar. 1993).

Purton, *The Effect of Sand Grading on the Calcium Silicate Brick Reaction*, Cement and Concrete Research vol 4, 13-29 (1974).

Putnam, et al., *Papermaking Additives*, in Kirk-Othmer Concise Encyclopedia of Chemical Technology, 836-837 (Martin Grayson ed, 1985).

Radek, *Closure Liners*, in The Wiley Encyclopedia of Packaging Technology, 171-172 (Marilyn Bakker ed., 1986).

Reingold, *Cans, Steel*, The Wiley Encyclopedia Packaging Technology, 109-118 (Marilyn Bakker ed.) 1986.

Robinson, *Extrusion Defects* (Undated).

Rosenberg et al., *A New Mineral Admixture for High-Strength Concrete-Proposed Mechanism for Strength Enhancement*, Second International Conference on the Use of Fly Ash, Silica Fume, Slag and Natural Pozzolans in Concrete (Apr. 21-25, 1986).

Roy, *New Strong Cement Materials: Chemically Bonded Ceramics*, Science, vol. 235, 6 (Feb. 1987).

Roy, et al., *Processing of Optimized Cements and concretes via Particle Packing*, MRS Bulletin (Mar. 1993).

Roy, et al., *Very High Strength Cement Pastes Prepared by Hot Pressing and Other High Pressure Techniques*, Cement and Concrete Research, vol. 2, 349-366 (1972).

Sikora, *Paper*, The Wiley Encyclopedia of Packaging Technology, 497-500 (Marilyn Bakker ed., 1986).

Skalny, et al., *Low Water to Cement Ratio Concretes*, Cement, and Concrete Research, vol. 3, 29-40 (1973).

Skalny, et al., *Properties of Cement Pastes Prepared by High Pressure Compaction*, ACI Journal, Mar. (1970).

Soroushian, et al., *Recycling of Wood and Paper in Cementitious Materials*, Mat. Res. Soc. Sypm. Proc., vol. 266(1992).

Stix, *Concrete Solutions*, Scientific American (Apr. 1993).

Strabo, et al., *Cementbaserede Hybridkompositte*, Teknologisk Institut, Byggeteknik, TR-Projekt 1985-133/177-85.533 (1987).

*English Translation*–Strabo, et al., *Cement-Based Hybrid Composites*, Technological Institute of Denmark, Department of Building Technology, TR-Project 1985-133/177-85.533 (1987).

Strabo, et al., *Ekstrudering af Fiberbeton*, Teknologisk Institut, Byggeteknik, TR-Projekt 1985-133/177-85.538 (Oct. 1987).

*Cementing the Future*, ACBM, vol. 6, No. 1 (Spring 1994).

*The Coating Process for Paper* (1993).

*The Colcrete Process*, Undated Publication.

*Fiberbeton-nyt*, Teknologisk Institut, Byggeteknik, Blad nr. 1 (Oktober 1987).

*English Translation-Fiber Concrete News*, The Technological Institute of Denmark, Department of Building Technology, Pamphlet No. 1 (Oct. 1987).

*Materials*, Modern Packaging and Planning Guide, Second Edition, (1972).

*Modern Packaging Encyclopedia and Planning Guide*, 127-192 (Sidney Gross et al. eds., 2d ed. 1972).

*Nye Metoder I Beton Kan Betyde Teknisk Knock-Out for Plast*, Ingenioren, Saertryk fra nr. 14/86 (1986).

*English Translation-New Method for Concrete May Mean Technical Knock-Out for Plastic*, The Engineer, No. 14 (1986).

*Plastic-Forming Processes* (no date).

*Report of the Panel on Solids Processing* (no date).

*Rigid And Semirigid Containers: Introduction To Paperboard Containers*, Modern Packaging Encyclopedia and Planning Guide, Second Edition, (1972).

*Zien In The Food Industry*, Freeman Industries, Inc. (no date).

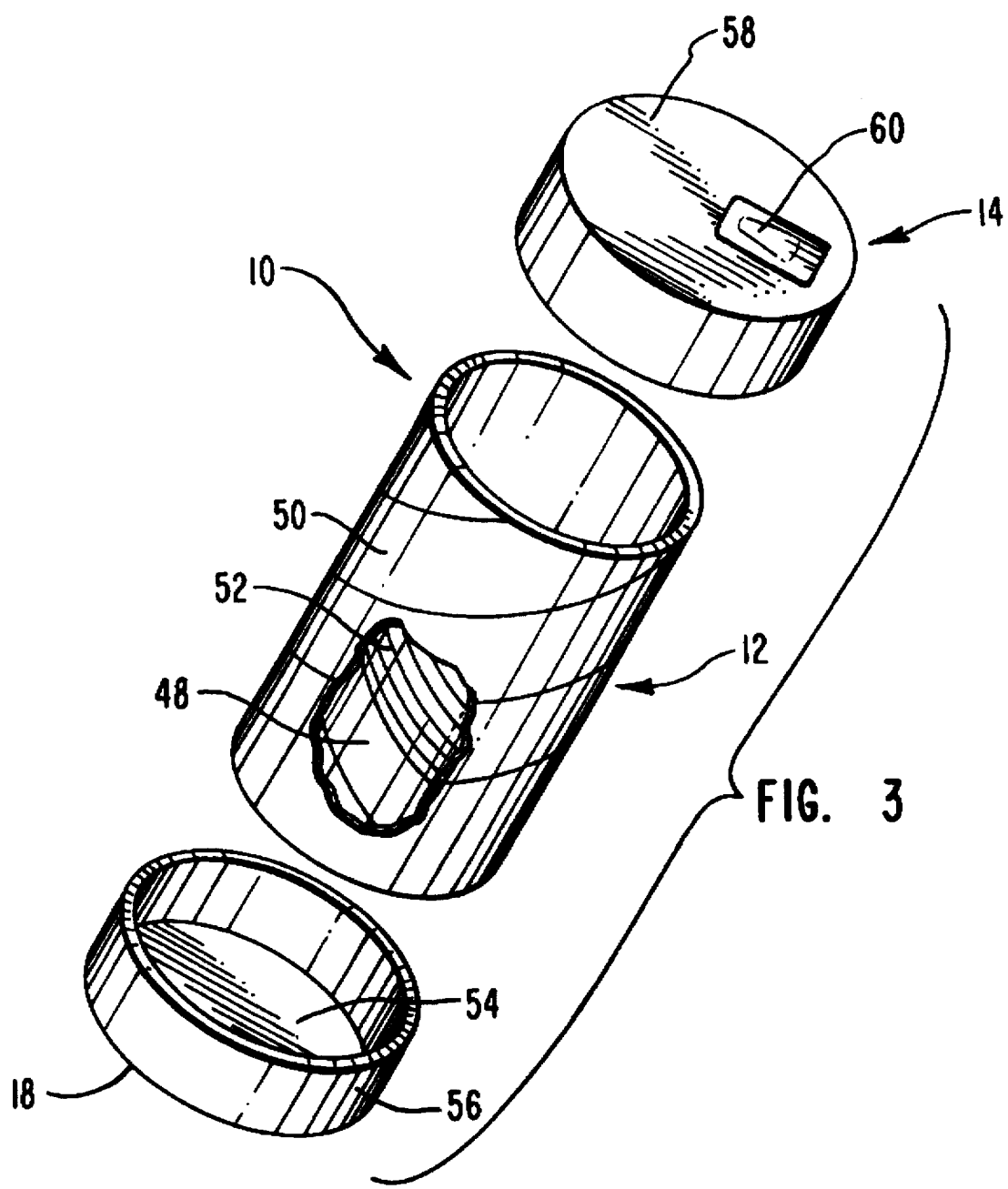

SEALABLE LIQUID-TIGHT CONTAINERS COMPRISED OF COATED HYDRAULICALLY SETTABLE MATERIALS

This application is a divisional of U.S. Ser. No. 08/105,851, filed Aug. 10, 1993, now abandoned, which is now allowed, which is a continuation-in-part of U.S. Ser. No. 08/019,151, filed Feb. 17, 1993, now U.S. Pat. No. 5,453,310, and a continuation-in-part of U.S. Ser. No. 08/095,662, filed Jul. 21, 1993, now U.S. Pat. No. 5,385,764.

BACKGROUND OF THE INVENTION

1. The Field of the Invention

The present invention relates to sealable liquid-tight and pressure-tight, thin-walled containers for storing and dispensing substances, such as carbonated beverages. More particularly, the present invention relates to containers and methods for producing such containers which are commercially and economically formed from hydraulically settable binders, such as hydraulic cement and gypsum. The containers have a matrix formed from hydraulically settable binders having properties that have not previously been achieved through the use of such binders. Additives can be optionally utilized with the binders which also results in a matrix having unique properties. In particular, the matrix of the containers can act as a liquid-tight barrier and as a pressure-tight barrier. Additionally, the matrix can withstand a differential in pressure between the exterior and the interior up to about 10 megapascals.

2. Related Applications

This application is a divisional of co-pending application Ser. No. 08/105,851 (now allowed) entititled "Sealable Liquid-Tight, Thin-Walled, Containers Composed of Hydraulically Settable Materials and Method for Manufacturing Such Containers," and filed Aug. 10, 1993 in the names of Per Just Andersen, Ph.D., and Simon K. Hodson, which is a continuation-in-part of co-pending application Ser. No. 08/019,151, entitled "Cementitious Materials For Use in Packaging Containers and Their Methods of Manufacture," and filed Feb. 17, 1993, in the names of Per Just Andersen, Ph.D., and Simon K. Hodson, which issued as U.S. Pat. No. 5,453,310, and also a continuation-in-part of co-pending application Ser. No. 08/095,662 entitled "Hydraulically Settable Containers for Storing, Dispensing, and Packaging Food and Beverages and Methods for their Manufacture" filed Jul. 21, 1993, in the names of Per Just Andersen, Ph.D., and Simon K. Hodson, which issued as U.S. Pat. No. 5,385,764.

3. The Related Technology

A. Sealable Liquid-tight and Pressure-tight Containers.

Conventional sealable liquid-tight and pressure-tight containers (hereinafter "containers") have a vast variety of structural configurations and are made from many different materials. These containers include cans, bottles, jars and cartons formed from metals, glass, plastics and paper composites.

Containers are generally utilized for containing substances such as beverages, food products and household products. Examples of beverages include carbonated beverages, alcoholic beverages and noncarbonated beverages, such as fruit juices, milk and water. Food products include all food that is sealed in containers such as bottles, cans and cartons in a liquid solution and food sealed in such containers in a dry condition. The liquid solutions utilized with food products includes: water, oil, sugar solutions and non-neutral solutions. Examples of household products and other substances which are typically stored in containers include: aerosols, deodorants, perfume, cosmetics, cleansers, oils, lubricants, and paints.

Containers have a vast variety of structural configurations and have experienced many evolutions to reach their present states. A key factor in the design and evolution of containers which are sealable, liquid-tight and pressure-tight is the ability of the container to act as an impermeable barrier to liquids and gases stored in the container and as an impermeable barrier for the protection of the stored liquids and gases from materials contacting the exterior of the container.

Additionally, containers which are sealable, liquid-tight and pressure-tight must be able to withstand a differential in pressure between the interior and exterior of the container. Pressure differentials are created by sealing substances which exert pressure such as carbonated beverages, sealing substances under a positive pressure and sealing substances under a vacuum pressure, sealing substances without pressure and subsequently subjecting the substances to a temperature change or an alteration of a chemical equilibrium, and due to compression from handling or stacking the containers.

Other significant factors in the design and evolution of sealable, liquid-tight and pressure-tight containers are strength, toughness, weight, adequate protection of the stored substances, economics, safety, and environmental concerns. Adequate protection of the stored substances includes the ability of the containers to protect substances from ingress of liquids or gases, light, microorganisms, vermin, physical shock, crushing forces, vibration, leaking, or spilling.

The containers must not impart foreign materials to the contained substances or leach into the contained substances. The containers must also be chemically resistant or inert in relation to the contained substances. Most containers utilize a coating or liner to insure that the substances receive adequate protection, with the exception of glass containers. The disadvantage of glass containers, however, is that they are brittle, which necessitates thick and heavy walls to provide the requisite toughness to prevent shattering.

The materials utilized with conventional containers are generally perceived as providing adequate protection of the stored substances in a safe manner. Recently, however, health and environmental concerns have been raised and attention has been given to reduce the use of materials utilized to manufacture conventional containers. In spite of these concerns, these materials continue to be used because of their superior properties of strength and, especially, mass producibility. Moreover, for any given use for which they are designed, such materials are relatively easy to form, strong, durable; resistant to degradation during use and with the exception of glass containers they are generally light-weight and thin-walled.

B. Environmental and Economic Impact of Conventional Containers.

The use of containers manufactured from metals, glass, plastics and paper composites (hereinafter "conventional materials") negatively impacts the environment in a variety of ways. The environmental ills occur in obtaining the necessary raw materials, processing the raw materials, manufacturing the containers, disposing of used containers and even in the recycling process, when applied.

The primary raw materials used in the manufacture of conventional containers originate from metal ores; particularly aluminum, tin and lead; minerals; petroleum products;

and wood. To obtain the necessary raw materials, ecosystems throughout the world are disturbed, resulting in erosion and disruption of natural cycles and relationships. Additionally, many of the raw materials utilized in the manufacture of conventional containers are a non-renewable resource.

Processing raw materials such as metal ores, minerals, petroleum products, and wood results in pollution to the air, water and soil. The environmental damage contributed by the processing of the various raw materials varies, however, each results in a significant form of environmental degradation. Although, only a portion of the damage is attributable to processing raw materials for manufacturing containers the industry is very large. For example, more than 100 billion aluminum cans are typically used each year for soft drinks and alcoholic beverages in the United States.

Additionally, the processing of raw materials such as metal ores, minerals, petroleum products, and wood products is very energy intensive. Processing these raw materials generally requires heating the material and the application of chemical and mechanical methods to create metals, glass, plastics and paper composites. Additionally, forming containers from these materials is generally a high energy process as well.

The most obvious problem associated with containers is their disposal. The impact of the disposal of containers on municipal waste disposal systems throughout the country is overwhelming. Further, the litter originating from used containers is also a significant problem. The disposal and litter problems have prompted some European countries to ban the use of aluminum cans. Recycling is the most effective way to reduce the sheer volume of disposed conventional containers, however, recycling only partially counters the problems of disposal and litter. A disadvantage of recycling some containers made from conventional materials is the need for sorting and additional processing, which further impacts the environment causing additional pollution and energy costs often exceeding the original requirements.

An additional problem associated with the use of conventional materials is the cost of the materials and the processing. The cost of the materials for aluminum cans is approximately $0.045 per can and the cost including processing is approximately $0.03 to about $0.09 per can. The cost of the materials and processing for glass bottles is approximately $0.095 to about $0.13 per bottle.

In spite of the environmental problems and costs associated with conventional containers, widespread use of such containers made from metals, glass, plastics, and paper composites has resulted from the utility of such materials for storing substances in a variety of structural configurations. The materials presently used to manufacture conventional containers can be easily shaped into containers which provide adequate protection for the substances stored within the containers in a safe manner. Their persistence, however, is also due in part to economic forces such as resistance to change, habit, and the fact that there has not been an acceptable alternative.

C. Traditional Cementitious Materials.

A long-felt need has existed for an inexpensive and environmentally benign material for the mass production of sealable liquid-tight and pressure-tight containers providing adequate protection for the substances stored within the containers in a safe manner. Containers cannot be manufactured in a commercially viable manner which do not impart these characteristics.

The need for an inexpensive and environmentally benign material in the manufacture of sealable liquid-tight and pressure-tight containers has not lead to the use of hydraulically settable materials, such as cement or gypsum (hereinafter "hydraulically settable," "hydraulic," or "cementitious" compositions, materials, or mixtures). Hydraulically settable materials, however, are inexpensive and comprise environmentally innocuous components like rock, sand, clay and water. From an economic and ecological standpoint, hydraulically settable materials are ideally suited to replace metals, glass, plastics and paper composites as the materials of choice for such containers.

Hydraulically settable materials have not been utilized for mass producing thin-walled and lightweight objects such as containers due to the recognized characteristics of hydraulically settable materials and problems associated with processing the materials. Some of the recognized characteristics and problems associated with such materials include: high fluidity, low tensile strength, high porosity and sensitivity to acidic solutions, such as carbonated beverages. Problems associated with processing such materials into articles include: low form stability after shaping the materials, lengthy curing times, adhesion to the forming apparatus and bleeding of water to the surface of the formed article. As a result of the recognized characteristics and processing problems of hydraulically settable materials, their usefulness has generally been limited to large, bulky structures that are durable, strong, and relatively inexpensive.

Structures containing a hydraulic cement are generally formed by mixing hydraulic cement with water and usually some type of aggregate to form a cementitious mixture, which hardens into concrete. Ideally, a freshly mixed cementitious mixture is fairly nonviscous, semi-fluid, and capable of being mixed and formed by hand. Because of its fluid nature, concrete is generally shaped by being poured into a mold, worked to eliminate large air pockets, and allowed to harden.

Some concrete mixtures have also been extruded into substantially flat slabs of simple shape. In the latter case, the cementitious mixture must be viscous and cohesive enough to avoid slumping (that is, changing from the desired shape). If the surface of the concrete structure is to be exposed, such as on a concrete sidewalk, additional efforts are made to finish the surface to make it more functional and to give it the desired surface characteristics.

Due to the high level of fluidity required for typical cementitious mixtures to have adequate workability, the uses of concrete and other hydraulically settable mixtures have been limited mainly to simple shapes which are generally large, heavy, and bulky, and which require mechanical forces to retain their shape until sufficient hardening of the material has occurred. The uses of cementitious materials have also been limited by the strength properties of concrete, namely, the high ratio of compressive strength to tensile strength with relative low tensile strength. The ratio of compressive strength to tensile strength is typically in the order of 10:1.

Hydraulically settable materials are particularly undesirable for utilization in manufacturing containers which must be sealable, liquid-tight and pressure-tight due to the high porosity of the materials. Porosity in hydraulically settable materials results from poor compaction which creates trapped air and from the evaporation of unreacted water. The porous nature of these materials results in capillary suction. Capillary suction is more than just gravitational leakage of liquids through a hydraulically settable matrix, it is a transport mechanism pulling liquids through the matrix. As a result of this high porosity, hydraulically settable materials cannot act as a barrier to liquids or gases. The porosity of these materials led to the advent of glass containers with thick walls centuries ago, when it was learned that earthenware was too porous to contain natural soda waters.

Simply stated, cementitious materials have historically been thought of as being brittle, rigid, porous, unable to be folded or bent, and having low elasticity, deflection and flexural strength. Additionally, the sensitivity of cementitious materials to acidity further illustrates the unsuitability of these materials for containing acidic beverages such as most carbonated beverages.

Another limitation has been that traditional cementitious mixtures or slurries have little or no form stability and are molded into the final form by pouring the mixture into a space having externally supported boundaries or walls. It is precisely because of this lack of moldability, coupled with the low tensile strength per unit weight, that cementitious materials have traditionally been useful only for applications where size and weight are not limiting factors and where the forces or loads exerted on the concrete are generally limited to compressive forces or loads, as in, e.g., columns, foundations, roads, sidewalks, and walls.

The lack of tensile strength (about 1–4 MPa) in concrete is ubiquitously illustrated by the fact that concrete readily cracks or fractures upon shrinkage or bending, unlike other materials such as metal, paper, plastic, or ceramic. Consequently, typical cementitious materials have not been suitable for making small, thin-walled, lightweight objects, such as containers, which must be made from materials with much higher tensile and flexural strengths per unit weight compared to typical cementitious materials and where a large cross-section is impractical.

More recently, higher strength cementitious materials have been developed which might be capable of being formed into smaller, denser objects. One such material is known as "Macro-defect Free" or "MDF" concrete, such as is disclosed in U.S. Pat. No. 4,410,366 to Birchall et al. See also, S. J. Weiss, E. M. Gartner & S. W. Tresouthick, "High Tensile Cement Pastes as a Low Energy Substitute for Metals, Plastics, Ceramics, and Wood," U.S. Department of Energy CTL Project CR7851-4330 (Final Report, November 1984). However, such high strength cementitious materials have been prohibitively expensive and would be unsuitable for making inexpensive containers where much cheaper materials better suited for such uses (e.g., paper and plastic) are readily available. Another drawback is that MDF concrete cannot be used to mass produce small lightweight objects due to the high amount of time and effort involved in forming and hardening the material and the fact that it is highly water soluble. Additionally, such materials have high viscosity and high yield stress which impedes molding and achieving form stability after molding.

Another problem with traditional, and even more recently developed high strength concretes has been the lengthy curing times almost universally required for most concretes. Typical concrete products formed from a flowable mixture require a hardening period of 10–24 hours before the concrete is mechanically self-supporting, and upwards of a month before the concrete reaches a substantial amount of its maximum strength. Extreme care has had to be used to avoid moving the cementitious articles until they have obtained sufficient strength to be demolded. Movement or demolding prior to this time has usually resulted in cracks and flaws in the cementitious matrix. Once self-supporting, the object could be demolded, although it has not typically attained the majority of its ultimate strength until days or even weeks later.

Economically and commercially mass producing cementitious objects has been difficult, since the molds used in forming cementitious objects are generally reused in the production of concrete products and a substantial period of time is required for even minimal curing of the concrete. The molding difficulties are magnified for small, lightweight articles with relatively thin walls as in articles with walls up to about one-fourth of an inch thick. Although zero slump concrete has been used to "mass produce" large, bulky object such as molded slabs, large pipes, or bricks which are immediately self-supporting, such "mass production" is only useful in producing objects at a rate of thousands per day. Such compositions and methods cannot be used to mass produce small, lightweight, thin-walled objects at a rate of thousands per hour. Additionally, zero slump concrete generally has high viscosity and high yield stress which impedes molding and achieving form stability after molding.

Demolding the cementitious object can create further problems. As concrete cures, it tends to bond to the forms unless expensive releasing agents, such as release oil, are used. It is often necessary to wedge the forms loose to remove them. Such wedging, if not done properly and carefully each time, often results in cracking or breakage around the edges of the structure. This problem further limits the ability to make small, lightweight, thin-walled cementitious articles or shapes other than flat slabs, particularly in any type of a commercial mass production.

If the bond between the outer wall of the molded cementitious article and the mold is greater than the internal cohesive or tensile strengths of the molded article, removal of the mold will likely break the relatively weak walls or other structural features of the molded article. Hence, traditional cementitious objects must be large in volume and thickness, as well as extraordinarily simple in shape, in order to avoid breakage during demolding unless expensive releasing agents and other precautions are used.

Typical processing techniques of concrete also require that it be properly consolidated after it is placed in order to ensure that no voids exist between the forms or in the matrix. This is usually accomplished through various methods of vibration or poking. The problem with consolidating, however, is that extensive overvibration of the concrete after it has been placed can result in segregation or bleeding of the concrete.

Bleeding is the migration of water to the top surface of freshly placed concrete caused by the settling of the heavier aggregate. Excessive bleeding increases the water to cement ratio near the top surface of the concrete slab, which correspondingly weakens and reduces the durability of the surface of the slab. The overworking of concrete during the finishing process not only brings an excess of water to the surface, but also fine material, resulting in subsequent surface defects.

Additionally, the nature of traditional cementitious materials presents another design limitation related to the porosity of the cementitious materials and costs. Utilization of traditional cementitious materials requires either undesirably high porosity to achieve a low cost product or lower porosity at a high cost.

For each of the foregoing reasons, as well as numerous others, cementitious materials have not had significant commercial application outside of the formation of large, slab-like objects, such as in buildings, foundations, walk-ways, highways, roofing materials or as mortar to adhere bricks or cured concrete blocks. It is completely counterintuitive, to even imagine (let alone actually experience) the manufacture from cementitious materials, of small, lightweight, thin-walled objects such as containers which are presently manufactured from metals, glass, plastics and paper composites.

In short, what are needed are improved containers and methods for manufacturing containers which do not result in the present environmental ills from obtaining the raw materials necessary for production, processing the raw materials, manufacturing the containers, disposing of used containers, litter and in the recycling process.

It would also be a completely novel and an important advancement to provide containers and methods of manufacturing such containers having a chemical composition compatible with the earth into which they eventually might be discarded such that the discarded containers are environmentally benign.

It would also be a significant improvement to reduce the cost of producing containers, particularly the cost of containers for beverages and food products.

It would be another advancement in the art to provide containers having properties considered generally desirable for containers yet utilizing materials other than materials conventionally employed, such as metals, glass, plastics and paper composites. Such desirable properties include sufficient tensile strength and impermeability to withstand a pressure differential between the exterior and the interior of the container, sufficient tensile strength to withstand transverse internal pressure stresses, low weight, thin-walls, minimal gas and liquid permeability, minimal ingress of oxygen resulting in oxidation of contained substances, minimal loss of carbonation, low cost, minimal corrosion as a reaction to the pH level of the substances stored in the container, non-leaching to avoid imparting foreign materials to stored substances which may alter the taste of the substances or create harmful reaction products, minimal environmental impact, and safety in terms of the manufacture, distribution and utilization of the containers.

It would also be an advancement to provide containers and methods for forming such containers which can be inexpensively mass produced yet achieve optimal structures for transporting, stacking, storing substances within the container, sealing substances within the containers, dispensing substances, and resealing substances within the container.

It would be a significant advancement in the art of cement making to provide containers and methods for forming such containers from economical hydraulically settable materials such as hydraulic cement and gypsum without typical undesirable properties such as low tensile strength, high porosity and leaching of chemicals.

From a manufacturing perspective, it would be a significant advancement in the art of cement to provide containers and methods for forming such containers which can be commercially formed from hydraulically settable materials, will rapidly obtain form stability and maintain their shape without external support for subsequent handling shortly after formation.

It would be still another advancement in the art to provide containers formed from hydraulically settable mixtures and methods for mass producing such containers which do not adhere to the forming apparatus and can be removed from the forming apparatus directly after forming without degradation to the containers.

It would be a further advancement in the art to provide containers and methods for producing such containers, where finishing work on the surface of the hydraulically settable containers is not required and the container can be readily coated or receive printing.

Finally, what is needed in the art is the ability to manufacture containers using procedures and equipment already used to make conventional containers. Such methods are disclosed and claimed herein.

BRIEF SUMMARY AND OBJECTS OF THE INVENTION

The present invention includes containers which are sealable, liquid-tight, pressure-tight, and thin-walled with a matrix formed from hydraulically settable materials, such as hydraulic cement, gypsum and other materials that set or harden with water, and methods for manufacturing such containers. The matrix of the containers formed from the hydraulically settable binders has properties that have not previously been achieved through the use of such binders. Utilization of these materials allows the economic mass production of containers without the processing problems typically associated with such materials. Additionally, additives can be optionally utilized with the binders which also results in a matrix having unique properties.

The containers within the scope of the present invention are useful for containing substances such as beverages, food products, household products and other products which are contained in conventional containers, cans, bottles, jars and cartons made from metals, glass, plastics and paper composites. Examples of beverages includes carbonated beverages, alcoholic beverages and noncarbonated beverages, such as fruit juices, milk and water. Food products includes all food that is sealed in conventional containers such as glass bottles, metal cans or paper cartons in a liquid solution and food sealed in such containers in a dry condition. The liquid solutions utilized with food products include: water, oil, sugar solutions and non-neutral solutions. Examples of household products and other substances which are typically stored in conventional containers include: aerosols, deodorants, perfume, cosmetics, cleansers, oils, lubricants, and paints.

Properties considered generally desirable for sealable liquid-tight, pressure-tight and thin-walled containers include the ability to preserve and protect substances such that loss or alterations to the contained substances are minimized yet achieved in a manner which is inexpensive, environmentally benign and safe. These properties are achieved through the use of hydraulically settable materials while overcoming the undesirable characteristics and processing problems associated with traditional hydraulically settable materials. These undesirable characteristics and processing problems, such as high porosity, low tensile strength, low form stability, and lengthy curing time are overcome by unique combinations of mixture designs and specialized processing.

The ability of containers to preserve and protect substances, such that loss or alterations to the contained substances are minimized, is related to the toughness, impermeability of the container and the chemical compatibility of the container with the stored substances such that the container is nonleaching or an inert chemical barrier. The toughness and impermeability are directly related to the tensile strength and porosity of the hydraulically settable matrix of the container. The degree of toughness and impermeability needed in a particular container varies based on the type of substances to be stored, the manner in which they are stored, processes which may occur after substances are sealed within containers, subsequent handling and other design requirements. Similarly, the design requirements for the chemical compatibility or nonreactivity are specific to the substances to be stored. Inorganic matrices are preferable for designing containers with the optimal level of compatibility and nonreactivity.

Pressure-tight containers within the scope of the present invention have sufficient toughness and impermeability to withstand a pressure differential between the exterior and the interior of the container. A "pressure differential" exists when the pressure on the interior and the exterior are not equal. Pressure differentials can result from the type of substances stored, the manner in which substances are stored, as a result of a process used after substances are sealed within the container or due to compression of the containers. Examples of the occurrence of such pressure differentials are the storage of carbonated beverages in containers, sealing substances under pressure in containers, sealing substances under a vacuum in containers, varying the temperature of substances sealed with containers, altering a chemical equilibrium of substances sealed within containers, and compressing sealed containers due to stacking and handling.

Additionally, the ability of containers to preserve and protect substances such that loss or alterations to the contained substances is minimized depends on the ability to design a container which is substantially impermeable to gases and liquids. This is also a function of the porosity of the container. A substantially impermeable container permits minimal ingress of nitrogen or oxygen avoiding oxidation of contained substances or minimal loss of carbonation from carbonated beverages stored within a container. Preserving and protecting substances also requires that foreign flavors are not imparted by the container and that the container be able to withstand the pH level of the substances. It is also desirable for the containers to be light-weight, thin-walled, inexpensive, and safe in terms of the manufacture, distribution and utilization of the containers.

Achieving containers with the properties considered desirable for liquid-tight and pressure-tight containers through the use of hydraulically settable materials without the undesirable characteristics and processing problems associated with traditional hydraulically settable materials was achieved through microstructural engineering. Microstructural engineering is the process of building into the microstructure of hydraulically settable compositions certain desired, predetermined properties into the final product. This microstructural engineering approach allows for the design of containers having a matrix with predetermined properties from a wide variety of commonly available materials. Utilizing this method, the desired properties are designed into the microstructure of the matrix, while optimizing the costs and other aspects of a mass production manufacturing system.

The result of the microstructural engineering approach is the ability to manufacture containers with a variety of properties heretofore manufactured from metals, glass, plastics, and paper composites at a cost that is usually competitive with, and in most cases even superior to, the costs involved with such materials. Moreover, because the containers of the present invention comprise environmentally benign components, the manufacture of such containers impacts the environment to a much lesser extent than does the manufacture of containers from metals, glass, plastics, and paper composites.

The major components within the containers of the present invention include mainly inorganic materials, such as hydraulically settable binders (such as hydraulic cement and gypsum), aggregates (such as sand, calcite, bauxite, dolomite, granite, quartz, glass, silica, perlite, vermiculite, clay, and even waste concrete products), fibers (organic and inorganic fibers), rheology-modifying agents, dispersants, and accelerators along with water necessary to hydrate, or react with, the hydraulically settable binders. These materials form a hydraulically settable mixture.

The preferred matrix of the containers manufactured according to the present invention is formed from the reaction products of a cementitious or other hydraulically settable mixture. The hydraulically settable mixture will at a minimum contain a hydraulic binder, such as hydraulic cement or gypsum hemihydrate, and water. The porosity of the hydraulically settable matrix resulting from these mixtures can be minimized by maintaining a low water to hydraulic binder ratio.

In order to design the desired properties into the hydraulically settable mixture and/or the cured hydraulically settable matrix, a variety of other additives are included within the hydraulic mixture, such as one or more aggregate materials, fibers, rheology-modifying agents, dispersants, accelerators, air entraining agents, blowing agents or reactive metals. The identity and quantity of any additive will depend on the desired properties of both the hydraulically settable mixture and the final hardened container made therefrom.

In some cases it may be preferable to include one or more aggregate materials within the mixture to create a smooth surface, to add bulk and decrease the cost of the mixture. Aggregates often impart significant strength properties and improved workability. Examples of such aggregates are ordinary sand, calcite, limestone, bauxite, dolomite, granite and quartz which are completely environmentally safe, extremely inexpensive, and essentially inexhaustible.

In other cases, lightweight aggregates can be added to yield a lighter, and often more insulating, final cured product. Examples of lightweight aggregate are expanded perlite, vermiculite, hollow glass spheres, aerogel, xerogel, and other lightweight mineral materials. These aggregates are likewise environmentally safe and relatively inexpensive.

Fibers are added to the hydraulically settable mixture to increase the tensile strength, flexural strength, compressive strength, cohesive strength and impact resistance of the containers. Fibers should preferably have high tear strengths, burst strengths, and tensile strengths. Fibers with a high aspect ratio work best in imparting strength and toughness to the hydraulically settable material.

Due to the versatility of the hydraulically settable mixtures used in the manufacture of the containers, a wide range of fibers, both organic and inorganic, can be used. Examples of preferred fibers include biodegradable plastics, glass, silica, ceramic, metals, carbon, hemp, plant leaves and stems, wood fibers (such as southern pine), flax, bagasse (sugar cane fiber), cotton and hemp (high aspect ratio). Abaca is a preferred fiber which is extracted from a banana-like hemp plant found naturally in the Philippines. Additionally, continuous fibers can be utilized such as Kevlar, polyaramite, glass fibers, carbon fibers and cellulose fibers.

Rheology-modifying agents can be added to increase the cohesive strength, "plastic-like" behavior, and the ability of the mixture to retain its shape when molded or extruded. They act as thickeners and increase the viscosity of the mixture as well as the yield stress of the mixture, which is the amount of force necessary to deform the mixture. This cremes higher "green strength" in the molded or extruded product. Suitable rheology-modifying agents include a variety of cellulose-, starch-, and protein-based materials which act by both bridging the individual cement particles together and by gelation of the water.

Dispersants, on the other hand, act to decrease the viscosity and yield stress of the mixture by dispersing the individual hydraulic binder particles. This allows for the use of less water while maintaining adequate levels of workability. Suitable dispersants include any material which can be adsorbed onto the surface of the hydraulic binder particles and which act to disperse the particles, usually by creating an electrically charged surface area on the particle or by placing electrical charges in the near colloid double layer.

In the case where both a rheology-modifying agent and dispersant are used, it will usually be advantageous to add the dispersant first and then the rheology-modifying agent second in order to obtain the beneficial effects of each. Otherwise, if the rheology-modifying is first adsorbed by the binder particles, it may create a protective colloid layer, which will prevent the dispersant from being adsorbed by the particles and imparting its beneficial effect to the hydraulically settable mixture.

The hydraulically settable matrix is composed of mainly inorganic materials, although certain embodiments may also include organic components, such as cellulose-based fibers and/or rheology-modifying agents. These organic components, however, represent only a small fraction of the overall mass of the hydraulically settable materials used to manufacture the containers. Additionally, some of the organic fibers utilized in this invention can be planted and harvested in an agribusiness setting, such as the abaca fibers.

The containers can also be coated, lined, or laminated with conventional coatings and liners to increase the strength and degree of impermeability of the containers or to act as a barrier to solutions which are acidic, alkaline, or with a sugar or oil content.

In addition to the ability to utilize liners, coatings and laminates and the ability to alter the types and quantities of the components in the mixture to effect the nature of the hardened hydraulically settable matrix of the containers, many of the various processing steps utilized to form the containers enhance or impart the properties considered desirable for sealable liquid-tight and pressure-tight containers.

An example of a process which enhances or imparts properties considered desirable for sealable liquid-tight and pressure-tight containers is the compaction of a substantially dry powdered hydraulic cement into a desired shape and then hydrating the cement without substantial mechanical mixing of the cement and water. This process reduces the interstitial space common in mechanically mixed cements. The reduction of interstitial space or voids results in an increase in tensile strength and a decrease in porosity. The hardened hydraulically settable matrix is consequently tougher and less permeable.

Another general method of manufacturing containers includes: (1) mechanically mixing a powdered hydraulic cement and water in order to form a cement paste in a high shear mixer and (2) forming sealable liquid-tight, pressure-tight and thin-walled containers from the mixture. In addition to mixing a powdered cement and water, it may be desirable to add other desired materials such as aggregates, fibers, rheology-modifying agents, dispersants, and accelerants to create a hydraulically settable mixture having the desired rheological as well as ultimate strength, weight, and low cost properties. The sheaths formed from the mixture can subsequently be dried or cured. The manner of mixing and curing can also effect the final properties of the hardened hydraulically settable sheaths.

Forming the containers after mechanically mixing the mixture can be accomplished by several methods which all have an effect on the final properties of the container. These methods include: formation by molding, formation from a pre-formed sheet and formation by extrusion. Formation by molding and formation from dry sheets, however, can also utilize extrusion of the mixture as a step before subjecting the extruded article to further processing. Combinations of these methods can also be utilized. Additionally, coatings, liners and laminates may be utilized by means known in the art in order to create a barrier and give the container the desired finish.

The properties of the hydraulically settable mixtures permits complex molding processes utilized with plastics, ceramics, metals or paper composites to be applied. Complex molding permits the formation of containers with a vast variety of shapes. Such complex molding techniques, for example, involve: split molds, multiple parting molds, multi-cavity and progressive dies. As a result, optimal structures can be achieved for transporting, stacking, storing substances within the container, sealing substances within the containers, dispensing substances, and resealing substances within the container.

It is within the scope of this invention to integrally form the entire container with a single continuous surface, however, most containers generally have two primary structural components, a hollow body portion and a closure means. The structural components are formed by the different manufacturing methods, subjected to final processing and assembled into containers. Additionally, the structural components may be assembled into containers and then subjected to final processing. Finally, the substances to be stored and sealed within the container can be deposited into the container. It is also within the scope of this invention, however, to fill or deposit the substances while forming the container.

An advantage of the present invention is the manufacture of containers which do not result in present environmental ills from obtaining the raw materials necessary for production, processing the raw materials and manufacturing the containers.

Another advantage of the containers of the present invention is the ease of recycling the containers. The containers can be easily incorporated as an aggregate into a fresh mixture to make new containers or other products utilizing similar materials such as conventional cement or concrete.

The disposal of the containers of the present invention which are not actually reused or recycled impacts the environment far less than containers made from conventional materials such as metals, glass, plastics and paper composites. Once discarded, the containers of the present invention can be reduced to a granular material which has a composition complementary to the components of the earth into which it will be placed. This disintegration process is not dependent on biodegradation forces but will occur as a result of whatever forces are present. Additionally, when discarded on the ground as litter, the forces of water, wind, and even fortuitous compressive forces such as being crushed under foot or by a passing car, etc. will cause the containers to be reduced to a largely inorganic, innocuous granular material.

If the containers are discarded into a land fill, the containers will crumble into a granular material as a result of the compressive force of the refuse. The time necessary for a container to degrade to granular material in a landfill occurs very quickly relative to the time requisite for typical metals, glass, plastics and paper composites to decompose in a landfill away from the forces of water, light and air.

An object of the present invention is the manufacture of containers which do not result in present environmental ills from obtaining the raw materials necessary for production, processing the raw materials and manufacturing the containers, litter, disposing of used containers, and in the recycling process.

Another object is the manufacture of containers from hydraulically settable binders which essentially comprise the materials found in the earth which easily break down into a granular material having properties similar to that of dirt. Hence, a further object of the present invention is the manufacture of easily degradable containers which do not pollute the environment or require conventional disposal or recycling infrastructures as do conventional containers.

Yet a further object of the present invention is the reduction of cost for producing containers, particularly the cost of containers for beverages and food products.

Another object of present invention is the manufacture of containers having a hydraulically settable matrix with predetermined properties and qualities. Properties and qualities considered desirable include the ability to preserve and protect substances such that loss or alterations to the substances is minimized yet achieved in a manner which is inexpensive and safe. Some of these specific properties and qualities include the ability to withstand positive and negative pressure differentials between the exterior and the interior of the containers, the ability to withstand high longitudinal and transverse internal pressure stress, high tensile strength, minimal gas and liquid permeability, minimal ingress of oxygen resulting in oxidation of contained substances, and minimal loss of carbonation, minimal impartment of foreign flavors to contained substances, minimal corrosion due to pH level of substances. It is also desirable for the containers to be light-weight, thin-walled, inexpensive, and safe in terms of the manufacture, distribution and utilization of the containers.

Still another object of the present invention are containers and methods for the manufacture of containers which can be formed from hydraulically settable binders which will rapidly gain form stability and maintain their shape without external support after being formed so that the formed materials can be handled quickly after formation.

Another object of the present invention is to provide containers and methods for commercially forming such containers from economical hydraulically sealable materials such as hydraulic cement and gypsum without undesirable properties such as low tensile strength and leaching of chemicals.

It is still another object of the present invention to provide containers formed from hydraulically settable mixtures and methods for mass producing such containers which do not adhere to the forming apparatus and can be removed from the forming apparatus directly after forming without degradation to the containers.

It is another object of the present invention to provide methods and apparatus for producing containers where finishing work on the surface of the containers is not required.

Finally, an important object of the containers and methods disclosed herein is the ability to manufacture containers from hydraulically settable materials using procedures and equipment already used to make conventional containers.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are therefore not to be considered limiting of its scope, the invention will be described with additional specificity and detail through the use of the accompanying drawings in which:

FIG. 3 is an exploded perspective view of another preferred embodiment of the container of the present invention, with a portion of the outer layer of the hydraulically settable material removed to expose a portion of the inner layer of hydraulically settable material.

DETAILED DESCRIPTION OF THE PREFERRED EMBODIMENTS

Figure 1:
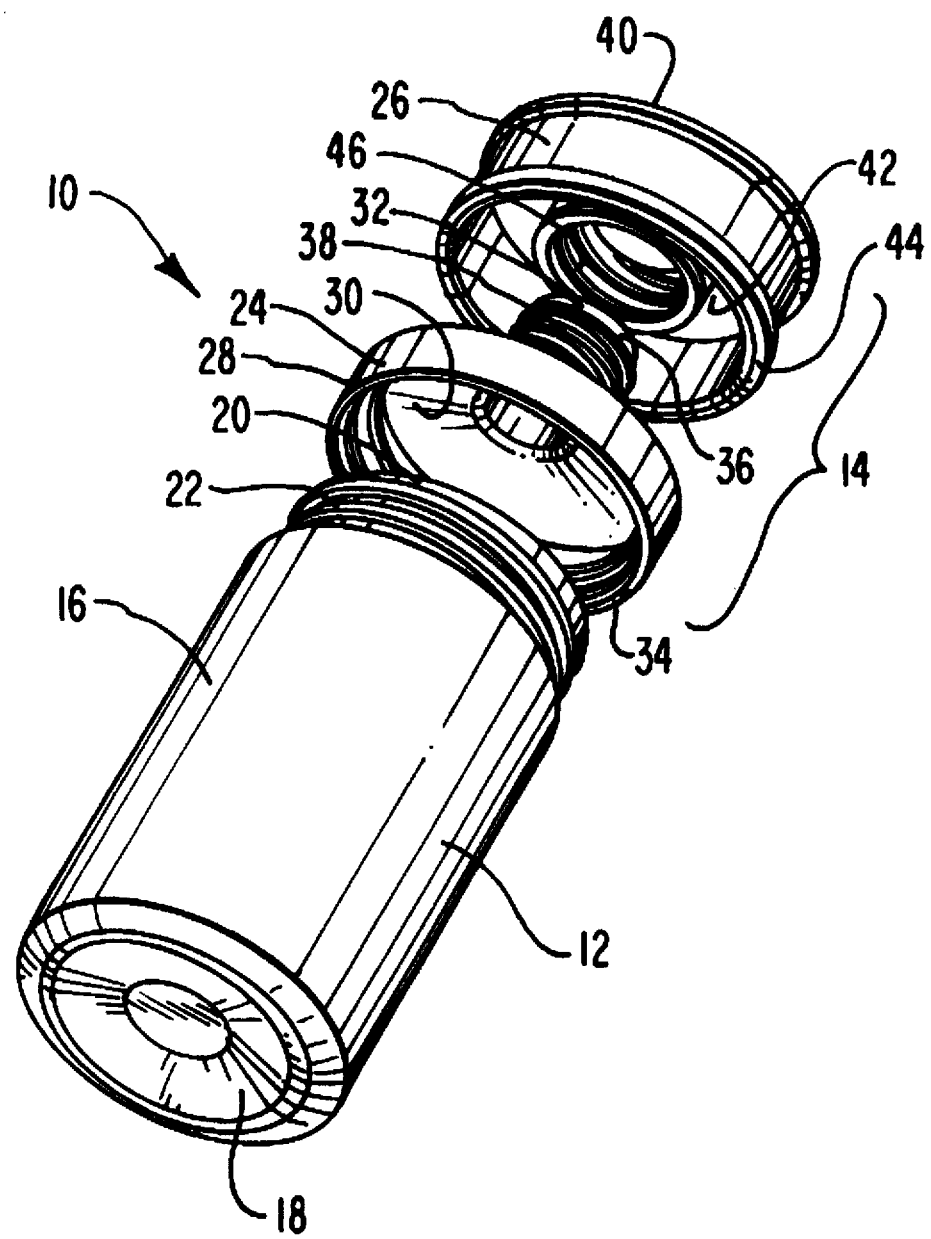
FIG. 1 is an exploded perspective view of one preferred embodiment of the container of the present invention.

The present invention includes novel containers and methods for forming a hydraulically settable mixture into containers, which can be utilized in a manner comparable to conventional containers. Using a microstructural engineering approach it is possible to design a hydraulically settable mixture that can be readily and economically mass produced into containers with significantly less environmental impact than conventional containers. The containers have sufficient toughness and are sufficiently impermeable to preserve and protect substances stored within the container such that loss or alterations to the substances are minimized.

I. General Discussion.

The sealable, liquid-tight, pressure-tight and thin-walled containers within the scope of the present invention are capable of substantially preserving and protecting the substances stored within the containers, such that loss or alterations to the contained substances are minimized. The containers are formed from inexpensive and practically inexhaustible materials, which results in significantly less environmental impact than conventional materials. Additionally, the containers are light-weight, thin-walled, mass producible and safe in terms of the manufacture, distribution and utilization of the containers.

The containers result in a decreased cost in materials and production compared to conventional containers and a decreased environmental impact in obtaining the materials to manufacture the containers, processing the materials into containers, and disposing and recycling of used containers. These objectives are achieved through the utilization of containers formed from hydraulically settable materials while overcoming the undesirable characteristics and processing problems associated with traditional hydraulically settable materials.

The undesirable characteristics associated with traditional hydraulically settable materials has indicated until now that hydraulically settable materials could not be utilized to mass produce containers which are sealable, liquid-tight, pressure-tight and thin-walled. The characteristics of traditional hydraulically settable materials which have precluded the usefulness of these materials for containers include: high porosity and low tensile strength. The processing problems precluding mass production include: low form stability after shaping the materials, lengthy curing times, adhesion to the forming apparatus and bleeding of water to the surface of the formed article. These undesirable characteristics and processing problems are overcome by unique combinations of mixture designs and processing.

To achieve the desired properties in the resultant containers without the undesirable characteristics and processing problems of traditional hydraulically settable materials, suitable hydraulically settable binders have been developed based on a microstructural engineering approach. A detailed description of the hydraulically settable binders used to manufacture food or beverage containers is set forth in detail in co-pending application Ser. No. 08/095,662 entitled "Hydraulically Settable Containers for Storing, Dispensing, and Packaging Food and Beverages and Methods for their Manufacture" filed Jul. 21, 1993, in the names of Per Just Andersen, Ph.D., and Simon K. Hodson, which issued as U.S. Pat. No. 5,385,764, and which is a continuation-in-part of application Ser. No. 07/929,898, entitled "Cementitious Food and Beverage Storage, Dispensing, and Packaging Containers and the Methods of Manufacturing Same," filed Aug. 11, 1992, in the names of Per Just Andersen, Ph.D., and Simon K. Hodson and now abandoned. In addition, a detailed description of the cementitious materials used to manufacture general packaging and storing containers for all kinds of goods is set forth in detail in co-pending application Ser. No. 08/019,151, entitled "Cementitious Materials For Use in Packaging Containers and Their Methods of Manufacture," filed Feb. 17, 1993, in the names of Per Just Andersen, Ph.D., and Simon K. Hodson, which issued as U.S. Pat. No. 5,453,310. For purposes of disclosure, the foregoing patents and applications are incorporated herein by specific reference. Once suitable hydraulically settable materials were produced, the specific methods of more rapidly and inexpensively manufacturing containers disclosed and claimed herein were developed.

In short, the undesirable properties and processing problems of traditional hydraulically settable materials are overcome by the present invention, in part, by collaborative combinations of some of the following: the disclosed hydraulically settable mixture components, mixture component ratios, mixing components morphology and chemical properties, sequence of adding the mixture components, mixing methods, utilizing microstructural engineering to properly place the mixture components resulting in uniform properties throughout the container, compaction of the mixture components, methods of forming the containers from the mixture, the forming equipment, curing methods, application of coatings, liners, laminates, as well as the structural designs. More specifically, the low tensile strength and high porosity of traditional hydraulically settable materials can be overcome by maintaining a low water to hydraulic binder ratio (less than the stoichiometric ratio), compacting the mixture components, and through the use of coatings, liners and laminates. The obstacles to mass production, such as low form stability after shaping the materials, lengthy curing times, adhesion to the forming apparatus and bleeding of water to the surface of the formed article are surmounted through several approaches as well. These include: controlling the rheology of the mixture through microstructural engineering and the use of rheology modifying agents, removing water from the mixture through heated forming machines and through accelerated curing. This technology is disclosed in greater detail hereinafter.

A. Microstructural Engineering Design.

As mentioned above, the containers of the present invention have been developed from the perspective of microstructural engineering. Microstructural engineering involves configuring the microstructure and utilizing processing steps to achieve a uniform microstructure resulting in a final product with matrix uniformity. Microstructural engineering permits designing into the microstructure of the hydraulically settable material certain desired, predetermined properties, while at the same time remaining cognizant of costs and other manufacturing complications. This microstructural engineering analysis approach, in contrast to the traditional trial-and-error, mix-and-test approach, has resulted in the ability to design hydraulically settable materials with those properties of toughness, minimal permeability, strength, weight, insulation, cost, and environmental neutrality that are necessary for appropriate containers.

The number of different raw materials available to engineer a specific product is enormous, with estimates ranging from between fifty thousand and eighty thousand. They can be drawn from such disparately broad classes as metals, polymers, elastomers, ceramics, glasses, composites, and cements. Within a given class, there is some commonality in properties, processing, and use-patterns. Ceramics, for instance, have high moduli, while polymers have low moduli; metals can be shaped by casting and forging, while composites require lay-up or special molding techniques; hydraulically settable materials, including those made from hydraulic cements historically have low flexural strength, while elastomers have high flexural strength.

However, compartmentalization of material properties has its dangers; it can lead to specialization (the metallurgist who knows nothing of ceramics) and to conservative thinking ("we use steel because that is what we have always used"). It is this specialization and conservative thinking that has limited the consideration of using hydraulically settable materials for a variety of products, such as in connection with the sealable, liquid-tight, pressure-tight and thin-walled containers. Nevertheless, once it is realized that hydraulically settable materials have such a wide utility and can be designed and microstructurally engineered, then their applicability to a variety of possible products becomes obvious.

The design of the compositions of the present invention has been developed and narrowed, first by primary constraints dictated by the design, and then by seeking the subset of materials which maximize the performance of the components. At all times during the process, however, it is important to realize the necessity of designing products which can be manufactured by a cost-competitive process.

Primary constraints in materials selection are imposed by characteristics of the design of a component which are critical to a successful product. With respect to a container those primary constraints include minimal permeability, minimal weight, strength (both compressive and tensile), and toughness requirements, while simultaneously keeping the costs to those comparable to metal, plastic, glass and paper counterparts.

As discussed above, one of the problems with hydraulically settable materials in the past has been that typical hydraulically settable mixtures are poured into a form, worked, and then allowed to set, harden, and cure over a long period of time, typically days or weeks. Experts generally agree that it takes at least one month for traditional concrete products to reach a substantial degree of their optimum strength. Such time periods are certainly impractical for the economic mass production of disposable containers and similar products.

As a result, an important feature of the present invention is that when the hydraulically settable mixture is formed, it will maintain its shape (i.e., support its own weight subject to minor forces, such as gravity and movement through the processing equipment) in the green state without external support. Further, from a manufacturing perspective, in order for production to be economical, it is important that the formed container rapidly (in a matter of minutes, or even seconds) achieve sufficient strength so that it can be handled using ordinary manufacturing procedures, even though the hydraulically settable mixture may still be in a green state and not fully hardened.

Another advantage of the microstructural engineering approach of the present invention is the ability to develop compositions in which cross-sections of the matrix are more homogeneous than have been typically achieved in the prior art. Ideally, when any two given samples of about 0.5 $n^3$ (wherein "n" is the smallest cross-section of the material) of the hydraulically settable matrix are taken, they will have substantially similar amounts of voids, aggregates, fibers, or any other additives and properties of the matrix. Achieving matrix uniformity is based on the proper placement of mixture components, which optimizes the properties of each mixture component and permits collaboration between the components to achieve the desired properties. The net effect of this uniformity is uniform performance throughout the product. Evidence of the collaboration between the components through this method is given by a tensile strength to compressive strength ratio which is substantially greater than that of traditional hydraulically settable materials.

From the following discussion, it will be appreciated how each of the component materials within the hydraulically settable mixture contributes to the primary design constraints.

B. Sealable, Liquid-tight, Pressure-tight and Thin-walled Containers.

The term "sealable" as used in this specification and the appended claims is intended to include the capacity to seal substances within a container. Substances can be sealed within containers by many methods. The container is generally sealed around substances by interlocking structural components, achieving a close tolerance between structural components, adhesives or crimping. Additionally, the container can be formed around the substances with a single continuous surface to seal the substances.

The term "liquid-tight" as used in this specification and the appended claims is intended to include the capacity to act as a barrier to substantially prevent seepage of liquid substances stored within sealed containers and the ingress of liquids into the containers. The term "pressure-tight" as used in this specification and the appended claims is intended to include the capacity to act as a barrier to prevent the escape of gases and liquids stored within the container and the ingress of gases and liquids into the containers. "Pressure-tight" containers include containers having a hydraulically settable matrix with a capacity to withstand a differential in pressure between the exterior and the interior of the container up to about 10 megapascals.

The term "container" as used in this specification and the appended claims is intended to include any receptacle or vessel utilized for storing substances which are sealed within the container to be dispensed at a later time. Examples of containers include cans, bottles, jars, and cartons conventionally made from metals, glass, plastics and paper composites.

The term "container" is intended to include two broad structural components, a hollow body portion which holds the substances and a closure means for sealing the substances within the containers and dispensing the substances stored with the containers. In some applications, the closure means can also be utilized for resealing the substances within the can. The term "closure means" includes lids, enclosed caps, twist caps, bottle caps, pulltabs, tamperproof lids, pump sprays, other spray mechanisms, utilized in conjunction with conventional containers, such as cans, bottles, jars and cartons.

Also included within the term "closure means" are the closure means utilized with paper composites such as milk cartons, fruit juices and frozen fruit juices. Milk cartons are a folded paper composite configured with a sealed top such that a portion of the seal can be broken and the contents dispensed. Another useful closure means utilized with paper composite containers is the folded and sealed top utilized with many fruit juices. The folded and sealed top has a thin metal foil or plastic covering for penetration by a straw to dispense the stored juices. Additionally, the closure means utilized with frozen fruit juices is also useful. This configuration involves caps at both ends of a spiral wound paper composite tube and a plastic release device surrounding one cap for easy access to the contents.

The term "container" refers to any receptacle or vessel without reference to the particular good or type of good contained or stored therein. Thus, the containers of the present invention are in no way limited to a single type of good for which it is intended to be used. The term "substances" is intended to include any goods requiring the use of conventional containers, cans, bottles, jars and cartons made from metals, glass, plastics and paper composites. Examples of substances typically requiring the use of containers include beverages, food products and household products. Examples of beverages includes carbonated beverages, alcoholic beverages and noncarbonated beverages, such as fruit juices, milk and water. Food products includes all food that is sealed in containers such as bottles, cans and cartons by dry packing or in a liquid solution. The liquid solutions utilized with food products include: water, oil, sugar solutions and non-neutral solutions. Examples of household products and other substances which are typically stored in containers include: aerosols, deodorants, perfume, cosmetics, cleansers, oils, lubricants, and paints.

One of the principal objectives of the present invention is to manufacture containers for use with beverages. Accordingly, the design of the hydraulically settable materials used in certain embodiments of the present invention has been developed to accommodate the specific needs of storing, sealing, dispensing, portioning and resealing beverage products in a safe environment.

C. Requisite Properties for Sealable, Liquid-tight, Pressure-tight and Thin-walled Containers.

Containers within the scope of the present invention can be manufactured with varying amounts of hydraulically settable mixture components utilizing various processing techniques to create containers having predetermined properties. The properties and qualities of any embodiment can be predetermined using a microstructural engineering approach in order to give the microstructure of the matrix desirable properties. The microstructural engineering approach allows one skilled in the art to adjust the identities and concentrations of the various components which might be added and to vary the processing techniques, to create containers having desirable properties, while at the same time remaining cognizant of costs and other issues related to large scale manufacturing systems.

The sealable, liquid-tight, pressure-tight and thin-walled containers within the scope of the present invention are capable of substantially preserving and protecting the substances stored within the containers, such that loss or alterations to the contained substances are minimized. The containers are formed from inexpensive and practically inexhaustible materials, which results is significantly less environmental impact than conventional materials. Additionally, the containers are light-weight, thin-walled, mass producible and safe in terms of the manufacture, distribution and utilization of the containers.

The containers result in a decreased cost in materials and production compared to conventional containers and a decreased environmental impact in obtaining the materials to manufacture the containers, processing the materials into containers, and disposing and recycling of used containers. These objectives are achieved through the utilization of containers formed from hydraulically settable materials while overcoming the undesirable characteristics and processing problems associated with traditional hydraulically settable materials. These undesirable characteristics and processing problems, such as high porosity, low tensile strength, low form stability, lengthy curing time, are overcome by unique combinations of mixture designs and processing.

The containers are able to preserve and protect the stored substances, such that loss or alterations to the stored substances are minimized, based on the toughness and the impermeability of the container. The containers are also able to withstand contact with water, non-neutral solutions, and solutions with oil content or sugar content. Although the containers are in contact with such substances, a minimal amount of foreign material is imparted to the stored substances and leaching does not occur.

Another advantage of the hydraulically settable materials used in these methods of manufacture is the absence of leachable heavy metals which usually result from typical hydraulically settable products. Hence, the present invention is of particular use in the beverage industry where disposable cans, bottles, jars and cartons are frequently used to store and dispense goods.

The toughness and impermeability of the containers are directly related to the tensile strength and porosity of the hydraulically settable matrix of the container. The degree of toughness and impermeability needed in a particular container varies based on the type of substances to be stored, the manner in which they are stored, processes which may occur after substances are sealed within containers, subsequent handling and other design requirements.

Pressure-tight containers within the scope of the present invention must have sufficient toughness and impermeability to withstand a pressure differential between the exterior and the interior of the container. A "pressure differential" exists when the pressure on the interior and the exterior are not equal. Pressure differentials can result from the type of substances stored, the manner in which substances are stored, as a result of a process after substances are sealed within containers and due to compression of the container. Examples of the occurrence of such pressure differentials are the storage of carbonated beverages in containers, sealing substances under vacuum pressure in containers, varying the temperature or equilibrium reaction of substances sealed within containers and compressing the container by squeezing the sidewalls together or stacking large amounts of containers one on top of another.

Designing sufficient tensile strength and minimal porosity into the matrix of the containers also enables the pressure-tight containers to withstand the internal longitudinal pressure stress and the internal transverse pressure stress resulting from pressure within the containers. The terms "internal longitudinal pressure stress" and "internal transverse pressure stress" as used in the specification and appended claims reflects the stress in the longitudinal and transverse directions on the matrix of the container. Internal longitudinal pressure stress is determined by the following formula:

$$\delta_L = (p^*r)/(2t)$$

wherein p is the internal pressure, r is the inner radius of the container, and t is the wall thickness. Similarly the internal transverse pressure stress is determined by the following formula:

$$\delta_T = (p^*r)/t \text{ or } \delta_T = 2\delta_L$$

wherein the same definitions apply.

The internal transverse pressure stress is twice as great as the internal longitudinal pressure stress; consequently, the internal transverse pressure stress determines the tensile strength needed to withstand a particular internal pressure. Optimal mixture designs incorporate the above described materials in prescribed ranges in order to manufacture a container having a matrix capable of withstanding an internal transverse pressure stress in the transverse vector up to about 10 MPa. The compressive strength of the pressure-tight container is typically within the range from about 50 to about 150 MPa.

Additionally, the containers preserve and protect the stored substances such that loss or alterations to the contained substances are minimized by designing the hydraulically settable matrix to be substantially impermeable to gases and liquids. The ability of the matrix to act as an impermeable barrier is also a function of the porosity of the matrix. A substantially impermeable container creates a barrier to: oxygen ingress thereby preventing oxidation of stored substances; nitrogen ingress or egress thereby monitoring pressure differentials; carbonation loss; and leaking the liquid stored substances. Containers can be designed to be impermeable to gases and liquids in several ways. The matrix can be designed to be very dense utilizing powder compaction techniques as set forth in detail in co-pending application Ser. No. 07/981,615, entitled "Methods of Manufacture and Use For Hydraulically Bonded Cement" filed Nov. 25, 1992, in the names of Hamlin M. Jennings, Ph.D., Per Just Andersen, Ph.D., and Simon K. Hodson, which issued as U.S. Pat. No. 5,385,676, and which is a continuation-in-part of patent application Ser. No. 07/856,257, filed Mar. 25, 1992 in the names of Hamlin M. Jennings, Ph.D. and Simon K. Hodson, and entitled "Hydraulically Bonded Cement Compositions and Their Methods of Manufacture and Use" (now abandoned), which was a file wrapper continuation of patent application Ser. No. 07/526,231 filed May 18, 1990 in the names of Hamlin M. Jennings, Ph.D and Simon K. Hodson, and entitled "Hydraulically Bonded Cement Compositions and Their Methods of Manufacture and Use" (also abandoned). For purposes of understanding such compaction techniques and their methods of use, the disclosure of the aforesaid patent and applications are incorporated by specific references. Other methods of achieving impermeability to gases and liquids involves the use of mixtures incorporating polymer impregnated materials and plasticizers as well as mixtures with a low water to hydraulically settable binder ratio. Additional methods of achieving impermeability to gases and liquids involves the use of coatings, liners and/or laminates. Coatings, liners and/or laminates are also useful to minimize the corrosive effect resulting from the pH levels of some substances, such as acids in carbonated beverages.

The matrix of the present invention may be designed to have a tensile strength to bulk density ratio within the range from about 1 to about 300 MPa-cm³/g. The tensile strength to bulk density ratio of the matrix will be more preferably within the range from about 2 to about 50 MPa-cm³/g and most preferably within the range from about 3 to about 20 MPa-cm³/g.

The containers achieve the necessary toughness and impermeability and yet they are lightweight and thin-walled. The matrix of the containers of the present invention will be designed to have an effective thickness which varies depending on whether the container is liquid-tight only or pressure-tight as well. The term "effective thickness" as used in this specification and the appended claims is intended to define the thickness at the weakest point of the container. The effective thickness of the matrix of containers which are only liquid-tight will be up to about 1 cm, more preferably up to about 5 mm, and most preferably up to about 1 mm. The effective thickness of the matrix of liquid-tight and pressure-tight containers will be up to about 5 cm, more preferably up to about 1 cm, and most preferably up to about 3 mm.

In addition, to achieving a matrix having sufficient tensile strength and minimal porosity requisite for forming liquid-tight and pressure-tight containers from materials which have historically lacked these properties, the processing problems associated with traditional hydraulically settable materials have also been overcome. Through the use of microstructural engineering the containers can be formed with high form stability, a brief curing time, minimal adhesion to the forming apparatus and minimal bleeding of water to the surface of the formed article.

D. Structure of the Containers.

The structure of the containers within the scope of the present invention will vary substantially based primarily on the nature of the substances to be stored, the manner in which the substances are stored, processes which may occur after the substances are sealed within containers and handling concerns. The result of such diverse design requirements is a vast array of useful structural configurations.

The structure of the containers generally comprises two components: a hollow body portion and a closure means. The hollow body portion has sidewalls, a bottom portion and an open end. The bottom portion is joined with the sidewalls such that substances can be deposited within the hollow body portion through the open end and supported by the sidewalls and the bottom portion of the closed end. The closure means is utilized for engaging the open end of the hollow body portion to seal substances within the container. The closure means in some embodiments can also be utilized for dispensing substances and for resealing substances within the container.

The structural components of the containers, namely the hollow body portions and closure means, can be designed to substantially resemble the structural components of conventional containers made from metals, glass, plastics and paper composites utilized for containing substances such as beverages, food products and household products.

The structural designs of containers utilized for carbonated beverages, alcoholic beverages and noncarbonated beverages such as fruit juices, milk and water, provide many examples for designs of containers manufactured from hydraulically settable materials. The structural components of the present invention can be designed to substantially resemble the conventional aluminum beverage can or beverage bottles manufactured from glass or plastic. Additionally, the structural components of the present invention can be designed based on the predecessors of these containers which are currently popular.

A preferred embodiment of the structure of container, particularly useful for beverages, is illustrated in FIG. 1. The container of the present invention shown generally at 10 has a hollow body portion 12 and a closure means 14. A hollow body portion 12 has sidewalls 16, a bottom portion 18 and an open end 20. The bottom portion 18 is integrally formed together with the side walls 16. Hollow body portion 12 also includes external threads 22 formed about the external periphery adjacent open end 20. External threads 22 are configured so as to engage complementary internal threads formed in the closure means 14 as more fully described below.

The thickness of side walls 16 is preferably less than about 3 mm, more preferably less than about 1.5 mm, and most preferably less than 0.75 mm. In the preferred embodiment, the external diameter of hollow body portion 16 is approximately 6 cm, the internal diameter of hollow body portion 16 is approximately 5.8 cm, and the length of hollow body portion 6 along its longitudinal axis is approximately 12 cm.

As further illustrated in FIG. 1, closure means 14 comprises a top 24 and a cap 26. Top 24 has a proximal end 28, a conical portion 30, and a distal end 32. Proximal end 28 is configured to receive the open end 20 of hollow body portion 12 in a mating relationship. Formed about the internal periphery of the proximal end 28 of top 24 are internal threads 34 that are complementary to, and are configured to engage, the external threads 22 of hollow body portion 12. In the preferred embodiment, internal threads 34 of top 24 and the external threads 22 of hollow body portion 12 are left hand threads. Top 24 terminates at its distal end 32 in a nozzle or spout 36. External threads 38 are formed about the external periphery of nozzle 36. External threads 38 are configured so as to engage complementary internal threads formed in cap 26 as more fully described below.

Cap 26 in the preferred embodiment is an enclosed cap. Cap 26 has a flat portion that is essentially in the shape of a circular disk or plate. Integrally attached to one side of the flat portion are concentric inner and outer annular rings 42 and 44. The external diameter of outer annular ring 44 is approximately equal to the external diameter of the proximal end 28 of top 24 and the external diameter of hollow body portion 12. Thus, when all of the components of container 10 are assembled together, the profile of container 10 will resemble an elongated cylinder of relatively uniform external diameter. Inner annular ring 42 is configured to receive the nozzle 36 of top 24 in mating relationship. Formed about the internal periphery of inner annular ring 42 are internal threads 46 that are complementary to, and are configured to engage, the external threads 38 of nozzle 36. The internal threads 46 of inner annular ring 42 and the external threads 38 of nozzle 36 are right hand threads.

As discussed in more detail below, the individual components of container 10, namely hollow body portion 12, top 24 and cap 26, are separately molded from hydraulically settable materials, and then the individual components are assembled to form container 10.

The advantages of this embodiment include the ability to stack the containers without support packaging due to the flat surface of the top and bottom of the containers and the ease of filling the container through the open end of the hollow body portion with substances such as beverages in mass production. Additionally, the closure means can be utilized for engaging the open end of the hollow body portion to seal substances within the container, for dispensing substances and also for resealing substances within the container. The containers can be stacked like many conventional containers, such as aluminum cans, yet the closure means of this embodiment permits the resealing of substances stored within the container.

Figure 2A:
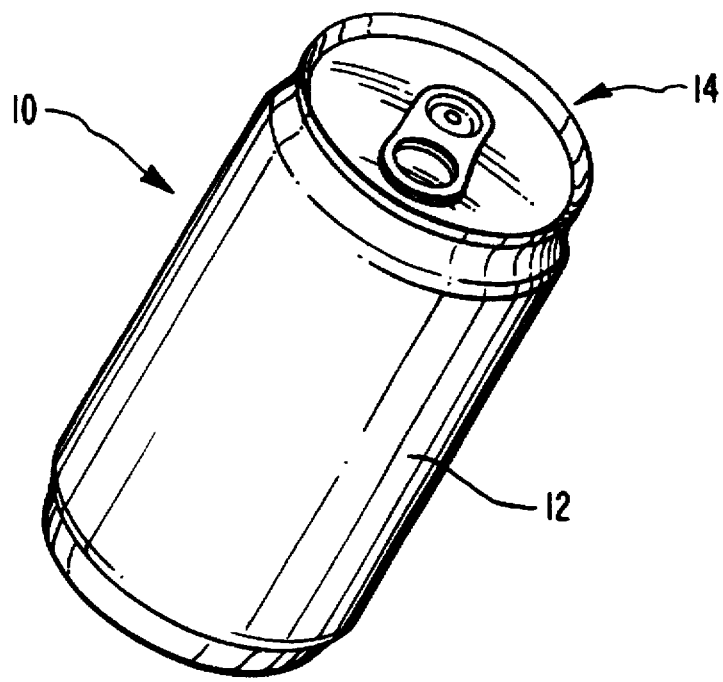
FIG. 2A is a top perspective view of another preferred embodiment of the container of the present invention.
Figure 2B:
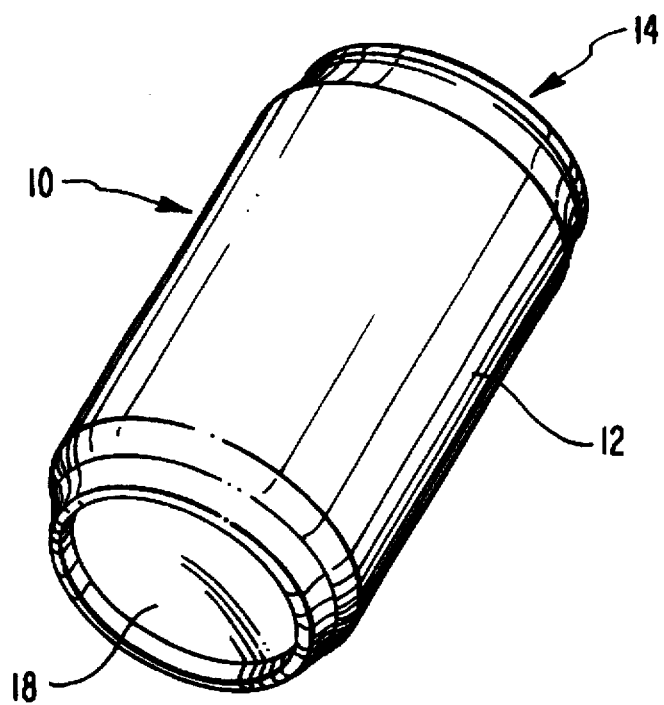
FIG. 2B is a bottom perspective view of another preferred embodiment of the container of the present invention.

FIGS. 2A and 2B illustrates another preferred embodiment of the container, this structural design is similar to beverage containers presently manufactured from aluminum. The container shown generally at 10 has a hollow body portion 12 and a closure means 14. The bottom portion 18 is integrally formed together with the side walls 16. The side walls 16 and bottom portion 18 can be formed from hydraulically settable materials and the substances can be sealed within the container with a closure means 14 made from other materials, such as metals and composite materials.

The bottom portion 18 is configured to give optimal strength and minimize the amount of material necessary to form a container with sufficient strength and impermeability. The design techniques which have been utilized in the aluminum can industry to optimize strength and minimize the amount of necessary material can be utilized within the scope this invention to optimize the design of containers manufactured from hydraulically settable materials. Additionally, the design techniques utilized to manufacture containers from other materials, such as other metals, glass, plastics and paper composites can also be utilized.

The advantages of this embodiment include the ability to stack the containers without support packaging due to the flat surface of the top and bottom of the containers and the ease of filling the container through the open end of the hollow body portion 12 with substances such as beverages in mass production. The closure means, however, cannot reseal substances within the container.

FIG. 3 illustrates another preferred embodiment of the container shown generally at 10, which has a hollow body portion shown generally at 12 and closure means shown generally at 14. In this embodiment, hollow body portion 12 is open at both ends. Furthermore, bottom portion 18 is separate from hollow body portion 12.

As discussed in more detail below, hollow body portion 12 is formed from two layers of hydraulically settable material. As shown in FIG. 3, an inner layer 48 is wound in a spiral fashion in a first direction, and an outer layer 50 is wound in a spiral fashion in a second direction. The outer surface of inner layer 48 is bonded to the inner surface of outer layer 50 with a suitable adhesive. The tensile strength of hollow body portion can be enhanced by adding continuous fibers 52 between inner and outer layers 48 and 50. As discussed in more detail below, the hydraulically settable material is spiral wound onto a mandrel to form a long, continuous cylindrical tube, which is then cut by conventional methods to form a plurality of hollow body portions 16.

Bottom portion 18 has a flat portion 54 and an annular ring 56 integrally formed about the outer periphery. As illustrated, ring 56 is configured to receive hollow body portion 12 in a mating relationship. However, bottom portion 18 could alternatively be configured to mate within the end of hollow body portion 12. Either way, bottom portion 18 is bonded to one end of hollow body portion 12 with a suitable adhesive.

The embodiment shown in FIG. 3 also incorporates an alternative embodiment of the closure means shown generally at 14. In this embodiment, closure means 14 consists of a top portion 58 and a foil tab 60. Top portion 58 is essentially the same as the bottom portion of this embodiment, except that it has a cutout portion (which is covered by foil tab 60), through which the beverage is dispensed after foil tab 60 has been removed. Foil tab 60 is similar to that presently used in conventional non-carbonated beverage containers. As with bottom portion 18, closure means 14 is configured to receive hollow body portion 12 in mating relationship and is bonded to the end of hollow body portion 12 with a suitable adhesive.

Alternatively, the closure means illustrated in FIG. 1 can be adapted to fit on the hollow body portion illustrated in FIG. 3 which permits the resealing of substances within the container. In that event, the internal threads 34 about the inner periphery of proximal end 28 of top 24 are eliminated, and proximal end 28 is configured to receive the end of hollow body portion 12 in mating relationship. Additionally, the closure means illustrated in FIG. 2A and FIG. 2B can be adapted to fit on the hollow body portion illustrated in FIG. 3.

Other configurations can also be formed by spiral winding a hydraulically settable sheet and can be utilized in a similar fashion to containers formed by spiral winding paper composites. Examples of such configurations include containers modeled after paper composite containers such as conventional oatmeal containers, frozen orange juice containers, dough containers, ice cream cartons and motor oil cans. The sidewalls of such containers are typically a paper composite, however, the bottom portion and closure means can have many different configurations. Examples of such bottom portions and closure means include flat paper composite lids, spiral wound lids, and metal disks configured to seal the substances within the containers.

The spiral wound containers within the scope of this invention can be formed with sidewalls formed by spiral winding a sheet formed from hydraulically settable materials in a similar manner to the container shown in FIG. 3. The bottom portion and the closure means can be formed by spiral winding a sheet made of hydraulically settable material. Other methods, described in detail below, can also be utilized to form the bottom portion or closure means. Additionally, it is within the scope of this invention to form the sidewalls from hydraulically settable materials and the bottom portion or closure means from other materials. The advantages of these spiral wound configurations are strength, the ability to easily stack the containers and the ease of dispensing substances from the containers.

Figures 4, 5:
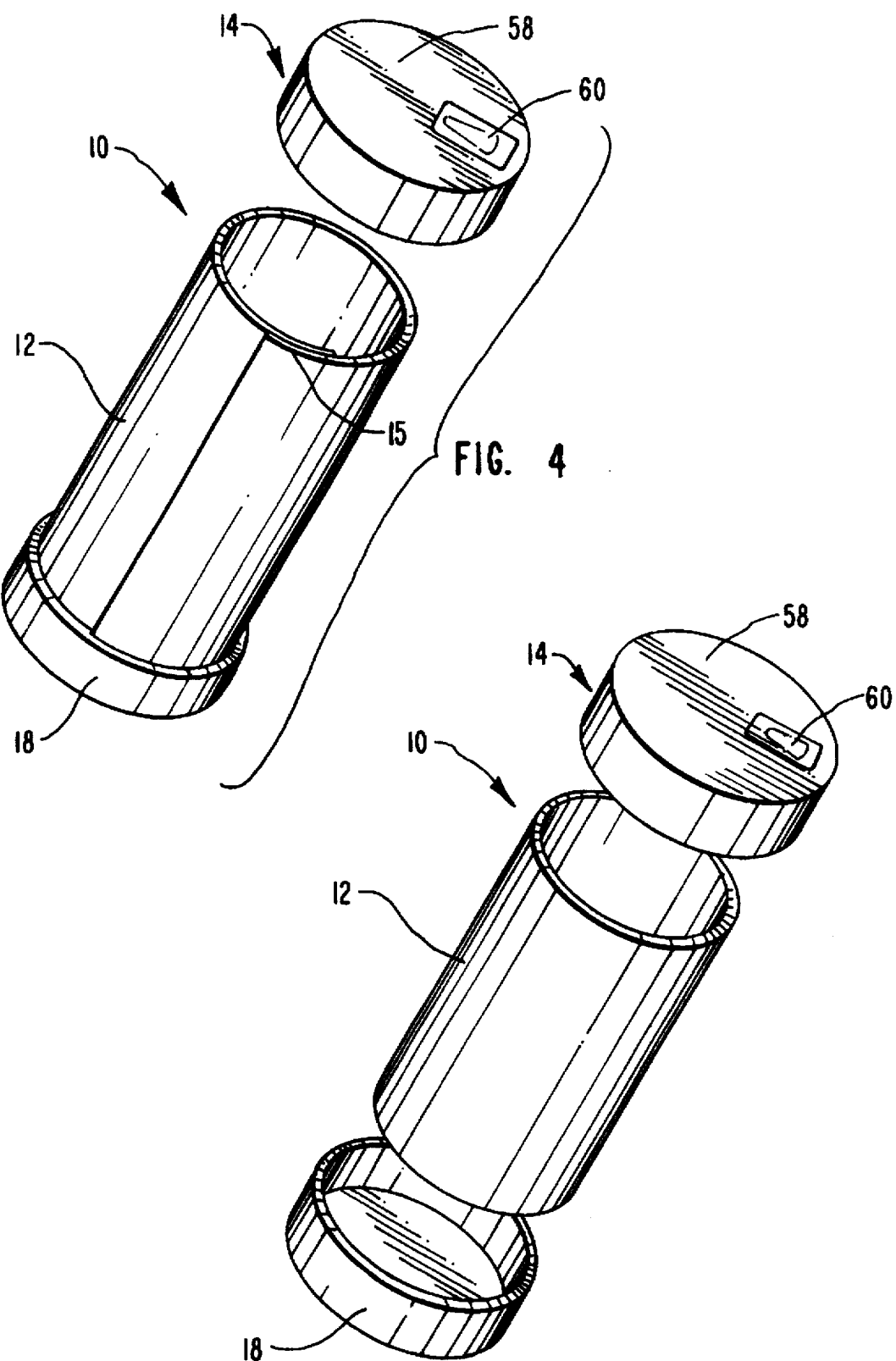
FIG. 4 is an exploded perspective view of still yet another preferred embodiment of the container of the present invention.
FIG. 5 is an exploded perspective view of another preferred embodiment of the container of the present invention.

Referring to FIGS. 4 and 5, two other embodiments of the container are shown generally at 10. These embodiments are essentially the same as illustrated in FIG. 3, except for the construction of the hollow body portion 12. In the embodiment shown in FIG. 4, hollow body portion 12 is formed by rolling a single sheet of hydraulically settable material to form a cylindrical tube. Opposite ends of the sheet are overlapped, as indicated at 15, and are bonded together with a suitable adhesive to form hollow body portion 12. In the embodiment shown in FIG. 5, hollow body portion 12 is formed by extruding a continuous, elongated cylindrical tube, which is then cut into pieces to form a plurality of individual hollow body portions.

In both embodiments, bottom portion 18 is essentially the same as that shown in FIG. 3 and can be configured either to receive the end of hollow body portion 12 in mating relationship or to mate within the end of hollow body portion 12. FIGS. 4 and 5 both include a closure means shown generally at 14 which is similar to that shown in FIG. 3, however, it should be understood that the closure means of FIG. 1, FIG. 2A and 2B, as well as other forms of closure means well known in the art, could be adapted for use in connection with the embodiments illustrated in FIGS. 4 and 5.

Figure 6:
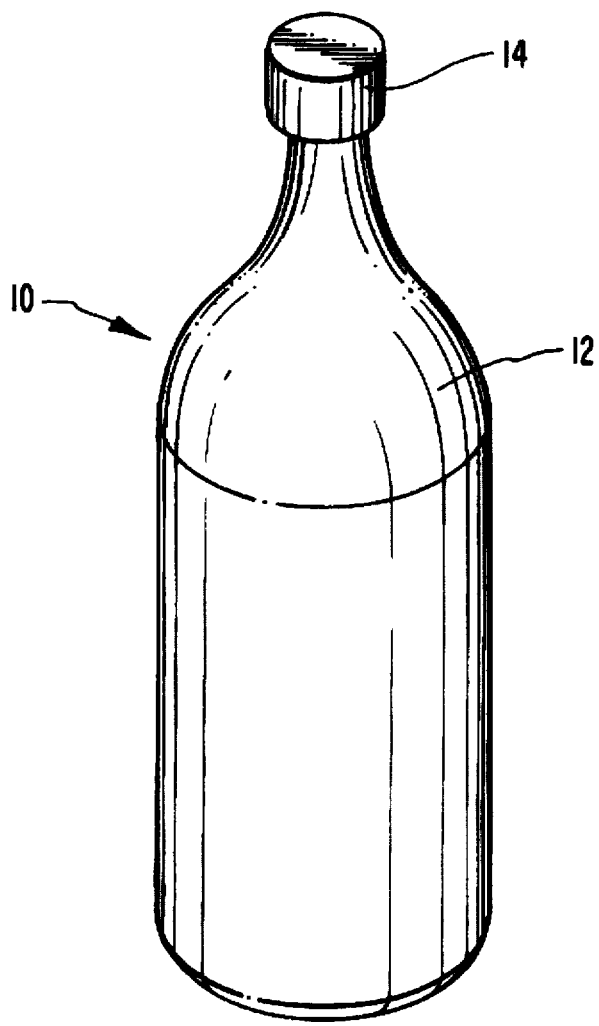
FIG. 6 is a perspective view of another preferred embodiment of the container of the present invention.
Figure 6A:
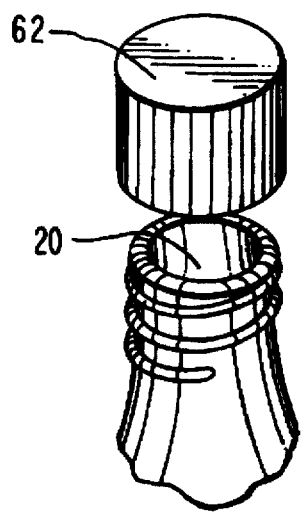
FIG. 6A is a perspective view of a closure means of the present invention.
Figure 6B:
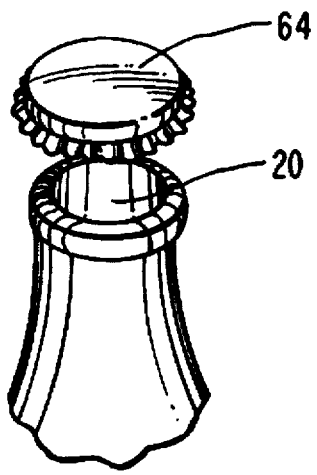
FIG. 6B is a perspective view of a closure means of the present invention.

The embodiment shown in FIG. 6 incorporates the design of beverage bottles manufactured from glass or plastic which are typically formed by blow molding. The container shown generally at 10 has an integrally formed hollow body portion 12 which can be formed by blow molding and a closure means 14. The closure means can be utilized for engaging the open end of the hollow body portion to seal beverages within the can, for dispensing beverages and for resealing substances within the container. As depicted in FIG. 6A, twist caps 62 provide a useful closure means and as depicted in FIG. 6B, bottle caps 64 can also be utilized. Additionally, corks and plugs can be utilized. The closure means can be manufactured by various methods from hydraulically settable materials or conventional materials can be utilized, such as metals and plastics. An advantage of some of these closure means utilized with bottles is the ability to reseal beverages within the container. The ability to reseal beverages is particularly useful with containers holding a volume larger than is needed for one serving of a beverage. External packaging, however, is needed to stack this embodiment due to the configuration of the top of the container.

Figure 7:
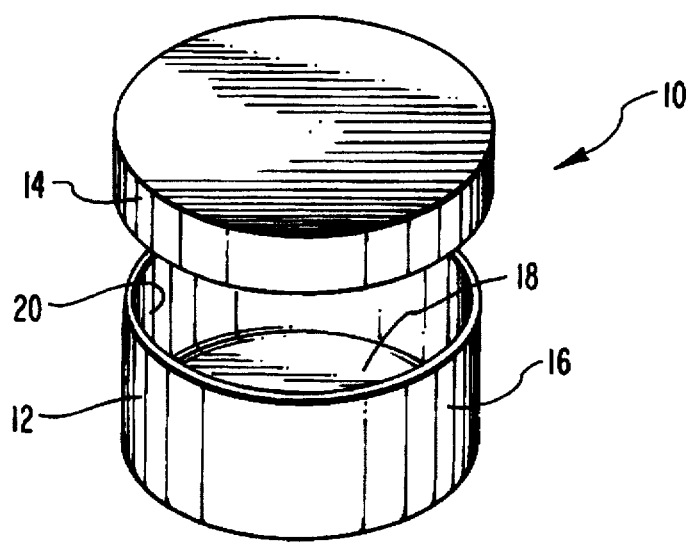
FIG. 7 is an exploded perspective view of yet another preferred embodiment of the container of the present invention.

Structural designs conventionally utilized for storing food products, such as metal cans, glass jars and paper composite containers, can also be utilized, to design the structure of containers within the scope of the present invention. The embodiment depicted in FIG. 7 incorporates the design of metal cans for containing food products, such as tuna. The container shown generally at 10 has a hollow body portion 12 with sidewalls 16, a bottom portion 18 and an open end 20. The bottom portion 18 is integrally formed with the sidewalls 16 from metal. A closure means 14 is utilized for engaging the open end 20 to seal substances within the can. The closure means 14 is configured to receive a portion of the side walls 16 of hollow body portion 12 in a mating relationship, and a sealed to bond closure means 14 to hollow body portion 12 together by compression, crimping or an adhesive. An advantage of such a flat configuration is the ability to stack the cans without support packaging. Additionally, metal can be incorporated in the closure means to facilitate the use of can openers requiring magnetic properties in the closure means. Other closure means can also be utilized such as a ring top or a pull top configuration.

Figure 8:
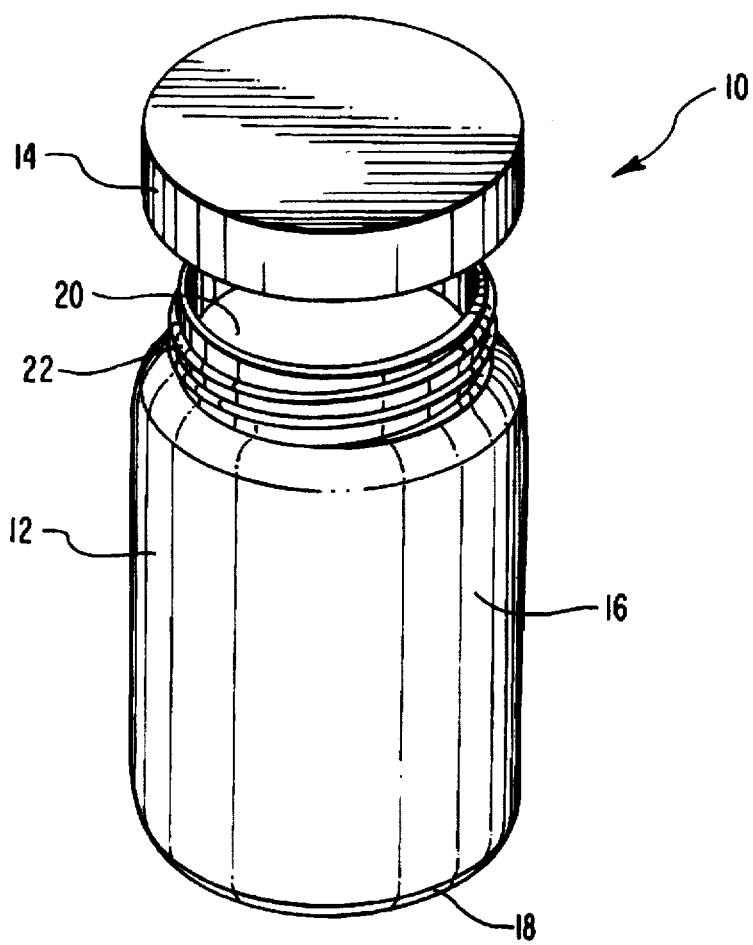
FIG. 8 is an exploded perspective view of another preferred embodiment of the container of the present invention.

FIG. 8 shows another embodiment of the container which has a configuration similar to a conventional glass jar. The container shown generally at 10 has a hollow body portion 12 and a closure means 14. Hollow body portion 12 has side walls 6, bottom portion 18 and an open end 20. About the outer periphery of open end 20 are external threads 22. Closure means 14 has internal threads (not shown) that are complementary to and are configured to engage the external threads 22 of hollow body portion 12.

Figure 9A:
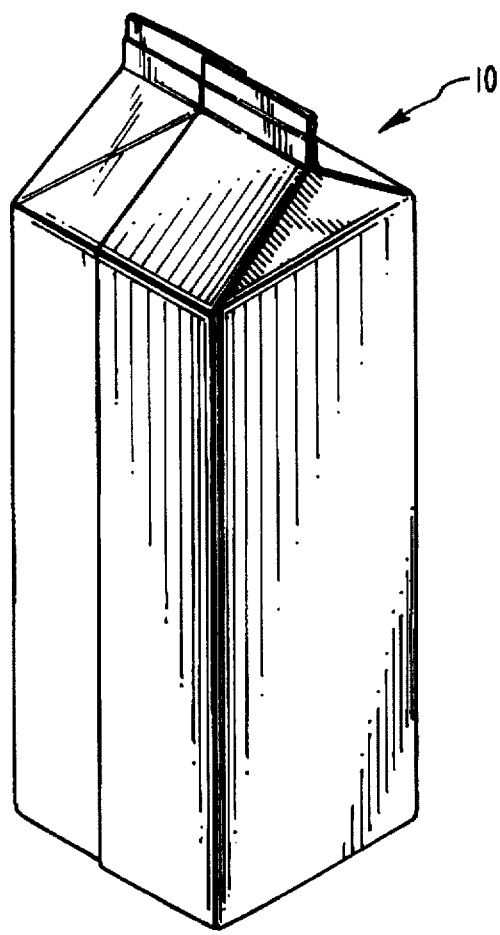
FIG. 9A is a perspective view of still another preferred embodiment of the container of the present invention.
Figure 9C:
FIG. 9C is a cross-section taken along the embodiment in FIG. 9B.
Figure 9B:
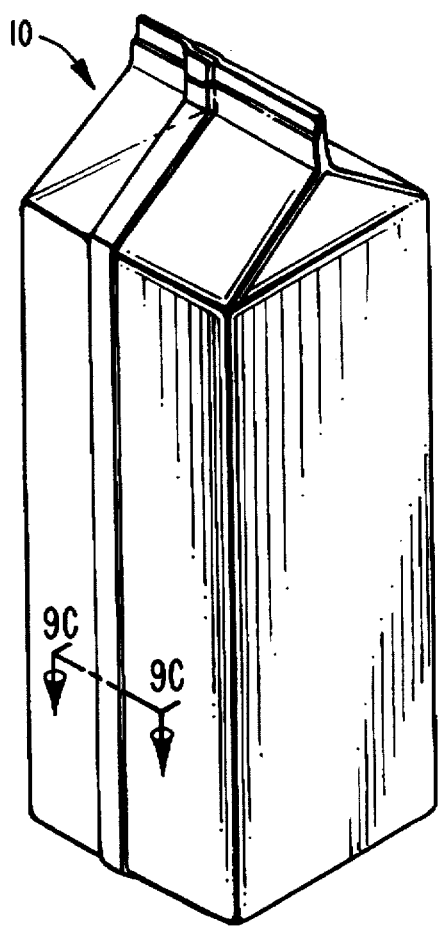
FIG. 9B is a perspective view of another preferred embodiment of the container of the present invention.

FIGS. 9A, 9B, 10A, and 10B, depict containers reflecting designs conventionally made from paper composites to form milk and fruit juice containers. These containers shown generally at 10 have hollow body portions and closure means formed from sheets which are folded and sealed into generally rectangular shapes. The milk carton designs as shown in FIGS. 9A and 9B are configured with a top sealed with an adhesive such that a portion of the seal can be broken and the contents dispensed. The milk carton design in FIG. 9A depicts overlapping portions which have been sealed together with an adhesive while FIG. 9B depicts overlapping portions which have been hermetically sealed together. The overlapping portions which have been hermetically sealed can be compressed together or crimped together. FIG. 9C shows a cross-section of the hermetically sealed overlapping portions.

Figure 10A:
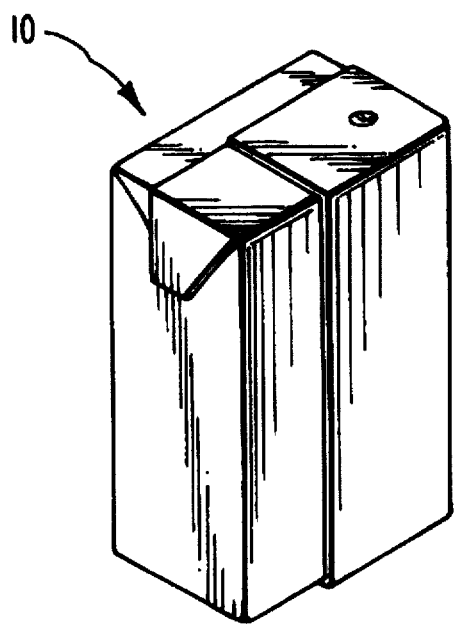
FIG. 10A is a perspective view of still another preferred embodiment of the container of the present invention.
Figure 10C:
FIG. 10C is a cross-section taken along the embodiment in FIG. 10B.
Figure 10B:
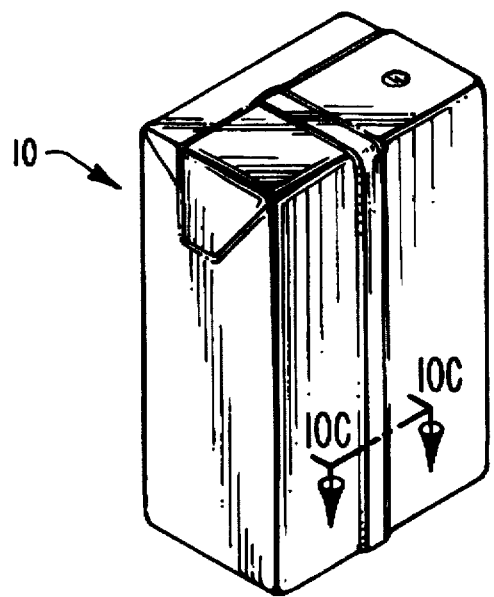
FIG. 10B is a perspective view of another preferred embodiment of the container of the present invention.

The closure means utilized with fruit juice containers as shown in FIGS. 10a and 10b is the folded and sealed top with a foil covering for penetration by a straw to dispense the stored juices. The fruit juice design in FIG. 10A depicts overlapping portions which have been sealed together with an adhesive while FIG. 10B depicts overlapping portions which have been hermetically sealed together. The overlapping portions which have been hermetically sealed can be compressed together or crimped together. FIG. 10C shows a cross-section of the hermetically sealed overlapping portions.

Conventional fruit juice containers formed from paper composite frequently utilize technology disclosed in U.S. Pat. No. 4,287,247 entitled Packing Laminates Provided with Crease Lines. The technology disclosed in U.S. Pat. No. 4,287,247, which is assigned to Tetra Pak International AB of Sweden, teaches the conversion of a laminate to a packing container with unique crease lines which prevent the formation of cracks in the layers of the laminate and subsequent leakage.

Figure 11:
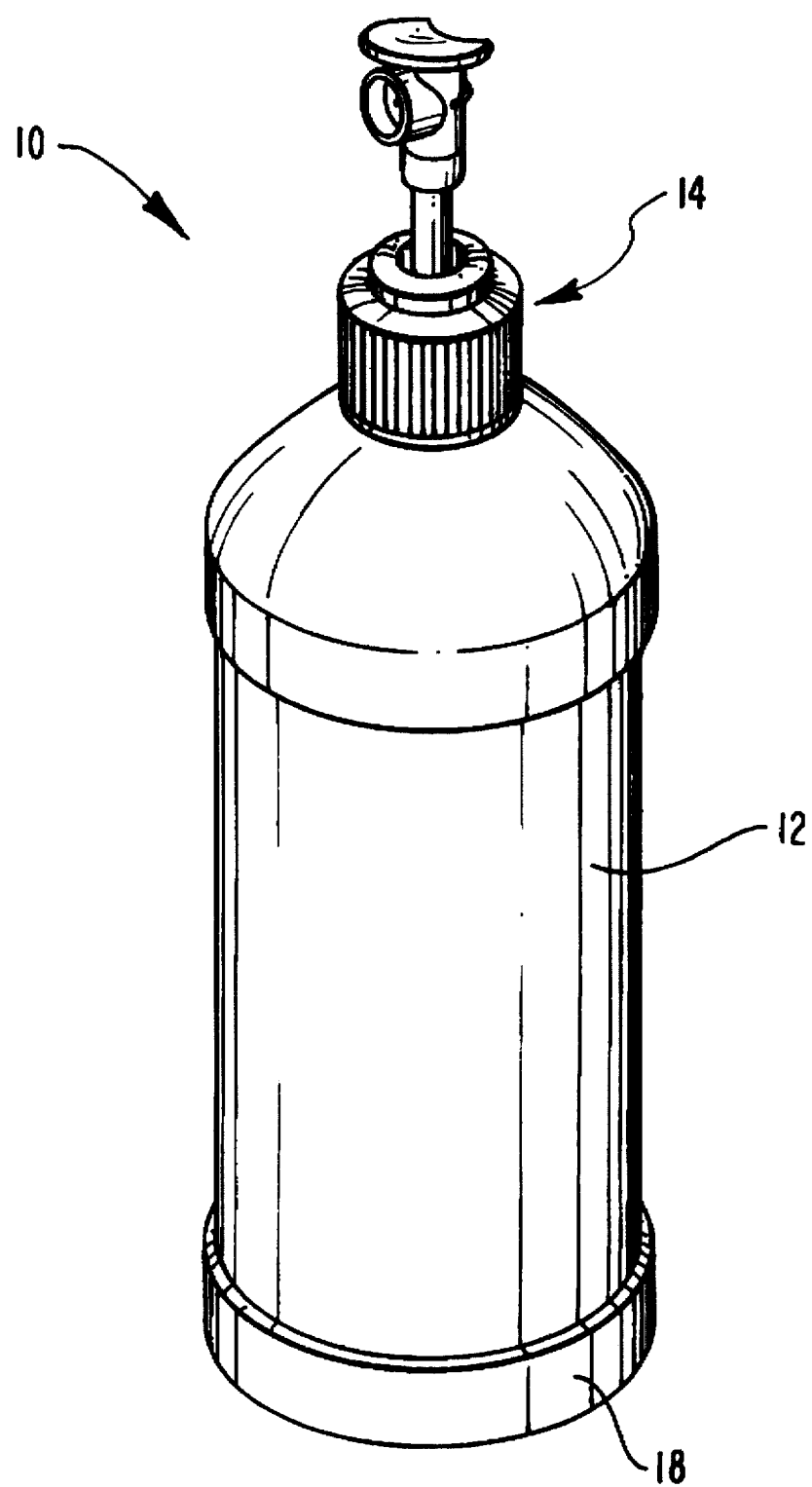
FIG. 11 is a perspective view of still another preferred embodiment of the container of the present invention.

Pump spray containers provide another design for containers within the scope of the present invention as shown in FIG. 11. The pump spray containers shown generally at 10 typically have a hollow body portion 12 with a bottom portion and an open end. A closure means shown generally at 14 is utilized for engaging the open end of the hollow body portion to seal substances within the containers and for dispensing substances. The closure means for dispensing substances is typically a pump spray or other spray mechanism. The closure means can also be manufactured from conventional materials.

Conventional containers have been embodied and are conventionally embodied in a multitude of configurations. The variation is primarily a result of the multiplicity of substances stored within the containers and the differing consumer needs associated with each of the substances. The present invention is not limited to the structural configurations which have been described; the present invention includes all structural configurations of containers made from hydraulically settable materials. It is also within the scope of the present invention to manufacture containers with a hollow body portion formed from hydraulically settable materials and with a closure means manufactured from a material selected from the group consisting of metals, glass, plastics and paper composites. Additionally, it is within the scope of the present invention to manufacture containers with a hollow body portion formed from a material selected from the group consisting of metals, glass, plastics and paper composites and with a closure means formed from hydraulically settable materials.

II. Hydraulically Settable Mixture Components

A. Hydraulically Settable Materials.

The materials used in conjunction with the methods of the present invention develop strength through the chemical reaction of water and a hydraulic binder such as hydraulic cement, calcium sulfate (or gypsum) hemihydrate, and other substances which harden after being exposed to water. The term "hydraulically settable materials" as used in this specification and the appended claims includes any material with a matrix and strength properties derived from the hardening or curing of a hydraulic binder. These include cementitious materials, plasters, and other hydraulically settable materials as defined herein. The hydraulically settable binders used in the present invention are to be distinguished from other cements or binders such as water insoluble polymerizable organic cements such as glues or adhesives.

The terms "hydraulically settable materials", "hydraulic cement materials" or "cementitious materials," as used herein, are intended to broadly define compositions and materials that contain both a hydraulically settable binder and water, regardless of the extent of hydration or curing that has taken place. Hence, it is intended that the term "hydraulically settable materials" shall include hydraulic paste or hydraulically settable mixtures in a green (i.e., unhardened) state, as well as hardened hydraulically settable or concrete products.

1. Hydraulically Settable Binders.

The terms "hydraulically settable binder" or "hydraulic binder" as used in this specification and the appended claims are intended to include any inorganic binder such as hydraulic cement, gypsum hemihydrate, or calcium oxide which develops strength properties and hardness by chemically reacting with water and, in some cases, carbon dioxide within the air and water. The terms "hydraulic cement" or "cement" as used in this specification and the appended claims are intended to include clinker and crushed, ground, milled, and processed clinker in various stages of pulverization and in various particle sizes.

Examples of typical hydraulic cements known in the art include: the broad family of portland cements (including ordinary portland cement without gypsum), calcium aluminate cements (including calcium aluminate cements without set regulators), plasters, silicate cements (including β-dicalcium silicates, tricalcium silicates, and mixtures thereof), gypsum cements, phosphate cements, high alumina cements, micro fine cements, slag cements, magnesium oxychloride cements, and aggregates coated with micro fine cement particles.

The term "hydraulic cement" is also intended to include other cements known in the art, such as α-dicalcium silicate, which can be made hydraulic under hydrating conditions within the scope of the present invention. The basic chemical components of the hydraulic cements within the scope of the present invention usually include CaO, $SiO_2$, $Al_2O_3$, $Fe_2O_3$, MgO, $SO_3$, in various combinations thereof. These react together in a series of complex reactions to form insoluble calcium silicate hydrates, carbonates (from $CO_2$ in the air and added water), sulfates, and other salts or products of calcium and magnesium, together with hydrates thereof. The aluminum and iron constituents are thought to be incorporated into elaborate complexes within the above mentioned insoluble salts. The cured cement product is a complex matrix of insoluble hydrates and salts which are complexed and linked together much like stone, and are similarly inert.

Hydraulically settable compositions are typically formed by mixing a hydraulic binder or combinations thereof (such as hydraulic cement) and water; the resulting mixture may be referred to as a "hydraulic paste" (or "cement paste"). The hydraulic binder and water are mixed either simultaneously or subsequently, with some sort of aggregate blended to form a "hydraulically settable mixture." Mortar and concrete are examples of hydraulically settable mixtures formed by mixing hydraulic cement, water, and some sort of aggregate, such as sand or rock.

Gypsum is also a hydraulically settable binder that can be hydrated to form a hardened binding agent. One hydratable form of gypsum is calcium sulfate hemihydrate, commonly known as "gypsum hemihydrate." The hydrated form of gypsum is calcium sulfate dihydrate, commonly known as "gypsum dihydrate." Calcium sulfate hemihydrate can also be mixed with calcium sulfate anhydride, commonly known as "gypsum anhydrite" or simply "anhydrite."

Although gypsum binders or other hydraulic binders such as calcium oxide are generally not as strong as hydraulic cement, high strength may not be as important in some applications. In terms of cost, gypsum and calcium oxide have an advantage over hydraulic cement, because they are somewhat less expensive. Moreover, in the case where the hydraulically settable material contains a relatively high percentage of weak, lighter weight aggregates (such as perlite), the aggregates will often comprise a "weak link" within the matrix. At some point, adding a stronger binder may be inefficient because the binder no longer contributes its higher potential strength due to a high content of weaker aggregates.

In addition, gypsum hemihydrate is known to set up or harden in a must shorter time period than traditional cements. In fact, in use with the present invention, it will harden and attain most of its ultimate strength within about thirty minutes. Hence, gypsum hemihydrate can be used alone or in combination with other hydraulically settable materials within the scope of the present invention.

Terms such as "hydrated" or "cured" hydraulically settable mixture, material, or matrix refers to a level of substantial water-catalyzed reaction which is sufficient to produce a hydraulically settable product having a substantial amount of its potential or final maximum strength. Nevertheless, hydraulically settable materials may continue to hydrate long after they have attained significant hardness and a substantial amount of their final maximum strength.

In addition to a hydraulic binder and water, the hydraulically settable mixtures according to the present invention may include aggregates, fibers, rheology-modifying agents, dispersants, air entraining agents, and other additives in order to build into the matrix of both the cured and uncured mixture the desired strength and other performance properties.

Terms such as "green" or "green state" are used in conjunction with hydraulically settable mixtures which have not achieved a substantial amount of their final strength, regardless of whether such strength is derived from artificial drying, curing, or other means. Hydraulically settable mixtures are said to be "green" or in a "green state" just prior and subsequent to being molded into the desired shape. The moment when a hydraulically settable mixture is no longer "green" or in a "green state" is not altogether clear, since such mixtures generally attain a substantial amount of their total strength only gradually over time. Hydraulically settable mixtures can of course show an increase in "green strength" and yet still be "green." For this reason, the discussion herein often refers to the form stability of the hydraulically settable material in the green state.

As mentioned above, preferable hydraulic binders include white cement, portland cement, microfine cement, high alumina cement, slag cement, gypsum hemihydrate, and calcium oxide, mainly because of their low cost and suitability for the manufacturing processes of the present invention. This list of cements is by no means exhaustive, nor in any way is it intended to limit the types of binders which would be useful in making the hydraulically settable containers within the scope of the claims appended hereto.

The present invention may include other types of cementitious compositions such as those discussed in co-pending patent application Ser. No. 07/981,615, filed Nov. 25, 1992 in the names of Hamlin M. Jennings, Ph.D., Per Just Andersen, Ph.D. and Simon K. Hodson, and entitled "Methods of Manufacture and Use for Hydraulically Bonded Cement," which issued as U.S. Pat. No. 5,358,676, and which is a continuation-in-part of patent application Ser. No. 07/856,257, flied Mar. 25, 1992 in the names of Hamlin M. Jennings, Ph.D. and Simon K. Hodson, and entitled "Hydraulically Bonded Cement Compositions and Their Methods of Manufacture and Use" (now abandoned), which was a file wrapper continuation of patent application Ser. No. 07/526,231 filed May 18, 1990 in the names of Hamlin M. Jennings, Ph.D and Simon K. Hodson, and entitled "Hydraulically Bonded Cement Compositions and Their Methods of Manufacture and Use" (also abandoned). In these applications, powdered hydraulic cement is placed in a near net final position and compacted prior to the addition of water for hydration.

Additional types of hydraulic cement compositions include those wherein carbon dioxide is mixed with hydraulic cement and water. Hydraulic cement compositions made by this method are known for their ability to more rapidly achieve green strength. This type of hydraulic cement composition is discussed in copending patent application Ser. No. 07/418,027 filed Oct. 10, 1989, in the names of Hamlin M. Jennings, Ph.D. and Simon K. Hodson, and entitled "Process for Producing Improved Building Material and Products Thereof", which issued as U.S. Pat. No. 5,232,496, wherein water and hydraulic cement are mixed in the presence of a carbonate source selected from the group consisting of carbon dioxide, carbon monoxide, carbonate salts, and mixtures thereof.

An important advantage of using a hydraulically settable mixture is that the resulting matrix is generally water insoluble (at least over the period of time during which use of the product is intended), which allows it to encapsulate water soluble materials or other materials added to the hydraulically settable mixture. Hence, an otherwise water soluble component can be incorporated into the greatly insoluble hydraulically settable matrix and impart its advantageous properties and characteristics to the final product.

2. Hydraulic Paste.

In each embodiment of the present invention, the hydraulic paste or cement paste is the constituent which eventually gives the container the ability to set up and develop strength properties. The term "hydraulic paste" shall refer to a hydraulic binder which has been mixed with water. More specifically, the term "cement paste" shall refer to hydraulic cement which has been mixed with water. The terms "hydraulically settable," "hydraulic," or "cementitious" mixture shall refer to a hydraulic cement paste to which aggregates, fibers, rheology-modifying agents, dispersants, or other materials has been added, whether in the green state or after it has hardened and/or cured. The other ingredients added to the hydraulic paste serve the purpose of altering the properties of the unhardened, as well as the final hardened product, including, but not limited to, strength, shrinkage, flexibility, bulk density, insulating ability, color, porosity, surface finish, and texture.

Although the hydraulic binder is understood as the component which allows the hydraulically settable mixture to set up, to harden, and to achieve much of the strength properties of the material, certain hydraulic binders also aid in the development of better early cohesion and green strength. For example, hydraulic cement particles are known to undergo early gelating reactions with water even before it becomes hard; this can contribute to the internal cohesion of the mixture.

It is believed that aluminates, such as those more prevalent in portland grey cement (in the form of tricalcium aluminates) are responsible for a colloidal interaction between the cement particles during the earlier stages of hydration. This in turn causes a level of flocculation/gelation to occur between the cement particles. The gelating, colloidal, and flocculating affects of such binders has been shown to increase the moldability (i.e., plasticity) of hydraulically settable mixtures made therefrom.

As set forth more fully below, additives such as fibers and rheology-modifying agents can make substantial contributions to the hydraulically settable materials in terms of tensile, flexural, and compressive strengths. Nevertheless, even where high concentrations of fibers and/or rheology-modifying agents are included and contribute substantially to the tensile and flexural strengths of the hardened material, it has been shown that the hydraulic binder nevertheless continues to add substantial amounts of compressive strength to the final hardened material. In the case of hydraulic cement, it also substantially reduces the solubility of the hardened material in water.

The percentage of hydraulic binder within the overall mixture varies depending on the properties that are to be microstructurally engineered into the hydraulically settable containers, as well as the identities of the other ingredients. However, the hydraulic binder is preferably added in an amount ranging from between about 5% to about 90% as a percentage by weight of the wet hydraulically settable mixture, preferably from about 8% to about 60%, and most preferably from about 10% to about 45%.

Despite the foregoing, it will be appreciated that all concentrations and amounts are critically dependent upon the qualities and characteristics that are desired in the final product. For example, in a very thin walled structure (even as thin as 0.5 mm) where strength is needed, it may be more economical to have a very high percentage of hydraulic binder with little or no added aggregate. In such a case, it also may be desirable to include a high amount of fiber to give flexibility or toughness.

The other important constituent of hydraulic paste is water. By definition, water is an essential component of the hydraulically settable materials within the scope of the present invention. The hydration reaction between hydraulic binder and water yields reaction products which give the hydraulically settable materials the ability to set up and develop strength properties.

In most applications of the present invention, it is important that the water to cement ratio be carefully controlled in order to obtain a hydraulically settable mixture which after forming is self-supporting in the green state. Nevertheless, the amount of water to be used is dependent upon a variety of factors, including the types and amounts of hydraulic binder, aggregates, fibrous materials, rheology-modifying agents, and other materials or additives within the hydraulically settable mixture, as well as the molding or forming process to be used, the specific product to be made, and its properties.

The preferred amount of added water within any given application is primarily dependent on two key variables: (1) the amount of water which is required to react with and hydrate the binder; and (2) the amount of water required to give the hydraulically settable mixture the necessary rheological properties and workability.

In order for the green hydraulically settable mixture to have adequate workability, water must generally be included in quantities sufficient to wet each of the particular components and also to at least partially fill the interstices or voids between the particles (including e.g., binder particles, aggregates, and fibrous materials). If water soluble additives are included, enough water must be added to dissolve or otherwise react with the additive. In some cases, such as where a dispersant is added, workability can be increased while using less water.

The amount of water must be carefully balanced so that the hydraulically settable mixture is sufficiently workable, while at the same time recognizing that lowering the water content increases both the green strength and the final strength of the hardened product. Of course, if less water is initially included within the mixture, less water must be removed in order to allow the product to harden.

The appropriate rheology to meet these needs can be defined in terms of yield stress. The yield stress of the hydraulically settable mixture will usually be in the range from between about 5 kPa to about 5,000 kPa, with the more preferred mixtures having a yield stress within a range from about 100 kPa to about 1,000 kPa, and the most preferred mixtures having a yield stress in the range from about 200 kPa to about 700 kPa. The desired level of yield stress can be (and may necessarily have to be) adjusted depending on the particular forming process being used to form the container.

In each of the forming processes, it may be desirable to initially include a relatively high water to cement ratio in light of the fact that the excess water can be removed by heating the products during or shortly after the forming process. One of the important features of the present invention as compared to the manufacture of paper composites is that the amount of water in the initial mixture is much less; hence, the yield stress is greater for the hydraulically settable mixtures. The result is that the total amount of water that must be removed from the initial mixture to obtain a self-supporting material (i.e., a form stable material) is much less in the case of the present invention when compared to the manufacture of paper composites.

Nevertheless, one skilled in the art will understand that when more aggregates or other water absorbing additives are included, a higher water to hydraulically settable binder ratio is necessary in order to provide the same level of workability and available water to hydrate the hydraulically settable binder. This is because a greater aggregate concentration provides a greater volume of interparticulate interstices or voids which must be filled by the water. Porous, lightweight aggregates can also internally absorb significant amounts of water due to their high void content.

Nevertheless, one skilled in the art will understand that when more aggregates or other water absorbing additives are included, a higher water to hydraulically settable binder ratio is necessary in order to provide the same level of workability and water available to hydrate the hydraulically settable binder. This is because a greater aggregate concentration provides a greater volume of interparticulate interstices or voids which must be filled by the water. Porous, lightweight aggregates can lead to high permeability and can also internally absorb significant amounts of water due to their high void content.

Both of the competing goals of sufficient workability and sufficient green strength can be accommodated by initially adding a relatively large amount of water and then driving off much of the water as steam during the forming process and through the use of drying tunnels. Additionally, these competing goals can be accommodated by reducing the interstitial volume though high pressure during the forming process such that workability is sufficient and after formation the water level is low and sufficient green strength is achieved.

It is often preferable to mix the hydraulic binder, water, and other components together in a high shear mixer such as that disclosed and claimed in U.S. Pat. No. 5,061,319 entitled "Process for Producing Cement Building Material", U.S. Pat. No. 4,944,595 entitled "Apparatus for Producing Cement Building Material", U.S. Pat. No. 4,552,463 entitled "Method and Apparatus for Producing a Colloidal Mixture" and U.S. Pat. No. 4,225,247 entitled "Mixing and Agitating Device". For purposes of understanding such high shear energy mixers and their methods of use, the disclosures of the aforesaid U.S. Pat. Nos. 5,061,319; 4,944,595; 4,552, 463; and 4,225,247 are incorporated herein by specific reference. High energy mixers within the scope of these patents are available from E. Khashoggi Industries of Santa Barbara, Calif., the assignee of the present invention. The use of a high shear mixer results in a more homogeneous hydraulically settable mixture, which results in a product with higher strength.

Based on the foregoing qualifications, typical hydraulically settable mixtures within the scope of the present invention will have a water to cement ratio within the range from about 0.01 to about 4, preferably from about 0.1 to about 3.5, and most preferably from about 0.15 to about 3. Additionally, the total amount of unreacted water will be less than 10% by weight with respect to the dry, hardened mixture. It should be understood that the hydraulic binder has an internal drying effect on the hydraulically settable mixture because binder particles chemically react with water and reduce the amount of free water within the interparticulate interstices. This internal drying effect can be enhanced by including faster reacting hydraulic binders such as gypsum hemihydrate along with slower reacting hydraulic cement.

B. Fibers.

As used in the specifications and appended claims, the terms "fibers" and "fibrous materials" include both inorganic fibers and organic fibers. Fibers may be added to the hydraulically settable mixture to increase the cohesion, toughness, fracture energy, and tensile, and, on occasion, even compressive strengths of the resulting hydraulically settable material. Fibrous materials reduce the likelihood that the hydraulically settable container will shatter when a strong cross-sectional force is applied.

Fibers which may be incorporated into the matrix are include naturally occurring fibers, such as fibers made from glass, silica, ceramic, metal, and carbon. Glass fibers are preferably pretreated to be alkali resistant. Other naturally occurring fibers include those extracted from hemp, plant leaves and stems, and wood fibers. Other fibers which can be incorporated include plastics, polyaramite, and Kevlar. Biodegradable plastics, such as polylactic acid and Biopol, are environmentally benign fibers which provide significant reinforcement to the matrix.

Preferred fibers of choice include glass fibers, abaca, bagasse, wood fibers (both hard wood or soft wood, such as southern pine), and cotton. Recycled paper fibers can be used, but they are somewhat less desirable because of the fiber disruption that occurs during the original paper manufacturing process. Any equivalent fiber, however, which imparts strength and flexibility is also within the scope of the present invention. Abaca fibers are available from Isarog Inc. in the Philippines. Glass fibers, such as Cemfill® are available from Pilkington Corp. in England.

These fibers are preferably used in the present invention due to their low cost, high strength, and ready availability. Nevertheless, any equivalent fiber which imparts compressive and tensile strength, as well as toughness and flexibility (if needed), is certainly within the scope of the present invention. The only limiting criteria is that the fibers impart the desired properties without adversely reacting with the other constituents of the hydraulic material and without contaminating substances stored in the containers containing such fibers.

The fibers should preferably have a high length to width ratio (or "aspect ratio") because longer, narrower fibrous materials can impart more strength to the matrix without adding more bulk and mass to the mixture. Fibrous materials should have an aspect ratio of at least about 10:1, preferably at least about 900:1, and most preferably at least about 3000:1.

Preferred fibers should also have a length that is many times the diameter of the hydraulic binder particles. Fibers having at least twice the average diameter of the hydraulic binder particles will work, at least 10 times being preferred, at least 100 times being more preferred, and at least 1000 times being most preferred.

The amount of fibrous material added to the hydraulically settable matrix will vary depending upon the desired properties of the final product, with strength, toughness, flexibility and cost being the principal criteria for determining the amount of fiber to be added in any mix design. In most cases, fiber will be added in an amount within the range from about 0.2% and to about 50% by volume of the hydraulically settable mixture, more preferably within the range from about 0.5% to about 30%, and most preferably within the range from about 1% to about 15%.

It will be appreciated, however, that the strength of the fiber is a very important feature in determining the amount of the fiber to be used. The stronger the tensile strength of the fiber, the less the amount that must be used to obtain the same tensile strength in the resulting product. Of course, while some fibers have a high tensile strength, other types of fibers with a lower tensile strength may be more elastic. Hence, a combination of two or more fibers may be desirable in order to obtain a resulting product that maximized multiple characteristics, such as high tensile strength and high elasticity.

It should also be understood that some fibers such as southern pine and abaca have high tear and burst strengths, while others such as cotton have lower strength but greater flexibility. In the case where both flexibility and high tear and burst strength is desired, a mixture of fibers having the various properties can be added to the mixture.

Additionally, some embodiments may utilize continuous fibers or filament winding with such fibers as Kevlar, polyaramite, glass fibers, carbon fibers and cellulose fibers in the mixture. Continuous fibers are also very useful in spiral winding, which provides significant reinforcement to the matrix. Spiral winding involves the use of fibers as an overlay wrapped onto or into the container in a spiraling fashion. Additional overlays of spiral winding can be wrapped onto or into the container. A significant increase in strength results from criss-crossing the fibers by spiral winding in opposite directions. The continuous fibers can be co-extruded with a tube to form the sidewalls of the containers, in a manner such that the fibers overlap each other in a crisscrossing fashion. Similarly, continuous fibers can be utilized with sheets formed from the mixture as an external reinforcement. This method involves wrapping the sheet to form a spiral wound tube for the sidewalls of the container and simultaneously wrapping the continuous fiber over the sheet.

The continuous fibers can also be utilized with the other fibers. Utilizing continuous fibers and combination of the other fibers with the continuous fibers results in a reduction in the volume percent of the fibers in the mixtures.

C. Rheology-modifying Agents.

The inclusion of a rheology-modifying agent acts to increase the plastic or cohesive nature of the hydraulically settable mixture so that it behave more like clay. The rheology-modifying agent tends to thicken the hydraulically settable mixture by increasing the yield stress of the mixture without greatly increasing the viscosity of the mixture. Raising the yield stress in relation to the viscosity makes the material more plastic-like and formable, while greatly increasing the green strength.

A variety of natural and synthetic organic rheology-modifying agents may be used which have a wide range of properties, including viscosity and solubility in water. For example, when it is desirable for the container to more quickly break down into environmentally benign components, it may be preferable to use a rheology-modifying agent which is more water soluble. Conversely, in order to design a material capable of withstanding prolonged exposure to water, it may be preferable to use a rheology-modifying agent which is less soluble in water after hardening of the hydraulically settable mixture or to use a high content of the hydraulic binder with respect to the rheology-modifying agent.

The various rheology-modifying agents contemplated by the present invention can be roughly organized into the following categories: polysaccharides and derivatives thereof, proteins and derivatives thereof, and synthetic organic materials. Polysaccharide rheology-modifying agents can be further subdivided into cellulose based materials and derivatives thereof, starch based materials and derivatives thereof, and other polysaccharides.

Suitable cellulose based rheology-modifying agents include, for example, methylhydroxyethylcellulose, hydroxymethylethylcellulose, carboxymethylcellulose, methylcellulose, ethylcellulose, hydroxyethylcellulose, hydroxyethylpropylcellulose, wood flour, etc. The entire range of possible permutations is enormous and cannot be listed here, but other cellulose materials which have the same or similar properties as these would also work well.

Suitable starch based materials include, for example, amylopectin, amylose, seagel, starch acetates, starch hydroxyethyl ethers, ionic starches, long-chain alkylstarches, dextrins, amine starches, phosphate starches, and dialdehyde starches.

Other natural polysaccharide based rheology-modifying agents include, for example, alginic acid, phycocolloids, agar, gum arabic, guar gum, locust bean gum, gum karaya, and gum tragacanth.

Suitable protein based rheology-modifying agents include, for example, Zein® (a prolamine derived from corn), collagen (derivatives extracted from animal connective tissue such as gelatin and glue), and casein (the principal protein in cow's milk).

Finally, suitable synthetic organic plasticizers include, for example, polyvinyl pyrrolidone, polyethylene glycol, polyvinyl alcohol, polyvinylmethyl ether, polyacrylic acids, polyacrylic acid salts, polyvinylacrylic acids, polyvinylacrylic acid salts, polyacrylimides, and ethylene oxide polymers, and latex, which is a styrene-butadine copolymer.

More than one of the rheology-modify agents listed above can be utilized in a particular mixture to achieve the desired properties of plasticity or rheology-modifying effect and to optimize yield stress. Additionally, combinations of the rheology-modifying agents optimize the rheology-modifying effect versus form stability at a minimum differential of temperature and water content.

Another potentially valuable rheology-modifying agent which does not necessarily clearly fall within the various categories mentioned above is polylactic acid. The rheology of this polymer is significantly modified by heat and could be used alone or in combination with other of the foregoing rheology-modifying agents.

A preferred rheology-modifying agent is methylhydroxyethylcellulose, examples of which are Tylose® FL 15002 and Tylose® 4000, both of which are available from Hoechst Aktiengesellschaft of Frankfurt, Germany. Lower molecular weight rheology-modifying agents such as Tylose® 4000 can act to plasticize the mixture rather than thicken it, which helps during forming procedures.

More particularly, lower molecular weight rheology-modifying agents improve the internal flow of the hydraulically settable mixture during molding processes by lubricating the particles. This reduces the friction between the particles as well as between the mixture and the adjacent mold surfaces. Although a methylhydroxyethylcellulose rheology-modifying agent is preferred, almost any non-toxic rheology-modifying agent (including any listed above) which imparts the desired properties would be appropriate.

Another preferred rheology-modifying agent that can be used instead of, or in conjunction with, Tylose® is polyethylene glycol having a molecular weight of between 20,000 and 35,000. Polyethylene glycol works more as a lubricant and adds a smoother consistency to the mixture. For this reason, polyethylene glycol might be referred more precisely as a "plasticizer." In addition, it gives the molded hydraulically settable material a smoother surface. Finally, polyethylene glycol can create a coating around soluble components of the mixture thereby rendering the hardened product less water soluble and reducing the permeability of the hardened product.

The rheology-modifying agent within the hydraulically settable materials of the present invention will generally be included in an amount within the range from about 0.5% to about 50% by weight of the mixture.

D. Dispersants.

The term "dispersant" is used hereinafter to refer to the class of materials which can be added to reduce the viscosity and yield stress of the hydraulically settable mixture. A more detailed description of the use of dispersants may be found in the Master's thesis of Andersen, P. J., "Effects of Organic Superplasticizing Admixtures and their Components on Zeta Potential and Related Properties of Cement Materials" (1987).

Dispersants generally work by being adsorbed onto the surface of the hydraulic binder particles and/or into the near colloid double layer of the binder particles. This creates a negative charge around or on the surfaces of particles, causing them to repel each other. This repulsion of the particles adds "lubrication" by reducing the friction or attractive forces that would otherwise cause the particles to have greater interaction. Hence, less water can be added initially while maintaining the workability of the hydraulically settable mixture.

Greatly reducing the viscosity and yield stress may be desirable where clay-like properties, cohesiveness, and/or form stability are less important. Adding a dispersant aids in keeping the hydraulically settable mixture workable even when very little water is added, particularly where there is a "deficiency" of water. Hence, adding a dispersant allows for an even greater deficiency of water, although the molded container may have somewhat less form stability if too much dispersant is used. Nevertheless, including less water initially will theoretically yield a stronger final cured container according to the Feret Equation.

Whether or not there is a deficiency of water is both a function of the stoichiometric amount of water required to hydrate the binder and the amount of water needed to occupy the interstices between the particles in the hydraulically settable mixture, including the hydraulically binder particles themselves and the particles within the aggregate material and/or fibrous material. As stated above, particle packing reduces the volume of the interstices between the hydraulic binder and aggregate particles and, hence, the amount of water necessary to fully hydrate the binder and maintain the workability of the hydraulically settable mixture by filling the interstitial space.

However, due to the nature of the coating mechanism of the dispersant, the order in which the dispersant is added to the mixture is often critical. If a flocculating/gelating agent such as Tylose® is added, the dispersant must be added first and the flocculating agents second. Otherwise, the dispersant will not be able to become adsorbed on the surface of the hydraulic binder particles as the flocculating agents will be irreversibly adsorbed onto forming a protective colloid, on the surface, preventing the dispersant from being absorbed.

A preferred dispersant is sulfonated naphthalene-formaldehyde condensate, an example of which is WRDA 19, which is available from the W. R. Grace Co. in Baltimore, Md. Other dispersants which would work well include sulfonated melamineformaldehyde condensate, lignosulfonate, and polyacrylic acid.

The amount of added dispersant will generally range up to about 5% by weight of the hydraulic binder, more preferably within the range of between about 0.25% to about 4%, and most preferably within the range of between about 0.5% to about 2%. However, it is important not to include too much dispersant as it tends to retard the hydration reactions between, e.g., hydraulic cement and water. Adding too much dispersant can, in fact, prevent hydration, thereby destroying the binding ability of the cement paste altogether.

The dispersants contemplated within the present invention have sometimes been referred to in the concrete industry as "superplasticizers." In order to better distinguish dispersants from rheology-modifying agents, which often act as plasticizers, the term superplasticizer will not be used in this application.

E. Aggregates.

Aggregates common in the concrete industry may be used in the hydraulically settable mixtures of the present invention, except that they often must be more finely ground due to the size limitations imposed by the generally thin-walled structures of the present invention. Aggregates utilized within the hydraulically settable mixtures will typically have a diameter within the range from about 0.01 microns to about 3 mm. More preferably, aggregates with a diameter within the range from about 0.1 microns to about 0.5 mm and most preferably within the range from about 0.2 microns to about 100 microns.

Aggregates may be added to increase the strength, decrease the cost by acting as a filler, decrease the weight, and/or increase the insulation ability of the resultant hydraulically settable materials. Aggregates are also useful for creating a smoother surface finish, particularly platelike aggregates. Examples of useful aggregates include perlite, vermiculite, sand (any combination of quartz, calcined bauxite and dolomite), gravel, rock, limestone, sandstone, glass beads, aerogels, xerogels, seagel, mica, clay, synthetic clay, diatomaceous earth, alumina, silica, fly ash, silica fume, tabular alumina, kaolin, micro spheres, hollow glass spheres, porous ceramic spheres, gypsum dihydrate, calcium carbonate, calcium aluminate, cork, seeds, lightweight polymers, xonotlite (a crystalline calcium silicate gel), lightweight expanded clays, unreacted cement particles, pumice, exfoliated rock and other geologic materials.

Unreacted cement particles may also be considered to be "aggregates" in the broadest sense of the term. Even discarded hydraulically settable materials, such as discarded containers of the present invention can be employed as aggregate fillers and strengtheners.

Both clay and gypsum are particularly important aggregate materials because of their ready availability, extreme low cost, workability, ease of formation, and because they can also provide a degree of binding and strength if added in high enough amounts. Clay is a general term used to identify all earths that form a paste with water and harden when dried. The predominant clays include silica and alumina (used for making pottery, tiles, brick, and pipes) and kaolinite. The two kaolinitic clays are anauxite, which has the chemical formula $Al_2O_3.3SiO_2.2H_2O$, and montmorillonite, which has the chemical formula $Al_2O_3.4SiO_2.H_2O$. However, clays may contain a wide variety of other substances such as iron oxide, titanium oxide, calcium oxide, zirconium oxide, and pyrite.

In addition, although clays have been used for millennia and can obtain hardness even without being fired, such unfired clays are vulnerable to water degradation and have not been used to form containers that will be exposed to moisture. Nevertheless, unfired clay and fired clay provide a good, extremely inexpensive aggregate within the cementitious matrix.

Similarly, gypsum hemihydrate is also hydratable and forms the dihydrate of calcium sulfate in the presence of water. Thus, gypsum may exhibit the characteristics of both an aggregate and a binder depending on whether (and the concentration of) the hemihydrate or dihydrate form is added to a hydraulically settable mixture.

Examples of aggregates which can add a lightweight characteristic to the cementitious mixture include perlite, vermiculite, glass beads, hollow glass spheres, calcium carbonate, synthetic materials (e.g., porous ceramic spheres, tabular alumina, etc.), cork, lightweight expanded clays, sand, gravel, rock, limestone, sandstone, pumice, and other geological materials.

In addition to conventional aggregates used in the cement industry, a wide variety of other aggregates, including fillers, strengtheners, including metals and metal alloys (such as stainless steel, calcium aluminate, iron, copper, silver, and gold), balls or hollow spherical materials (such as glass, polymeric, and metals), filings, pellets, powders (such as microsilica), and fibers (such as graphite, silica, alumina, fiberglass, polymeric, organic fibers, and such other fibers typically used to prepare various types of composites), may be combined with the hydraulic cements within the scope of the present invention. Even materials such as seeds, starches, gelatins, and agar-type materials can be incorporated as aggregates in the present invention.

From the foregoing, it will be understood that the amount of a particular aggregate within a mixture will vary depending upon the desired performance criteria of a particular container. The amount can vary greatly from no added aggregate up to about 80% by weight of the hydraulically settable mixture, more preferably within the range from between about 3% to about 60%, and most preferably from between about 20% to about 50%.

Further, it will be appreciated that for any given product, certain of these aggregates may be preferable while others may not be usable. For example, certain of the aggregates may contain harmful materials that, for some uses, could leach from the hydraulically settable mixture; nevertheless, most of the preferred materials are not only nontoxic but they are also more environmentally neutral than the components in existing disposable products.

Fibrous materials are used in the present invention primarily to modify the weight characteristics of the cementitious mixture, to add form stability to the mixture, and to add strength and flexibility to the resulting cementitious matrix, although certain fibers may also impart some level of insulation to the final product. Therefore, the term "aggregates" will refer to all other filler materials, which are nonfibrous, and whose function is mainly to impart strength, rheological, textural, and insulative properties to the materials.

It is often preferable according to the present invention to include a plurality of differently sized and graded aggregates capable of more completely filling the interstices between the aggregate and hydraulic binder particles. Optimizing the particle packing density reduces the amount of water necessary to obtain adequate workability by eliminating spaces which would otherwise be filled with interstitial water, often referred to as "capillary water." In addition, using less water increases the strength of the final hardened product (according to the Feret Equation).

In order to optimize the packing density, differently sized aggregates particle sizes ranging from as small as about 0.5 μm to as large as about 2 mm may be used. (Of course, the desired purpose and thickness of the resulting product will dictate the appropriate particle sizes of the various aggregates to be used.) It is within the skill of one in the art to know generally the identity and sizes of the aggregates to be used in order to achieve the desired characteristics in the final hydraulically settable container.

In certain preferred embodiments of the present invention, it may be desirable to maximize the amount of the aggregates within the hydraulically settable mixture in order to maximize the properties and characteristics of the aggregates (such as qualities of strength, low density, or high insulation). The use of particle packing techniques may be employed within the hydraulically settable material in order to maximize the amount of the aggregates.

A detailed discussion of particle packing can be found in the following article coauthored by one of the inventors of the present invention: Johansen, V. & Andersen, P. J., "Particle Packing and Concrete Properties," *Materials Science of Concrete II* at 111–147, The American Ceramic Society (1991). Further information is available in the Doctoral Dissertation of Anderson, P. J., "Control and Monitoring of Concrete Production—A Study of Particle Packing and Rheology," The Danish Academy of Technical Sciences. The advantages of such packing of the aggregates can be further understood by reference to the examples which follow in which hollow glass spheres of varying sizes are mixed in order to maximize the amount of the glass balls in the hydraulically settable mixture.

In embodiments in which it is desirable to obtain a container with high insulation capability, it may be preferable to incorporate into the hydraulically settable matrix a lightweight aggregate which has a low thermal conductivity, or "k-factor" (defined as W/m·K). The k-factor is roughly the reciprocal of the expression commonly used in the United States to describe the overall thermal resistance of a given material, or "R-factor," which is generally defined as having units of hr·ft$^2$·°F./BTU. The term R-factor is most commonly used in the United States to describe the overall thermal resistance of a given material without regard to the thickness of the material. However, for purposes of comparison, it is common to normalize the R-factor to describe thermal resistance per inch of thickness of the material in question or hr·ft$^2$·°F./BTU·in.

For purposes of this specification, the insulation ability of a given material will here and after be expressed only in terms of the IUPAC method of describing thermal conductivity, i.e., "k-factor." (The conversion of thermal resistance expressed in British units (hr·ft$^2$·°F./BTU·in) to IUPAC units can be performed by multiplying the normalized number by 6.9335 and then taking the reciprocal of the product.) Generally, aggregates having a vary low k-factor also contain large amounts of trapped interstitial space or air, which also tends to greatly reduce the strength of such aggregates. Therefore, concerns for insulation and strength tend to compete and should be carefully balanced when designing a particular mixed design.

The preferred insulating, lightweight aggregates include expanded or exfoliated vermiculite, perlite, calcined diatomaceous earth, and hollow glass spheres—all of which tend to contain large amounts of incorporated interstitial space. However, this list is in no way intended to be exhaustive, these aggregates being chosen because of their low cost and ready availability. Nevertheless, any aggregate with a low k-factor, which is able to impart sufficient insulation properties into the cementitious container, is within the purview of the present invention.

F. Air Voids.

Where insulation, not strength, is the overriding factor (whether it is desired to insulate hot or cold materials), it may be desirable to incorporate tiny air voids within the hydraulically settable matrix of the containers in addition to, or in place of, lightweight aggregates in order to increase the container's insulating properties. The incorporation of air voids into the cementitious mixture is carefully calculated to impart the requisite insulation characteristics without degrading the impermeability and strength of the container to the point of nonutility. Generally, however, if insulation is not an important feature of a particular product, it is desirable to minimize any air voids in order to maximize strength and impermeability while minimizing volume.

A matrix having air voids is generally utilized to manufacture containers for storing substances under low pressure unless utilized in conjunction with a coating, liner or a laminate to increase the strength and impermeability of the container. The coatings, liners and laminates which can be utilized with a matrix having air voids are discussed in greater detail below.

In certain embodiments, nonagglomerated air voids may be introduced by high shear, high speed mixing of the hydraulically settable mixture, with a foaming or stabilizing agent added to the mixture to aid in the incorporation of air voids. The high shear, high energy mixers discussed above are particularly useful in achieving this desired goal. Suitable foaming and stabilizing agents include commonly used surfactants. One currently preferred surfactant is a polypeptide alkylene polyol, such as Mearlcrete® Foam Liquid.

In conjunction with the surfactant, it may be necessary to stabilize the entrained material using a stabilizing agent like Mearlcel 3532®, a synthetic liquid anionic biodegradable solution. Both Mearlcrete® and Mearlcel® are available from the Mearl Corporation in New Jersey. Another foaming and stabilizing agent is vinsol resin. In addition, the rheology-modifying agent can act to stabilize the entrained air.

During the entrainment of air the atmosphere above the high speed mixer can be saturated with a gas such as carbon dioxide, which has been found to cause an early false setting and create form and foam stability of the hydraulically settable mixture. The early false setting and foam stability is thought to result from the reaction of $CO_2$ and hydroxide ions within the hydraulically settable mixture to form soluble sodium and potassium carbonate ions, which in turn can interact with the aluminate phases in the cement and accelerate the setting of the mixture.

Foam stability helps maintain the dispersion, and prevents the agglomeration, of the air voids within the uncured hydraulically settable mixture. Failure to prevent the coalescence of the air voids actually decreases the insulation effect, while greatly decreasing the strength, of the cured hydraulically settable mixture. Raising the pH, increasing the concentration of soluble alkali metals such as sodium or potassium, adding a stabilizing agent such as a polysaccharide rheology-modifying agent, and carefully adjusting the concentrations of surfactant and water within the hydraulically settable mixture all help to increase the foam stability of the mixture.

Air voids may alternatively be introduced into the hydraulically settable mixture by adding an easily oxidized metal, such as aluminum, magnesium, zinc, or tin into a hydraulic mixture that is either naturally alkaline, such as a cementitious or calcium oxide containing mixture, or one that has been made alkaline, such as those containing gypsum or another lower alkaline hydraulic binder. This reaction results in the evolution of tiny hydrogen bubbles throughout the hydraulically settable mixture. Adding a base such as sodium hydroxide to, and/or heating, the hydraulically settable mixture increases the rate of hydrogen bubble generation.

During the process of forming and/or hardening the hydraulically settable mixture, it is often desirable to heat up the hydraulically settable mixture in order to increase the volume of the air void system. Heating also aids in rapidly removing significant amounts of the water from the hydraulically settable mixture, thereby increasing the green strength of the formed product.

If a gas has been incorporated into the hydraulically settable mixture, heating the mixture to 250° C., for example, will result (according to the ideal gas equation) in the gas increasing its volume by about 85%. When heating is appropriate, it has been found desirable for the heating to be within a range from about 100° C. to about 250° C. More importantly, if properly controlled, heating will not result in the cracking of the matrix of the container or yield imperfections in the surface texture of the container.

In other applications, where viscosity of the hydraulically settable mixture is high, such as is required in certain forming processes, it is much more difficult to obtain adequate numbers of air voids through high shear mixing. In this case, air voids may alternatively be introduced into the hydraulically settable mixture by adding an easily oxidized metal, such as aluminum, magnesium, zinc, or tin into a hydraulic mixture that is either naturally alkaline (such as a hydraulic cement or calcium oxide containing mixture) or one that has been made alkaline (such as those containing gypsum or another alkaline hydraulic binder).

This reaction results in the evolution of tiny hydrogen bubbles throughout the hydraulically settable mixture. Adding a base such as sodium hydroxide to, and/or heating (as described below), the hydraulically settable mixture increases the rate of hydrogen bubble generation.

It may further be desirable to heat the mixture in order to initiate the chemical reaction and increase the rate of formation of hydrogen bubbles. It has been found that heating the formed product to temperatures in the range of from about 50° C. to about 100° C., and preferably about 75° C. to about 85° C., effectively controls the reaction and also drives off a significant amount of the water. Again, this heating process does not result in the introduction of cracks into the matrix of the formed product. This second method of introducing air voids into the matrix can be used in conjunction with, or in place of, the introduction of air through high speed, high shear mixing in the case of low viscosity hydraulic mixtures used in some forming processes.

Finally, air voids may be introduced into the hydraulically settable mixture during the forming process by adding a blowing agent to the mixture, which will expand when heat is added to the mixture. Blowing agents typically consist of a low boiling point liquid and finely divided calcium carbonate (talc). The talc and blowing agent are uniformly mixed into the hydraulically settable mixture and kept under pressure while heated. The liquid blowing agent penetrates into the pores of the individual talc particles, which act as points from which the blowing agent can then be vaporized upon thermal expansion of the blowing agent as the pressure is suddenly reduced.

During the forming process, the mixture can be heated while at the same time it is compressed. While the heat would normally cause the blowing agent to vaporize, the increase in pressure prevents the agent from vaporizing, thereby temporarily creating an equilibrium. When the pressure is released after the forming or extrusion of the material, the blowing agent vaporizes, thereby expanding or "blowing" the hydraulically settable material. The hydraulically settable material eventually hardens with very finely dispersed voids throughout the matrix. Water can also act as a blowing agent as long as the mixture is heated above the boiling point of water and kept under pressure of up to 50 bars.

Air voids increase the insulative properties of the hydraulically settable containers and also greatly decrease the bulk density and, hence, the weight of the final product. This reduces the overall mass of the resultant product, which reduces the amount of material that is required for the manufacture of the containers and which reduces the amount of material that will ultimately be discarded in the case of disposable containers.

G. Set Accelerators.

In some cases it may be desirable to accelerate the initial set of the hydraulically settable mixture by adding to the mixture an appropriate set accelerator. These include $Na_2CO_3$, $KCO_3$, $KOH$, $NaOH$, $CaCl_2$, $CO_2$, triethanolamine, aluminates, and the inorganic alkali salts of strong acids, such as $HCl$, $HNO_3$, and $H_2SO_4$. In fact, any compound which increases the solubility of gypsum and $Ca(OH)_2$ will tend to accelerate the initial set of hydraulically settable mixtures, particularly cementitious mixtures.

The amount of set accelerator which may be added to a particular hydraulically settable mixture will depend upon the degree of set acceleration that is desired. This in turn will depend on a variety of factors, including the mix design, the time interval between the steps of mixing the components and forming or extruding the hydraulically settable mixture, the temperature of the mixture, and the identity of the set accelerator. One of ordinary skill in the art will be able to adjust the amount of added set accelerator according to the parameters of a particular manufacturing process in order to optimize the setting time of the hydraulically settable mixture. The amount of set accelerator will be included in an amount less than 2% of the hydraulically settable binder by weight.

III. Forming the Sealable Liquid-tight, Thin-walled Containers.

There are many methods of forming the sealable, liquid-tight, pressure-tight and thin-walled containers of the present invention. One method involves the compaction of hydraulically settable materials into a desired shape and then hydrating the materials without substantial mechanical mixing of the materials and water. The other methods involve substantial mechanical mixing of the materials and water, and formation of the containers by either extrusion, molding or sheet formation. After the containers are formed through one of these methods the containers can be subjected to several other processing steps, such as heating, applying a coating or liner, and laminating the container.

The combination of hydraulic binders, aggregates, fibers, and (optionally) air voids results in a composition that can be formed into relatively thin-walled containers having roughly the same thickness as conventional containers. The compositions can readily be formed into the structural components of containers having a variety of shapes, including hollow body portions and closure means.

In order for the material to exhibit the best properties of high tensile strength, toughness, and insulation, the fibers can be unidirectionally or bidirectionally aligned or stacked according to the present invention, instead of being randomly dispersed, throughout the matrix. It is often preferable for the fibers to be laid out in a plane that is parallel to either of the two surfaces of the hydraulically settable sheet or container wall.

Such alignment of fibers can be achieved by any number of techniques such as by jiggering, ram-pressing, pull-trusion, hot pressing, extrusion, or calendering the hydraulically settable mixture. Generally, the fibers are oriented in the direction of the flow of material during the molding process. By controlling the flow patterns of the material during the molding process, it is possible to build a container having the desired fiber orientation.

These processes also result in near zero porosity in terms of relatively large, continuous and unwanted air pockets which usually occur during normal concrete manufacture. This greatly increases the compressive and tensile strengths of the hydraulically settable material and reduces the tendency of the matrix to split or tear when the container is exposed to external mechanical forces.

The undesirable discontinuities and voids in typical cementitious products should not be confused with the finely dispersed non-connected micro-pockets of air (or other gas) that may be intentionally introduced into the hydraulically settable matrix by the direct introduction of gas, the use of a high shear mixer, or the addition of reactive metals. Undesired voids or discontinuities are large and randomly dispersed, and offer little in terms of added insulative properties, while at the same time greatly reducing the integrity of the matrix and reducing its strength characteristics.

In contrast, the intentionally introduced gas bubbles or voids are generally uniformly and finely dispersed throughout the hydraulically settable mixture. These voids provide insulation while allowing sufficient strength and permeability of the material for use in making containers, particularly when utilized with coatings, liners and laminates.

It is generally possible to obtain acceptable levels of insulation while increasing the strength of the container by using lightweight aggregates which contain air voids. This allows for a stronger, more continuous hydraulically settable binder matrix holding the particles together.

In order for the hydraulically settable mixtures of the present invention to be effectively formed, it is important that the hydraulically settable composition be form stable in the green state; that is to say, the formed product must rapidly (preferably in three seconds or less) be able to support its own weight. Further, it must harden sufficiently that it can be quickly ejected from a mold. Otherwise, the cost of molding may make the process uneconomical. In addition, the surface of the formed article cannot be too sticky, as that would make it difficult to remove from the forming device, as well as to handle and stack the formed articles.

By altering the quantities of cement, water, aggregates, fibers, and rheology-modifying plasticizing agents, it is possible to control the rheology, or flow property, of the hydraulic paste. For example, when ram-pressing, jiggering or injection molding is used, it may often be preferable to start with a relatively highly viscous hydraulically settable mixture which will be highly form stable in the green state; the resulting molded product will then maintain its shape after being formed, even before being dried or hardened.

When extrusion, calendering, pull-trusion, or hot pressing is used, the hydraulically settable mixture is preferably less viscous and has a lower yield stress so that it will be more workable and flow easier. Because containers formed by these methods will usually be heated in order to remove much of the water in order to achieve a drier, more form stable product, it will not be necessary for the hydraulically settable mixture to have as high a yield stress or initial form stability as in other molding processes.

Nevertheless, even these less viscous hydraulically settable mixtures are able to achieve rapid form stability when heated, making the manufacturing processes using them commercially acceptable and capable of mass producing the products. This is important because the longer the product remains in the mold, the higher the cost of manufacturing in most cases.

Whether a more or less viscous hydraulic paste is required, it is generally desirable to include as little water as is necessary to impart the requisite rheology for a particular molding process. One reason for minimizing the water is to control the capillary action of the water in the hydraulically settable mixture, as this may cause stickiness of the hydraulically settable mixture, which in turn can cause problems in demolding the mixture from the mold. Minimizing the amount of water eliminates the free water and reduces the chemical and mechanical adherence of the material to the mold. Hence, the capillary action and related surface tension of the water should be minimized if possible in order for there to be quick release of the hydraulically settable mixture during the molding process.

Furthermore, the resulting hydraulically settable products are stronger if less water is used. Of course, adding more water initially will require that more water be removed from the hydraulic mixture during the drying or hardening process, thereby increasing manufacturing costs.

In order to obtain a hydraulically settable mixture having the appropriate properties of workability and green strength, it is important to adjust the water content in combination with the use of a rheology-modifying agent and, optionally, a dispersant within the hydraulically settable mixture. As discussed above, there are a variety of suitable rheology-modifying agents.

The rheology-modifying agent increases the yield stress and makes the mixture more plastic so that it can be deformed and molded and then maintain its shape upon release of the molding pressure. This allows the molded product to withstand forces such as gravitational forces (that is, it can support its own weight without external support) as well as forces involved in demolding the product from the mold and subsequent handling of the container before it has become substantially hardened.

There are several modifications to conventional molding processes which are preferably employed in order to ease the manufacturing process. For example, it is frequently desirable to treat the mold with a releasing agent in order to prevent sticking. Suitable releasing agents include silicon oil, Teflon®, Deleron®, and UHW®. Preferably, the mold itself will be made of stainless steel and/or coated with a material having a very slick finish, such as Teflon®, Deleron®, or chrome plating polished to about 0.1 RMS.

The same effect can be achieved from the use of frictional forces. By spinning the head of the molding apparatus against the interior and/or exterior surfaces of the cementitious material, any chemical and mechanical adherence (i.e., stickiness) to the mold can be overcome.

During the process of forming and/or curing the cementitious mixture, it is often desirable to heat up the cementitious mixture in order to control the air void system by allowing for proper control of the porosity and the volume in the container. However, this heating process also aids in making the cementitious mixture form stable in the green state (immediately after forming) by allowing the surface to gain strength quickly. Of course, this heating aids in rapidly removing significant amounts of the water from the hydraulically settable mixture. The result of these advantages is that the use of the heating process can ease the manufacturing of the containers.

If a gas has been incorporated into the hydraulically settable mixture, heating that mixture to 250° C. will result (according to the gas-volume equation) in the gas increasing its volume by about 85%. When heating is appropriate, it has been found desirable for that heating to be in the range from about 100° C. to about 250° C. More importantly, when properly controlled, heating will not result in the formation of cracks within the matrix of the container or imperfections in the surface texture of the container.

In fact, the process of adding $CO_2$ gas to the hydraulically settable mixture during the molding process can help the molded product to quickly gain stability. From the foregoing disclosure, it will be apparent that this can be accomplished by the addition of a $CO_2$ gas or $CO_2$ generating material, such as an easily oxidized metal like zinc or aluminum, wherein the $CO_2$ generating process can be accelerated by the addition of a base and/or heat.

A. Powder Compaction of the Hydraulically Settable Materials.

The matrix can be designed to be very dense utilizing powder compaction techniques as set forth in detail in co-pending application Ser. No. 07/981,615, entitled "Methods of Manufacture and Use For Hydraulically Bonded Cement" filed Nov. 25, 1992, in the names of Hamlin M. Jennings, Ph.D., Per Just Andersen, Ph.D., and Simon K. Hodson, which issued as U.S. Pat. No. 5,358,676, and which was previously incorporated by specific reference.

Powder compaction employs the manipulation and positioning of hydraulically settable binders into a desired configuration before hydrating the hydraulically settable binders with water. The hydraulically settable binder compositions are hydrated without substantial mechanical mixing of the hydraulically settable binder and water.

The benefit of positioning the powdered hydraulically settable binder into a desired configuration prior to hydration is that aggregates may be placed within the matrix of the container without subjecting the aggregates to hostile and damaging mixing forces usually associated with forming a hydraulically settable paste.

After the powdered hydraulic cement has been deliberately positioned into a predetermined configuration, the hydraulically settable binder is hydrated. Hydration is accomplished by diffusion of water (both gaseous and/or liquid) into the preconfigured container. Utilizing high pressures, the water is able to successfully penetrate the preconfigured container and chemically react with the hydraulically settable binder. The hydration may be in an autoclave which is a useful vessel for altering pressure and temperature to conveniently control the hydration condition. Additionally, carrier gases may be utilized which aid the process.

There are a number of different processing techniques capable of deliberately positioning the powdered hydraulically settable binder particles prior to hydration in the shape of a container structural component. The cement processing techniques suitable for such use include modified and adapted solids processing techniques, such as pressure compaction processes, slip casting, plastic forming processes, vibratory packing processes, warm pressing and pneumatic-mechanical impaction.

Dry pressing is a pressure compaction process consisting of compacting powders between die faces in an enclosed cavity. Slip casting processes are particularly useful for manufacturing thin-walled containers. These processes involve shaping the container structural component by casting a liquid suspension of the powdered hydraulically settable binder in a porous mold. Water is utilized in the suspension which is poured into a porous mold. The mold draws the liquid from the slurry and builds up a deposit of particles on the mold wall. Drying the slurry allows the article to shrink for easier release with an appropriate water content. The remaining slurry is poured out of the mold resulting in an article having an outer configuration which reproduces the inner configuration of the mold.

Additionally, continuous isostatic pressing can be utilized to form tubes from the hydraulically settable materials to be utilized as the sidewalls of a container. Continuous isostatic pressing involves the compression of a mixture within a chamber toward a die and compression in a direction normal to the flow towards the die. The die is configured to create a tube. Continuous isostatic presses can be obtained from H ändle of Germany.

In a powder compaction process, internal lubricants may be added to impart plasticizing effect. After the mixture has been plasticized, it may be manipulated by conventional plastic forming processes such as extrusion, jiggering, wet pressing, and injection molding. Vibratory packing and pressing processes utilize vibrations with a suitable amplitude and can result in 100% of theoretical packing density which is the highest conceivable packing density achievable with a given powder size distribution.

Aggregates commonly utilized in the cement industry are utilized with the powdered hydraulically settable binder prior to hydration. It is preferable to include a plurality of differently sized aggregates capable of filling interstices between the aggregates and the powdered hydraulically settable binder so that greater density can be achieved. The other mixture components may also be mixed with the powdered hydraulically settable binder prior to hydration.

The density of the resulting container can be decreased by utilizing lightweight aggregates with the powdered hydraulically settable binder. Additionally, the density of the resulting container can be decreased by compressing powdered hydraulically settable binder with a solid material, such as ice, dry ice, frozen aqueous solutions, or certain salts which will later melt, volatilize, evaporate, or dissolve leaving voids in the final container.

The result of these compaction techniques is the manufacture of container structural components which have high tensile strength and have a low porosity. The components formed by this process may be subjected to heating, the use of coatings, liners and laminates, printing and assembly.

It is within the scope of this invention to utilize powder compaction in conjunction with the other methods disclosed for forming the structural components of the container. For example, it may be desirable to form a hollow body portion of a container by a powder compaction technique and form the closure means for the same container by a molding technique. Additionally, it is within the scope of this invention to utilize powder compaction techniques to form laminates with multiple layers formed from hydraulically settable materials and with other materials. An example of such a use is laminating a hydraulically settable sheet around a hollow body portion formed by powder compaction.

B. Mechanical Mixing of the Hydraulically Settable Materials.

The mixing system used to prepare the hydraulically settable material used for forming the containers of the present invention includes a mixer, a handler, and an extruder system. The materials are loaded into a hopper where they are metered by weight and fed into a mixer for the creation of a hydraulically settable mixture. As previously discussed, the hydraulically settable mixture is microstructurally engineered to have certain desired properties. Consequently, the metering of the bulk materials is regulated to ensure proper proportioning according to design specifications of the hydraulically settable mixture.

The mixing method is substantially the same for containers formed by molding, from pre-formed dry sheets and by extrusion. The composition of the mixtures will, however, vary. After the mixtures are properly blended, the mixtures can be utilized to form the containers by any of the above methods.

A method of preparing the desired mixture includes the steps of (a) mixing a powdered hydraulically settable material and water in order to form a paste or mixture and optionally utilizing a dispersant; (b) blending a fibrous material (such as cellulose fiber or from other sources such as glass, plastic, or metal) into the paste under high shear energy mixing to form a mixture in which the fiber is well dispersed; (c) adding a rheology-modifying agent (such as methylhydroxyethylcellulose) to the mixture such that the resultant mixture develops a more plastic-like rheology; and (d) combining one or more aggregates into the mixture under normal low shear energy mixing so as to impart the desired properties to the mixture. In alternative embodiments, other additives such as air entraining agents and reactive metals can be incorporated into the mixture so as to obtain a mixture with desired properties. The amount of water included in the mixture has an effect on the time duration necessary for mixing the components under high shear mixing. Mixtures with low amounts of water typically require longer mixing periods than mixtures with high amounts of water.

High shear energy mixing is used for the addition of fibrous material to insure that the fibrous materials are well dispersed throughout the mixture. This results in a more uniformly blended mixture, which improves the consistency of the uncured mixture as well as increasing the strength of the final cured product.

The addition of fibrous materials by normal cement mixing techniques results in the conglomeration of the fibrous materials, leading to deformities in the resulting containers or articles. Standard mixers, such as drum mixers, combine the components of the desired mixture by applying low energy stirring or rotating to the components. In contrast, high shear energy mixers are comparable to heavy duty blenders and are capable of rapidly blending the mixture so as to apply high shearing forces on the particles of the hydraulically settable materials and the added fibrous materials without damaging the fiber. As a result, the fibrous materials are uniformly dispersed throughout the mixture, thereby permitting a homogenous structure for the subsequent containers. Fine particulate aggregates of relative high strength, such as sand, silica, or alumina, can also be blended using a high speed mixer. Plasticizers, surfactants, and stabilizers can also be added.

Nevertheless, in the case of lightweight aggregates such as perlite, pumice, or exfoliated rock, it is usually best to use a low speed mixer to avoid breaking the aggregate into a powder. In addition, the flocculation of the hydraulically settable mixture using Tylose® is usually performed under low shear mixing conditions.

In one embodiment, the materials utilized in the mixture are automatically and continuously metered, mixed, deaired and extruded by a twin auger extruder apparatus. A twin auger extruder apparatus has sections with specific purposes such as low shear mixing, high shear mixing, vacuuming and pumping. A twin auger extruder apparatus has different flight pitches and orientations enabling the sections to accomplish their specific purposes. It is also possible to premix some of the components in a vessel, as needed, and pump the premixed components into the twin auger extruder apparatus. The preferable twin auger extruder apparatus utilizes uniform rotational augers wherein the augers rotate in the same direction. Counter rotational twin auger extruders, wherein the augers rotate in opposite directions, accomplishes the same purposes. A pugmil may be utilized as well for the same purposes.

In another embodiment, a cement mixer capable of both high and low shear mixing, such as the RV-11 mixer, available from EIRICH of Germany, is used to meter and mix the materials in a batch mode. A simple mixer can typically supply mixed hydraulically settable mixtures for downstream production lines used to form the containers. The mixer can handle up to 13 cubic feet of material per batch and, assuming a six minute mix cycle, is capable of producing 4,000 pounds of hydraulically settable mixture per hour assuming 31 pounds per cubic foot.

In an alternative embodiment, high energy mixers described in U.S. Pat. No. 5,061,319 entitled "Process for Producing Cement Building Material", U.S. Pat. No. 4,944, 595 entitled "Apparatus for Producing Cement Building Material", U.S. Pat. No. 4,552,463 entitled "Method and Apparatus for Producing a Colloidal Mixture" and U.S. Pat. No. 4,225,247 entitled "Mixing and Agitating Device" which were previously incorporated here in by specific reference, can be used for mixing the hydraulically settable mixture. High shear energy mixtures within the scope of these patents are available from E. KHASHOGGI INDUSTRIES in Santa Barbara, Calif.

The internal components of the mixer are generally carbide hard coated for extended life, thereby resisting the abrasion expected from the aggregates and cement. The mixtures, however, within the scope of the present invention result in less abrasion than many hydraulically settable mixtures due to the low pressure utilized in processing and also due in part to the excess water that provides a high degree of lubrication when any pressure is applied.

C. Methods for Manufacturing the Containers from Mechanically Mixed Hydraulically Settable Materials.

The processed hydraulically settable mixture is utilized to form the structural components of the containers. The primary structural components are the hollow body portion and the closure means. After the structural components have been formed, further processing may be necessary before the structural components are assembled into a container.

Several different methods of manufacturing the structural components of containers from hydraulically settable mixtures are within the scope of the present invention. The containers can be formed by utilizing various combinations of these different methods which enhances the ability to design a variety of containers with desirable properties. Manufacturing containers from hydraulically settable materials through these methods enables the optimization of the rheology of the mixture through the forming process selected and permits handling of the formed container shortly after forming due to the level of form stability.

The methods of manufacturing can be categorized into three broad groups: formation by molding, formation from dry sheets, and formation by extrusion. Formation by molding usually requires deairing of the mixture before the step of actually forming the mixture into a container. Deairing the mixture can be accomplished by extruding the mixture. Consequently, the mixture may be extruded before it is molded. Similarly, deairing is usually a step in forming sheets from the mixture for use in manufacturing containers.

To deair the mixture after the mixing process, the hydraulically settable mixture is extruded through a conventional piston extruder, which extrudes the hydraulically settable mixture through a die. The shape of articles extruded from the mixture is determined by the cross-sectional shape of the die. The shape of the die should be configured to minimize the specific surface area of the extruded mixture, thereby minimizing the entrapment of air. It is desirable to minimize the entrapment of air to avoid creating a defective or non-homogenous matrix. As discussed in more detail below, according to the present invention, the mixture is extruded into articles having a variety of shapes, such as cylindrical plugs, flat sheets and hollow cylindrical tubes. The shape of the extruded articles depends on which embodiment of the container is being produced and whether the extruded article was formed as a preparatory step to formation of the containers by molding or from hydraulically settable sheets.

The amount of pressure applied in extruding the mixture depends on several factors. High pressure extruding can assist in the production of high strength containers. Typically, the lower the concentration of water the greater the strength of the extruded article. However, as the concentration of water decreases, the workability of the mixture also decreases. In part, this is because there is no longer sufficient water to surround the particles and reduce their friction forces. Accordingly, the mixture becomes more difficult to position and shape.

When high pressures are applied to hydraulically settable mixtures with low concentration of water, the space between the particles is decreased. As these interstitial spaces decrease, the water existing within the mixture becomes more effective in encasing the particles and reducing their frictional forces. Accordingly, as pressure is applied to a mixture, the mixture becomes more fluid or workable and, thus, less water needs to be added. In turn, the decrease in the concentration of water, increases the strength of the resulting product. In application to the present invention, the higher the pressure exerted by the extruder, the lower the amount of water that needs to be added to the mixture to make it workable. Also, internal lubricants can be added to ease extrusion even when very dry, similar to the use of such lubricants in powder compaction.

Although high pressures are generally desirable, they also have a negative effect in the production of lower bulk density containers, lightweight containers and containers capable of insulation. To produce a lightweight article, low density aggregates (such as perlite or hollow glass spheres) are typically added to the mixture. As the pressure exerted by the extruder is increased, these aggregates are crushed, thereby increasing the density of the aggregate and the density of the resulting container. Crushing the aggregate also decreases the insulating effect of the aggregates since they no longer contain air pockets.

In the preferred embodiment, a negative pressure is applied to the mixture before it is extruded into a container. This can be accomplished by either attaching a vacuum to the extruder or by a conventional vacuum auger which can be used to feed the mixture to the extruder. This negative pressure removes air trapped in the mixture. Failure to remove such air can result in the extruded article having a defective or non-homogenous structure matrix. However, in some embodiments, a uniform dispersion of small air voids in the mixture may be desirable; and, thus, the negative pressure is not needed.

Trapped air can, however, be an effective means of insulating; consequently, certain mixtures may be designed to include entrained air at a certain percentage. Accordingly, a formed article having trapped air pockets positioned within its walls can have a lower K-factor.

It will be understood that the extrusion of hydraulically settable binder through the die will tend to unidirectionally orient the fibrous materials of the hydraulically settable mixture so that they are substantially planar, or parallel to, the extrusion flow direction.

The structural components of the container can be formed directly by the extrusion process. The die configuration can be altered to create the structural components of the containers. The primary structural components are the hollow body portion and the closure means. The hollow body portion has sidewalls, an open end and a bottom portion. By altering the die configuration, for example, a tube can be formed for the sidewalls of the hollow body portion and a cylindrical disk can be formed to be utilized as the bottom portion. The extruded tube can be reinforced by continuous fibers or filament winding utilizing such fibers as Kevlar, polyaramite, glass fibers, carbon fibers and cellulose fibers.

Additionally, the die configuration can be altered to extrude a sheet which can be convoluted while in the green state to form the sidewalls of the hollow body portion. More specifically, the extruded sheet forms the sidewalls by cutting the extruded sheet into a desired length and width such that the sheet has longitudinal ends and transverse ends, applying an adhesive to the transverse ends and overlapping the transverse ends of the sheets.

1. Formation of Structural Components by Molding.

A variety of possible molding approaches can be used in the manufacturing of the containers of the present invention, such as: injection molding, direct molding, wet sheet molding, dry sheet molding and blow molding. The containers can be formed by conventional molding processes known in the art of molding, utilizing such devices as split molds, multiple parting, progressive dies and multi-cavity molds.

Most molding systems, however, are utilized with thermoforming materials such as plastic while the hydraulically settable materials of the present invention are thermosetting. Thermoforming entails shaping a heated material and allowing it to cool, while thermosetting entails shaping a material and allowing it to cure. The processes and equipment utilized within the scope of this invention are modified on the basis of this distinction. Additionally, the molding processes and equipment are modified to allow chemical activation of the hydraulically settable simultaneously or following forming. Another modification is the use of less pressure in forming containers from hydraulically settable materials than is necessary in forming containers from convention materials. Less pressure is needed due to the free flowing nature of the hydraulically settable materials resulting from the high amount of water in the mixture.

Before molding, however, the hydraulically settable mixture must first be mixed and rheologically prepared into the desired consistency in preparation for the molding process. Extrusion of the hydraulically settable mixture is desirable because certain extruders can be utilized as a continuous metering, mixing and deairing device that enhances the ability to alter many different properties of the mixture and the final product.

2. The Injection Molding and Direct Molding Processes.
   (a) Positioning.

After the hydraulically settable mixture has been prepared as discussed above, the next step in the injection molding and direct molding processes is positioning the hydraulically settable mixture between a set of dies for subsequent shaping of the hydraulically settable container. The dies comprise a male die having a desired shape and a female die having a shape substantially complementary to that of the male die. Accordingly, as the hydraulically settable mixture is pressed between the dies, the hydraulically settable mixture is formed into a container having the complementary shape of the dies.

Injection molding utilizes a vacuum auger to inject or feed the hydraulically settable mixture between the dies. The vacuum auger applies a pressure differential to the hydraulically settable mixture as the mixture is being transferred for positioning between the dies. This pressure differential removes air trapped in the hydraulically settable mixture. Failure to remove such air (unless the air is desired to create void to impart insulative characteristics) can result in the container having a defective or nonhomogeneous structure matrix.

Injection molding can also utilize an extruder positioned to move towards the molding apparatus in a piston action, extrude into the molding apparatus and then move away from the molding apparatus. This arrangement can be useful for extruding and molding at different temperatures to avoid plugging the extruder with a mixture that has hardened due to the heat of the molds. The piston action of this apparatus minimizes the heat transfer from the mold to the extruder and results in a safe manner of production.

After the mixture has been extruded, the processing of the mixture under injection molding and direct molding both involve positioning the hydraulically settable mixture between the male die and the female die. The male die is partially inserted into the female die such that a gap distance is created between the dies. The "gap distance" is defined as the distance one die must travel with respect to the other die for mating of the dies. The dies are "mated" when they are inserted into one another so as to form a mold area between the dies. The "mold area" defines the desired shape of the container and is the area that the hydraulically settable mixture is pushed into when the dies are mated.

When the dies are positioned so as to have a gap distance, a cavity remains between the dies. This cavity comprises the mold area between the dies, and a second area also between the dies which corresponds to the gap distance. Once the cavity is formed, the hydraulically settable mixture can be positioned into the cavity, and thus between the dies, by being injected through a hole in one of the dies or through the gap distance.

In the preferred embodiment, the female die is positioned vertically above the male die. The hydraulically settable mixture is then injected between the dies through an injection port extending through the female die. The arrangement of having the female die above the male die is preferred since once the hydraulically settable container is formed and the dies are separated, the force of gravity assists in insuring the hydraulically settable container remains on the male die. This is beneficial as it is easier to subsequently remove the container from the male die without deforming the container.

Before positioning the hydraulically settable mixture, it is preferable to minimize the gap distance between the dies so as to limit the movement of the hydraulically settable mixture during the final pressing or mating of the dies. Minimizing the movement of the mixture decreases the chance of irregularities in the final container as a result of differential flow in the hydraulically settable mixture.

The gap distance between the male die and the female die is typically in a range of about 2 mm to about 5.0 cm, with 2 mm to about 3 cm being preferred and 2 mm to about 1 cm being most preferred. It should be noted, however, that for unusually large objects, the gap distance may be much larger to facilitate positioning of the hydraulically settable mixture.

Another method of positioning the hydraulically settable mixture between the dies is performed while the dies are still fully separated. The method comprises forming a portion of the hydraulically settable material into a mass, the portion being sufficient to create the container, then placing the mass between the dies, typically by resting the mass on the top of the male die. Subsequently, as the dies are mated, the mass is pressed between the dies.

In an alternative embodiment, a template is used to position the hydraulically settable mass. In this embodiment, the male die has a base with a circumference; and the template has a passage with a perimeter substantially complimentary to the circumference of the base of the male die.

The method comprises forming a portion of the hydraulically settable mixture into a mass having a diameter sufficiently large to span the passage of the template. The mass is then placed on the template so as to span the passage. Finally, the template is placed between the male die and the female die such that the passage is complementarily aligned with the dies. Thereby, as the dies are pressed together, the male die travels through the passage of the template in order to press the hydraulically settable mixture between the dies.

The above method can further include the step of depositing the template onto the male die such that the template becomes positioned about the base of the male die while the mass independently rests on the male die. Subsequently, as the dies are pressed together, the mass is again pressed between the dies. Additional benefits relating to the use of the template will be discussed hereinafter with respect to the step relating to removing the container from the dies.

The containers shown in FIGS. 1, 2, 7, 8 and 11 all have structural components which are produced through a molding process involving either injection molding or direct molding. In FIG. 1, for example, the container is formed by molding the individual components of the container shown generally at 10, namely, the hollow body portion 12, the top 24 and the cap 26. A separate set of molds is required for each individual component.

To integrally form the hollow body portion 12 depicted in FIG. 1, an extruded plate or plug is preferably positioned on top of the male mold. The male mold part rises and lifts the mixture upwards and into a female split mold. The coupled male and female molds form the extruded plate-like article into the desired shape. The male mold is maintained at a cooler temperature than the female mold to ease the release of the molded component. The male mold can have a temperature within the range from about 85° C. to about 120° C. The female mold preferably has a temperature within the range from about 140° C. to about 150° C. The temperature differential between the female and male molds is preferably around 10° C. Due to the external threads 22 around the outer periphery of the open end 20 of hollow body portion 16, a split female mold is necessary to achieve release of the hollow body portion from the female half of the mold.

Top 24 and cap 26 are formed through a similar molding process, except that the female mold halves must be split and the male mold must collapse in order to achieve release due to the threaded configurations of these components. Such devices as split molds, multiple parting molds, multi-cavity and progressive dies are among many commonly utilized techniques in the molding art to achieve the negative release of components having such threaded configurations, as well as for other complex configurations.

(b) Forming and Molding.

The next step in the manufacturing process is pressing the hydraulically settable mixture between the male die and the female die in order to mold the hydraulically settable mixture into the desired shape of the hydraulically settable container.

The pressure exerted by the dies forms the hydraulically settable mixture into the desired configuration for the container. Accordingly, the pressure must be sufficient to actually mold the hydraulically settable mixture between the dies. Furthermore, it is preferable that the pressure be sufficient to produce a container with a uniform and smooth finished surface.

The amount of pressure applied to the hydraulically settable mixture also affects the strength of the resulting container. Research has found that the strength of resultant product is increased for mixtures where the cement particles are close together. The greater the pressure used to press the cement mixture between the dies, the closer together the cement particles are pushed, thereby increasing the strength of the resulting container. That is to say, the less porosity that there is in the hydraulically settable mixture, the higher the strength of the resulting product.

As high pressures are applied to hydraulically settable mixtures with low concentration of water, the space between the particles is decreased. Thus, the water existing within the mixture becomes more effective in encasing the particles and reducing their friction force. In essence, as pressure is applied to a hydraulically settable mixture, the mixture becomes more fluid or workable and, thus, less water needs to be added. In turn, the strength of the resulting product is increased. In application to the present invention, the higher the pressure exerted by the dies, the lower the amount of water that needs to be added to the mixture.

Although a high pressure is generally desirable, it also has a negative effect. To produce a lightweight hydraulically settable container, low density aggregates (such as perlite or hollow glass spheres) are typically added to the mixture. As the pressure exerted by the dies is increased, these aggregates may be crushed, thereby increasing the density of the aggregate and the density of the resulting container, while decreasing the insulative effect of the aggregates.

Accordingly, the pressure applied by the dies should be optimized so as to maximize the strength, structural integrity, and low density of the hydraulically settable container. Within the present invention, the pressure exerted by the male die and the female die on the hydraulically settable mixture is preferably within a range from about 50 psi to about 100,000 psi, more preferably from about 100 psi to about 20,000, and most preferably from about 150 psi to about 2000 psi. However, as discussed below, the amount of pressure will vary depending upon the temperature and time of the molding process. Additionally, containers with a deep draw generally require an increase in velocity to decrease the time necessary for pressing. The time must be decreased to maintain the necessary flow without drying the material prematurely.

The step of pressing further includes expelling the air from between the dies when the dies are pressed together. Failure to remove such air can result in air pockets or deformities in the matrix of the hydraulically settable container. Typically, air between the dies is expelled through the gap distance between the dies as the dies are pressed together.

In an alternative embodiment, the dies may have a plurality of vent holes extending through the dies so as to make them permeable. Accordingly, as the dies are pressed together, the air between the dies is expelled through the vent holes. The vent holes thus prevent air pockets from forming within the cavity which could deform the hydraulically settable container.

The vent holes also prevent the creation of a vacuum within the cavity as the dies are separated, by allowing air to return into the cavity. Such a vacuum could exert an undue force on the newly formed hydraulically settable container, thereby disrupting its structural integrity. Furthermore, vent holes permit the escape of excess steam created during the heating process which will be discussed later. The vent holes can exist in either or both of the dies.

(c) Heating and Form Stability.

The next step in the manufacturing process is heating the hydraulically settable mixture for a sufficient period of time to impart form stability to the hydraulically settable container. The preferred method for heating the hydraulically settable mixture comprises heating the male die and the female die each to a respective temperature before pressing the hydraulically settable mixture.

Increasing the temperature of the dies prior to the pressing step serves several functions. For ease in molding the hydraulically settable mixture into a container without crushing the aggregate, an excess of water is added to the mixture. By applying heated dies to the mixture, a portion of the water in the hydraulically settable mixture evaporates in the form of steam, thereby decreasing the volume percent of water and, thus, increasing the ultimate strength of the container.

Furthermore, as the water on the surface of the container evaporates, that portion of the hydraulically settable mixture rapidly becomes dry. The friction forces between the dry particles in the hydraulically settable mixture forms a strong thin "shell" around the container which provides the hydraulically settable container with form stability.

The application of heat to the hydraulically settable mixture also increases the rate of curing. As is discussed below, however, the dies remain pressed on the hydraulically settable mixture for such a short period of time that only a fraction of the hydraulically settable mixture reacts to become cured. A substantial amount of strength required for form stability is thus a result of the friction forces and adhesion between the dry particles, as well as internal capillary forces. As a result, the container is still in the green state even after achieving form stability.

The ability to rapidly impart form stability to the hydraulically settable container in the green state is important as it permits mass production of the containers. Form stability allows the containers to be quickly removed from the pressing apparatus so that new containers can be formed using the same pressing or molding equipment.

Another purpose for increasing the temperature of the dies is to minimize adherence of the hydraulically settable mixture to the dies. As the steam is emitted from the hydraulically settable mixture, it creates a boundary layer between the dies and the hydraulically settable mixture. This boundary layer provides a substantially uniform force that pushes the hydraulically settable mixture away from the die and, thus, prevents the hydraulically settable mixture from sticking to the dies.

Furthermore, experiments have determined that if the male die and female die have a variance in temperature, the hydraulically settable material will have a tendency to remain on the die with the lower temperature when the dies are separated. Accordingly, one can select the die on which the hydraulically settable container is to remain on as the dies are separated, by having the desired die have a lower temperature.

The respective temperatures of the dies are important to maximizing the speed of the manufacturing process and are dependent, in part, upon the duration that the dies are in contact with hydraulically settable material. In general, it is desirable that the temperature be as high as possible—the higher the temperature, the faster the drying on the surface containers, the quicker the containers can be removed, and the more containers that can be made per unit time.

The problem with higher temperatures, however, is that if the hydraulically settable mixture becomes too hot, the water throughout the hydraulically settable mixture, as opposed to just on the surface of the containers, turns to steam. The sudden release in pressure associated within demolding can result in the cracking, or even explosion, of the molded container once the dies are separated. (However, this cracking can often be solved by faster closing and opening speeds of the press.)

Moreover, the faster the hydraulically settable material cures, the greater the likelihood of a deformity forming within the hydraulically settable container as a result of differential flow. That is, as the dies are pressed together, the hydraulically settable material flows into the desired shape. However, once the hydraulically settable mixture on the surface of a container starts to dry, the drier cement has different flow properties than the remaining wet hydraulically settable material. This differential in flow properties can result in deformities such as agglomerates, voids, cracks, and other irregularities in the matrix of the hydraulically settable container.

Accordingly, the interrelationship between time and temperature is that the temperature of the dies can be increased as the time that the dies are in contact with the hydraulically settable mixture is decreased. Furthermore, the temperature can be increased as the gap distance between the dies is decreased. However, there are limits to how high the temperature can go before the hydraulic mixtures become damaged.

To achieve the above desired objectives, it is preferable to heat the female and male die to a temperature within the range from between about 50° C. to about 200° C., more preferably to between about 75° C. to about 160° C., and most preferably to between about 120° C. to about 140° C. For reasons previously discussed, it is desirable to have the hydraulically settable container remain on the male die after separation of the dies. Accordingly, the male die preferably has a lower temperature than the female die. The temperature variance between the female die and male die should preferably be in the range from about 10° C. to about 30° C.

The duration in which the heated male die and the heated female die are both in contact with the hydraulically settable material (i.e., the time that the dies are mated) is preferably within the range from about 0.05 seconds to about 30 seconds, more preferably between about 0.7 seconds to about 10 seconds, and most preferably between about 0.8 seconds to about 5 seconds.

In an alternative embodiment, the step of heating the hydraulically settable container further includes exposing the hydraulically settable container to heated air after the dies are separated, but before the container is removed from the die, that is, while the hydraulically settable container is supported on the male die. Exposure to heated air insures that the container is form stable before it is removed from the die.

In another alternative embodiment, the step of heating the hydraulically settable mixture can be accomplished by exposing the hydraulically settable mixture to microwaves, x-ray waves and infrared waves.

(d) Removing.

After the molded article has achieved some form stability, the newly formed hydraulically settable container is removed from the dies. In the preferred embodiment, when the dies are separated, the newly formed hydraulically settable container remains on the male die. In one embodiment, the male die and the female die are rotated as they are separated so as to prevent the hydraulically settable container from adhering to the dies.

Once the dies are separated, heated air can be blown over the container for a few seconds (as previously discussed) to further increase form stability. The hydraulically settable container can then be removed from the male die without deformation. In the preferred embodiment, a standard process known as airveying is used to remove the hydraulically settable container from the male die. Airveying is a process in which a negative pressure is applied to the container for sucking the container from off the die. The container then travels through a "U" shaped tube that deposits the container right side up.

The airveying process is preferable due to its gentle handling of the form stable containers and its low operating and capital costs. Heating air which is present to dry containers may be used to provide the bulk air transport carrying the containers through the length of the tubes. The air ducts are simply ports in the male die through which air can be injected to provide a uniform force to push the container off the male die. Such air ducts have substantially the same size, shape, and position as the vent holes previously discussed.

In one embodiment, the air ducts and vent holes may be one and the same. The air inserted in the air ducts must be low enough not to damage the containers. It is envisioned in the preferred embodiment that air ducts are located on the male die to help eject the containers from the male die and into the tubes.

In an alternative embodiment, the hydraulically settable container can be mechanically removed from the male die by simply picking up the container. Such a process, however, requires exceptional care so as not to deform the container. The preferred method for mechanically removing the hydraulically settable container incorporates using a template.

The template is circumferentially located at the base of the male die and is removable. The hydraulically settable container is loaded onto the template via the lip of the hydraulically settable container by either lifting the template or lowering the male die. When the container is removed from the dies, the container is form stable due to its dried surface. However, the container will still have green cement between its walls and, thus, it will not have reached its maximum strength. In such a condition, the hydraulically settable container is strongest in compression along its vertical axis. Accordingly, the benefit of using the template is that the force applied for removing the container is applied along the strongest axis of the container, thereby minimizing possible deformation to the container.

(e) Initial Hardening.

Once molded, the hydraulically settable mixture is allowed to harden in the desired shape of the hydraulically settable container. To economically produce the inventive container, it must be rapidly hardened to a point where it has sufficient strength to be packaged, shipped, and used without substantial deformation.

Hardening of the container may be accomplished by exposing the container to heated air, such as in a conventional tunnel oven. The application of the heated air drives off a portion of the water in the hydraulically settable mixture, thereby increasing the friction forces between the particles and, thus, increasing the strength of the resulting container. Furthermore, the application of heated air to the containers increases the reaction rate of the cement, which provides early strength to the container through curing. Accordingly, hardening results from both an increase in the friction forces between the particles and curing of the hydraulically settable mixture.

In the preferred embodiment, the container is hardened only to the extent that it has sufficient strength for packaging and transport without deformation. Ideally, the hardened container retains a small amount of unreacted water that permits the container to continue to cure, and thus increase in strength, during the period of time it is transported and stored prior to use.

In yet another embodiment, the air is blown over the container to increase the rate at which the hydraulically settable mixture dries, thereby increasing the rate of hardening.

Also, the air can be applied through an autoclave capable of regulating the humidity, pressure, and temperature in the environment in which the container is cured. Increasing the humidity and temperature assists in producing more complete hydration of the hydraulically settable mixture, thereby producing a stronger and less permeable container.

In any event, the temperature in the runnel oven should preferably not exceed 250° C. in order to prevent cracking of the hydraulically settable matrix or the destruction of fibrous or plastic additives. Preferred temperatures might range between 20° C. and 250° C., more preferably between 30° C. and 200° C., and most preferably between 20° C. and 250° C.

The dwell time within the runnel oven depends on the temperature in the tunnel, as well as the thickness of the structural components to be dried. In the case of a structural component 1 mm thick and a drying tunnel temperature of 200° C., the structural component will preferably remain within a tunnel oven for a period of 45 seconds.

In summary, the following conclusions can be drawn with respect to the drying of the hydraulically settable product:

1) The higher the temperature, the shorter the drying time.
2) The higher the air speed, the shorter the drying time.
3) Once a majority of the water is removed from a container, exposing the container to temperatures above 250° C. will burn the fibers in the mixture, thereby decreasing tensile strength of the fibers and containers.
4) The thinner the material wall of the container, the shorter the drying time.
5) The higher the temperature, the lower the tensile strength of the container.
6) Air speed and total time in the oven have less effect on the tensile strength of the container.

3. The Wet Sheet Molding Process.

(a) Extrusion.

Once the hydraulically settable mixture has been properly blended, it is then transported to the extrusion apparatus by means of batch transfer conveyor system. The hydraulically settable mixture is formed into sheets of precise thickness by first extruding the material through an appropriate extruder die and then passing the extruded material through one or more pairs of reduction rollers.

Within the interior chamber, an auger screw exerts forward pressure on and advances the hydraulically settable mixture through the interior chamber toward a die head having a transverse slit. The cross-sectional shape of the die slit is configured to create a sheet of a desired width and thickness generally corresponding to die width and die thickness.

Alternatively, the extruder apparatus may comprise a piston instead of an auger screw in order to exert forward pressure on, and advance the hydraulically settable mixture through, the interior chamber. An advantage of using a piston extruder is the ability to exert much greater pressures upon the hydraulically settable mixture. Nevertheless, due to the highly plastic-like nature of mixtures typically employed in the present invention, it not generally necessary, or even advantageous, to exert pressures greater than those achieved using an auger-type extruder.

In contrast, an important advantage of using an auger-type extruder is that it has the ability to remove unwanted macroscopic air voids within the hydraulically settable mixture. Failure to remove unwanted air voids can result in the sheet having a defective or nonhomogeneous matrix. Removal of the air voids may be accomplished using conventional venting means known in the extrusion art, wherein the mixture is first passed into a vacuum chamber by a first auger screw and then extruded through the extruder die head by means of a second auger screw.

Alternatively, the unwanted air voids may be removed from the hydraulically settable mixture by a process known as "venting" wherein the excess air collects under pressure within the interior chamber and escapes from the extruder chamber while the mixture is compressed and moved forward by the auger screw.

Although the preferred width and thickness of the die will depend upon the width and thickness of the particular sheet to be manufactured, the thickness of the extruded sheet will usually be at least twice, and sometime many times, the thickness of the final calendared sheet. The amount of reduction (and, correspondingly, the thickness multiplier) will depend upon the properties of the sheet in question. Because the reduction process helps control fiber orientation, the amount of reduction will often correspond to the degree of desired orientation.

In addition, the greater the thickness reduction, the greater the elongation of the sheet. In a typical manufacturing process an extruded sheet with a thickness of about 6 mm is calendared to form a wet sheet with a thickness of about 0.5 mm to about 1 mm.

Although the die slit is generally rectangularly shaped, it may contain areas of increased thickness along its width in order to form an extruded sheet having varying thickness along its width. In this case, it will also generally be preferable to pass the sheet through a series of rollers having recesses or gap variations which correspond to the areas of increased extruded thickness. In this way a sheet having reinforced areas of increased strength and stiffness can be produced.

In addition to narrow die slits to form flat sheets, other dies may be used to form other objects or shapes. The only criterion being that the extruded shape be capable of being passed between a pair of rollers. For example, it may not be desirable to extrude an extremely wide sheet, which would require a very large, expensive die. Instead, a tube may be extruded and continuously cut and unfolded using a knife located just outside the die head.

A thick sheet contains more material and will require the extrusion of a thick plate to provide the necessary material. High production speeds can still be achieved when extruding thick plates even when thinning the extruded plate.

As set forth above, adequate pressure is necessary in order to temporarily increase the workability of the hydraulically settable mixture in the case where the mixture has a deficiency of water and has a degree of particle packing optimization. In a mixture that is water deficient, the spaces (or interstices) between the particles contain insufficient water to lubricate the particles in order to create adequate workability under ordinary conditions.

However, as the mixture is compressed within the extruder, the compressive forces compact the particles together, thereby reducing the interstitial space between the particles and increasing the apparent amount of water that is available to lubricate the particles. In this way, workability is increased until the mixture has been extruded through the die head, at which point the mixture exhibits an increase in cohesiveness, plasticity, moldability and green strength, which is generally desirable.

It should be understood that the pressure exerted on the hydraulically settable mixture during the extrusion process should not be so great so as to crush or fracture the lightweight, lower strength aggregates (such as perlite, hollow glass spheres, pumice, or exfoliated rock).

In light of each of the factors listed above, the amount of pressure which will be applied by the extruder in order to extrude the hydraulically settable mixture will preferably be within the range from between about 50 kPa to about 70 MPa, more preferably within the range from between about 150 kPa to about 30 MPa, and most preferably within the range from between about 350 kPa to about 3.5 MPa.

In some cases, particularly where a lower density, higher insulating sheet is desired, it may be advantageous to employ a blowing agent which is added to the mixture prior to the extrusion process.

It will be understood that the extrusion of hydraulically settable binder through the die head will tend to unidirectionally orient the individual fibers within the hydraulically settable mixture along the "Y" axis, or in the lengthwise direction of the extruded sheet. As will be seen herein below, the calendering process will further orient the fibers in the "Y" direction as the sheet is further elongated during the reduction process. In addition, by employing rollers having varying gap distances in the "Z" direction (such as conical rollers) some of the fibers can also be oriented in the "X" direction, i.e., along the width of the sheet. Thus, it is possible to create a sheet by extrusion, coupled with calendering, which will have bidirectionally oriented fibers.

(b) Forming and Molding.

Once the sheet is formed, the next step is to fashion a portion of the sheet into the desired shape for the container or article. In the preferred embodiment, the sheet is pressed between a male die of a desired shape and a female die having a substantially complementary shape of the male die. As a portion of the sheet is pressed between the dies, the mixture is formed into a structural component having the complementary shape of the dies.

Although solid single piece dies (the male die and the female die each comprising one solid piece) are the preferred dies based on ease and economy, alternative dies include split dies and progressive dies. The use of multicomponent split dies permits the production of complex shapes that are easily removed from the mold.

In contrast to the split die where the components press together simultaneously to form the object, a progressive die is a multi-component die whose various parts are pressed together in a delayed sequence to form the desired container. By selecting the order and time when the various components of the die are pressed together, a complex container can be formed having a more uniform thickness.

For example, a progressive male die used to make a bowl may include a base and a side component. By having the base component press first, the remainder of the sheet is pulled in against the side of the female die. The side component of the male die can then be pressed to form the side of the bowl without stretching the sheet, thereby forming a bowl having a more uniform thickness.

Just as in the direct molding process, the amount of pressure exerted by the dies onto the sheet serves several functions which must be considered when determining how much pressure to apply. While a sheet of material is used as compared with directly injecting the material, the parameters and the cautions discussed above will generally apply to the wet sheet molding process.

In an alternative method for fashioning the container from the sheet, the various methods of vacuum forming, commonly used in the plastics industry, can be incorporated. Vacuum forming uses atmospheric pressure (about 14.7 psi) to force the sheet to conform to a mold. Both male and female molds can be used for vacuum forming.

The term "vacuum mold" as used in the specification and appended claims is intended to include either or both the male mold and female mold used in vacuum forming.

Drape forming is used with male molds. The sheet is positioned over the top of the mold, or the mold is placed into the sheet. The air between the sheet and the mold is then evacuated, contouring the sheet around the mold. The resulting product is thickest in the center of the part, where the material first touches the mold. It is thinnest in high-draw areas around the periphery, which contacts the mold last.

Straight vacuum forming is used with female molds. The sheet is sealed against the top of the female mold. The mold cavity is evacuated, and atmospheric pressure pushes the material against the sidewalls of the cavity. This forming technique results in material distribution (thin in the middle and thick around the edges) that is essentially opposite of that obtained when the same part is produced by drape forming on a male mold.

Drape vacuum forming, as opposed to drape forming, is similar to straight vacuum forming except that the edges of the sheet are pressed all the way to the base of the female mold before the cavity is evacuated. This provides a better vacuum for the molding process.

Snapback, billow/air slip, and billow drape are multi-step vacuum forming techniques designed to improve the wall thickness uniformity of products produced on male molds by prestretching the sheet prior to its contacting the mold. Stretching the sheet freely in air without touching anything allows the material to thin out uniformly. As a result, the surface area of the sheet is also increased so that it more closely matches that of the mold.

Snapback vacuum forming utilizes a vacuum box to prestretch the sheet. The vacuum box is mounted to a platen opposite the male mold. The hydraulically settable sheet is sealed against the vacuum box, and a partial vacuum, sufficient to achieve the desired amount of stretching is applied to the box. The mold is then pushed into the concave sheet. The box is vented to the atmospheric and a vacuum is drawn on the mold. The atmosphere pressure then forces the material against the mold.

Billow/air-slip vacuum forming utilizes a pressure box with a male mold positioned inside it. The sheet is sealed against the box. The box is pressured with compressed air and the sheet billows up to form a bubble that provides the appropriate stretching. The mold is pushed up into the convex bubble. The box and the male mold are then evacuated and the sheet is forced against the mold.

Billow drape vacuum forming is a reverse draw technique that utilizes a pressure box to blow a bubble in the sheet. The male mold, mounted opposite the box, is pushed into the convex bubble. The air in the bubble is vented to the atmosphere in a controlled manner. By matching the amount of air being vented to that being displaced by the mold, the sheet material is wiped or draped against the mold. When the mold completely penetrates the sheet, a vacuum is applied to the mold and the box is vented to the atmosphere to complete the forming operation.

Plug-assist and billow/plug-assist/snap back are multistep vacuum forming techniques designed to improve the wall thickness uniformity of parts produced with female molds. They utilize mechanical assists (plugs) to force more material into high dry areas of the part.

Plug assist vacuum forming is used in conjunction with straight vacuum or drape forming techniques. The plug is mounted on a platen opposite the female mold. The sheet is sealed against the mold, and the plug pushes the material into the mold prior to drawing a vacuum. When the mold is evacuated, the material is forced off the plug and up against the mold cavity.

Billow/plug-assist/snap back forming combines several different forming techniques. The sheet is sealed against a female mold. The mold is pressurized to stretch the sheet by blowing a bubble. A plug mounted opposite the mold is forced into the convex bubble, and controlled venting of the displaced air in the bubble causes the material to be draped over the plug. When the plug is fully extended, the mold is evacuated and the material is pushed off the plug and on to the mold.

Pressure forming uses compressed air in addition to atmospheric pressure. Pressures typically range from about 40 Pa to about 200 Pa. Pressure forming requires special equipment with platens and/or molds in pressure boxes capable of locking up and holding the necessary pressure. Pressure forming can be incorporated into any of the vacuum forming techniques previously described.

Twin sheet forming process produces hollow parts. Two sheets are positioned between two female molds with matching perimeters or contact surfaces. The mold cavity contours may or may not be identical. The molds come together and bind the two sheets together where the molds meet. The two sheets may be either pressure formed simultaneously or vacuum formed subsequently utilizing conventional forming techniques.

The term "vacuum forming processes" as used in the appended claims is intended to include pressure form and twin sheet forming processes in addition to the specifically enumerated vacuum forming techniques.

(c) Heating and Form Stability.

The creation of initial form stability in the hydraulically settable product after it is molded can be accomplished in substantially the same way as with the direct molding process.

(d) Drying.

Once initial form stability has been achieved, the hydraulically settable product can be dried and hardened by the same various techniques described above with respect to the direct molding process.

4. Formation of Structural Components from Dry Sheets.

(a) Extrusion.

The extrusion method used in connection with the "Formation from Dry Sheets" is in all material aspects substantially the same as that preferably utilized with the wet sheet molding process. Of course, the use of different processing equipment down the processing line may result in the need to make some modifications to the extrusion process, but such modifications are within the skill of the art in light of the foregoing teachings.

(b) Calendering.

In most embodiments of the dry sheet forming process, it will be preferable to calendar the extruded sheet by passing it between at least one pair of rollers. Calendering the extruded sheet can provide a reduction in thickness of the sheet, orientation of fibers within the sheet or an improvement in the uniformity and surface quality of the sheet. In some embodiments, the calendering step may be utilized as a thickness reducing step, fiber orientation step, surface finishing step or a drying step.

As the thickness of the sheet is reduced when passing through a pair of rollers, it will also elongate the sheet in the forward moving direction. One consequence of sheet elongation is that the fibers will further be oriented or lined up in the "Y" direction. In this way, the reduction process in combination with the initial extrusion process will create a sheet having substantially unidirectionally oriented fibers in the "Y", or lengthwise, direction.

This process of squeezing or pressing the sheet, as well as the speed differential between the entering sheet and the rollers, creates a certain amount of shearing forces on the sheet. The application of an excessively large shearing force can disrupt the integrity of the matrix of the sheet and create flaws within the sheet, thereby weakening the sheet. Because of this, the thickness of the sheet should be reduced in steps small enough to prevent undue damage to the sheet. In most cases, the reduction of thickness of the sheet though each pair of rollers should be less than about 80%; more preferably, the reduction should be less than about 50%.

The diameter of each of the rollers should be optimized depending on the properties of the hydraulically settable mixture and the amount of thickness reduction of the hydraulically settable sheets. When optimizing the diameter of the rollers two competing interests should be considered. The first relates to the fact that smaller diameter rollers tend to impart a greater amount of shearing force into the sheet as it passes between the rollers. This is because the rate of reduction of the hydraulically settable sheet is much greater at any given speed with the smaller diameter roller as it passes between the rollers.

Using larger diameter rollers allows more of the sheet to come in contact with the surface of the rollers as the sheet passes between them. Thus, the step of squeezing or pressing the sheet into a thinner sheet by the rollers is accomplished along a shorter distance and in a shorter period of time when smaller diameter rollers are used as compared to larger diameter rollers.

However, the use of larger diameter rollers also has the drawback that the hydraulically settable material comes into contact with the roller for a greater period of time, thereby resulting in an increase in drying of the sheet during the calendering process. While some drying is advantageous, drying the sheet too quickly during the calendering process could result in the introduction of fractures and other flaws within the matrix. The use of smaller diameter rollers reduces the drying effect of the calendering process.

It is preferable to treat the roller surfaces in order to prevent sticking or adhesion of the hydraulically settable sheet to the rollers. One method entails heating the rollers, which causes some of the water within the hydraulic mixture to evaporate and to create a steam barrier between the sheet and the rollers. Evaporation of some of the water also reduces the amount of water within the hydraulically settable mixture, thereby increasing the green strength of the sheet. The temperature of the rollers, however, must not be so high as to dry or harden the surface of the sheet to the point which would create residual stresses, fractures, flaking, or other deformities or irregularities in the sheet. Accordingly, when reducing the thickness of a sheet it is preferable to heat the rollers to a temperature within the range from between about 50° C. to about 140° C., more preferably to between about 70° C. to about 120° C., and most preferably to between about 85° C. to about 105° C. When the primary goal of calendaring a sheet is drying the sheet, however, temperatures up to about 250° C. can be utilized as described below.

In addition, the rate of drying of the sheet can be reduced by incorporating aggregates having a low specific surface area. Aggregates which have a greater specific surface area can more readily release any water absorbed within the aggregate compared to aggregates having a lower specific surface area.

Finally, it has been found that heating the hydraulically settable mixtures of the present invention increases the rate of the hydration reaction between the hydraulic binder and water. Heating the hydraulic mixtures of the present invention makes it possible to obtain substantial hydration of the hydraulic binder in as little as one day. Because a substantial amount of the final strength can be obtained even before the hydration reaction has reached the standard 28 day level, heated hydraulically settable sheets of the present invention can achieve a substantial amount of their final strength within as little as 10 minutes.

In an alternative embodiment, adhesion between the hydraulically settable sheets and rollers can be reduced by cooling the rollers to or below room temperature. Heating the mixture in the extruder to about 85° C., for example, and then cooling the sheet surface causes the vaporizing water to condense, which is thought to create a thin film of water between the sheet and the roller. The rollers should be cool enough to prevent the surface of the sheet from adhering to the rollers, but not so cold to cause the sheet to freeze or become so stiff or inflexible that it will fracture or shatter during the calendering process.

Overcooling the material can also greatly retard the hydration reaction, although this may be desirable in some cases. Accordingly, it is preferable to cool the rollers to a temperature within the range from between about 20° C. to about 40° C., more preferably to between about 0° C. to about 35° C., and most preferably to between about 5° C. to about 30° C.

Another way to reduce the level of adhesion between the rollers and the hydraulically settable sheet is to treat the roller surfaces in order to make them less amenable to adhesion. Rollers are typically made from polished stainless steel and coated with a nonstick material such as polished chrome, nickel, or teflon.

It has been discovered that the orientation of the fibers in the sheet are effected by the vectors of downward pressure of the rollers, while still deriving the same amount of sheet reduction, by employing a roller having a slightly conical shape in conjunction with a flat roller. The degree of gap differential in the "Z" direction as a result of the conical shape can be controlled to prevent spreading or widening of the sheet in the "X" direction (unless such widening is desired). Oftentimes, widening is not usually desired because the widened portion is not usually of a constant thickness and must typically be trimmed and discarded. By using conical rollers, it is possible to obtain higher elongation and sheet reduction without applying more shear to the sheet.

Orienting the fibers maximizes the tensile strength imparting properties of the fibers in the direction of orientation. In addition, orienting the fibers is particularly useful to reinforce a hinge or score within the sheet. Fibers which are greater in length than the width of the fold or bend can act as a bridge to connect the material on either side of the fold or bend even if the matrix is partially or even substantially fractured along the fold or bend. This bridging effect is enhanced if the fibers are generally aligned perpendicular to the fold or bend.

Finally, it should be understood that due to the plastic nature and relatively high level of workability of the hydraulically settable mixture, the calendering process will usually not result in much compression of the sheet. In other words, the density of the sheet will remain substantially the same throughout the calendering process, although some compaction would be expected, particularly where the sheet has been significantly dried while passing between other reduction rollers. Where compaction is desired, the sheet can be passed between a pair of compaction rollers following a drying step, as set forth more fully below.

One of ordinary skill in the art will appreciate that the extrusion step need not necessarily employ the use of an "extruder" as the term is used in the art. The purpose of the extrusion step is to provide a continuous, well-regulated supply of hydraulically settable material to the rollers. The extrusion step preferably orients the fibers in the direction of the flow of the material. These may be achieved by other mechanisms known to those skilled in the art to effect the "extrusion" or flow of material through an appropriate opening.

(c) Roller Drying.

Although the calendaring step often results in partial or even substantial drying of the hydraulically settable sheet, it will be preferable to further dry the sheet in order to obtain a sheet with the desired properties of tensile strength and toughness. This may be accomplished in a number of ways, each of which involves heating the sheet in order to drive off the excess water. A preferred method of drying the sheet involves the use of large diameter, heated drying rollers. Some heated drying rollers are known in the art as "Yankee" rollers. The main concern is that the combined surface areas of the rollers be adequate to efficiently effectuate drying of the sheet.

In contrast to the reduction rollers, which are generally aligned in pairs of rollers, the drying rollers are individually aligned so that the sheet passes over the surface of each individually in sequence. In this way, the two sides of the hydraulically settable sheet are alternatively dried in steps. While the sheet passes between the reduction rollers during the calendering step in a generally linear path, the sheet follows a generally sinusoidal path when wrapping around and through the rollers (e.g., "Yankee" rollers) during the drying step.

The side adjacent to the first drying roller is heated by the drying roller while the other side is exposed to the air. The heated sheet loses water in the form of vapor, which can escape out the sides of the roller or the surface of the sheet opposite the roller. The vapor also provides a nonstick barrier between the sheet and roller. The drying rollers may have tiny holes within the surface in order to allow some of the water vapor to escape through the holes during the drying step.

As the sheet continues on its path it is rolled onto a second drying roller where the other side comes into contact with the roller surface and is dried. This process may be continued for as many steps as needed in order to dry the sheet in the desired amount. In some cases it may be preferable to dry one side of the sheet more than the other.

The temperature of the drying rollers will depend on a number of factors, including the moisture content of the sheet as it passes over a particular roller. In any event, the temperature of the drying rollers should be less than about 300° C. Although the hydraulically settable material should not be heated above 250° C. in order to prevent the destruction of the organic constituents (such as rheology-modifying agent or fibers), rollers heated to above this temperature may be used so long as there is adequate water within the mixture which can cool the material as the water vaporizes. Nevertheless, as the amount of water decreases during the drying process, the temperature of the rollers should be reduced to prevent overheating of the material.

In some cases, it may be preferable to use a drying tunnel or chamber in conjunction with the drying rollers. In order to obtain the full effect of heat convection drying, it is often preferable to circulate the heated air in order to speed up the drying process.

In some cases, the drying process set forth above will be the final step before the sheet is either used to form a container or other object or, alternatively, rolled onto a spool or stacked as sheets until needed. In other cases, particularly where a sheet with a smoother, more paper-like finish is desired, this drying step will be followed by one or more additional steps set forth more fully below, including a compacting step and/or a finishing step. In the case of compaction, it is generally preferable to leave the sheets with some amount of moisture to prevent fracturing of the matrix during the optional compaction step. Otherwise, if the drying step is not followed by a compaction step, it is generally desired to substantially dry out the sheet in order to quickly maximize the tensile strength and toughness of the sheet.

(d) Finishing.

In many cases, it may be desirable to compact or finish the hydraulically settable sheet in order to achieve the final thickness, tolerance, and surface finish. In addition, the compaction process can be used to remove unwanted voids within the matrix. The sheet is passed between a pair of compaction rollers after being substantially dried during the drying process. The compaction process generally yields a sheet with higher density and strength, fewer surface defects, and a smaller thickness.

The compaction process preferably yields a sheet of reduced thickness and increased density without causing further elongation of the sheet and without negatively disrupting or weakening the matrix. In order to achieve compaction without elongating the sheet and without weakening the matrix, it is important to control the drying process so that the sheet contains an amount of water within an optimum range. If the sheet contains too much water, the compaction rollers will elongate the sheet in similar fashion as the reduction rollers. In fact, the compaction rollers are substantially the same as the reduction rollers, the only difference being that compaction, rather than elongation will occur if the sheet is dry enough.

On the other hand, overdrying the sheet prior to the compaction step can yield a weaker sheet. At some point the hydraulically settable sheet can become so dry and hard that the matrix cannot be compressed without fracturing. The fracturing of the matrix can diminish the final strength of the sheet even if the fractures are microscopic and not visible to the naked eye. Nevertheless, the compaction process of a dry sheet may be improved by spraying the surface of the sheet with water, which provides the sheet with adequate moisture and also fixes and aligns the compacted particles within the sheet surface.

It may also be preferable to further alter the surface of the hydraulically settable sheet by passing the sheet between one or more pairs of finishing rollers. For example, in order to create a sheet with a very smooth surface on one or both sides, the sheet may be passed between a pair of hard and soft rollers.

In other embodiments, the finishing rollers can impart a desired texture such as a meshed or checkered surface. Instead of using a hard and a soft roller, rollers which can imprint the sheets with the desired finish may be used. If desired, the rollers can imprint the surface of the sheet with a logo or other design. Special rollers capable of imparting a water mark can be used alone or in conjunction with any of these other rollers.

It may be desired to corrugate the sheets in a manner similar to corrugated cardboard. This is accomplished by passing a semi-moist sheet between a pair of corrugated rollers. The moisture content of the sheet should be controlled so that the corrugation process does not result in a sheet with a damaged matrix. This may typically be carried out using steam.

(e) Scoring.

In some cases it may be desirable to alternatively score, score cut, or perforate the sheet in order to define a line upon which the sheet may fold or bend. A score cut can be made by using a sharp knife blade mounted on a score press or it can be accomplished using continuous die cut rollers. A score may be made in the sheet by means of a scoring die. Finally, a perforation may be made by means of a perforation knife.

The purpose of the score, score cut, or perforation is to create a location on the hydraulically settable sheet where the sheet can be bent or folded. This creates a "hinge" within the sheet with far greater bendability and resilience than possible with an unscored or unperforated hydraulically settable sheet. In some cases multiple score cuts or perforations may be desirable.

Cutting a score line or perforation within the sheet creates a better fold line or hinge for a number of reasons. First, it provides a place where the sheet might more naturally bend or fold. Second, cutting a score makes the sheet at the score line thinner than the rest of the sheet, which reduces the amount of lengthwise elongation of the surface while bending the sheet. The reduction of surface elongation reduces the tendency of the matrix to fracture upon being folded or bent. Third, the score cut or perforation allows for a controlled crack formation within the matrix in the event that fracture of the matrix occurs.

It may sometimes be preferable to concentrate more fibers at the place in which the score cut or perforation will be made. This can be accomplished by co-extruding a second layer of hydraulically settable material containing a higher fiber content at predetermined timed intervals to correspond with the location of the score cut or perforation. In addition, fibers can be placed on top of, or injected within, the sheet during the extrusion or calendering processes in order to achieve a higher fiber concentration at the desired location.

The hydraulically settable sheet will preferably be in a substantially dry or semi-hardened state during the scoring or perforation process. This is desirable to prevent the score or perforation from closing up through the migration of moist material into the score cut. Since scoring generally (and perforation always) involves cutting through a portion of the matrix, the sheet can even be totally dry without the scoring or perforation process harming the sheet. However, in cases where a score is pressed rather than cut into the sheet surface, the sheet should be moist enough to prevent fracture due to the dislocation of the matrix.

In most cases where a thinner sheet (<1 mm) is being score cut, the cut will have a depth relative to the thickness of the sheet that is within the range from between about 10% to about 50%, more preferably within the range from between about 20% to about 35%. In the case of thicker sheets, the score cut will usually be deeper due to the decrease in bendability of the thicker sheet.

It may be desirable to apply print or other indicia on the surface of the sheet. This can be accomplished using printing means known in the art of printing paper or cardboard products. Because the sheets have a relatively high porosity like paper or cardboard, the applied ink will tend to dry rapidly. In addition, decals, labels or other indicia can be attached or adhered to the hydraulically settable sheet using methods known in the art.

Finally, the substantially hardened sheets can be immediately used to form containers or other objects, or they may be stored until needed such as, for example, by winding the sheets into a roll or cutting and stacking individual sheets into a pile.

The hydraulically settable sheets made according to the processes set forth above can then be used just like paper or cardboard and can be fashioned into an endless variety of containers or other useful objects even in manufacturing equipment which is currently used with paper or cardboard.

(f) Formation of Structural Components from Dry Sheets.

One method of forming the structural components from dry sheets, particularly, the sidewalls of the hollow body portion of the container involves forming a hollow tube from a sheet of hydraulically settable material. This method of forming the structural components involves spiral winding of a narrow sheet of hydraulically settable material to form a hollow body portion 12 as depicted in FIG. 3. To form the hollow body portion 12 by spiral winding, a long narrow sheet is coated on one side with a lubricant, such as wax, and wound around a mandrel in a spiral fashion. On each revolution, one edge of the sheet abuts the opposite edge of the sheet laid down on the mandrel on the previous revolution as depicted in FIG. 3. The angle of the winding is preferably 15° from normal to the mandrel. The degree of the angle effects the optimal elasticity and tensile strength of the container.

A second layer of hydraulically settable material may also be applied in a similar fashion over the first layer to provide additional strength. As shown in FIG. 3, the second layer 50 is also preferably oriented at an angle of 15° from normal to the mandrel, but in the opposite direction such that the angle between the first layer 48 and the second layer 50 is approximately 30°. An adhesive is applied to the bottom or inner surface of the second layer 50 so as to bond the second layer 50 to the outside surface of the first layer 48. Continuous fibers or filament winding 52 may also be used to provide even additional strength. Continuous fibers 52, such as Kevlar, polyaramite, glass fibers, carbon fibers and cellulose fibers, may be fed in with the sheets and sandwiched between the first and second layers 48 and 50 as depicted in FIG. 3. Controlling the angle in which the continuous fiber is applied increases the ability to provide reinforcement. Additionally, the use of continuous fiber as a reinforcement permits a reduction in the total volume percent of fiber necessary in the mixture.

Another method of forming the structural components involves convoluting of a sheet of hydraulically settable material to form a hollow body portion 12 as depicted in FIG. 4. The sidewalls of the container are formed by cutting a sheet into a desired length and width, rolling the sheet in one direction to form a hollow tube, overlapping and bonding a portion of the opposing sides of the sheet with a suitable adhesive to produce a hollow body portion 12 as depicted in FIG. 4. Preferably, the dimension of the sheet in one direction is equal to the desired length of the hollow tube along its longitudinal axis, and the dimension of the sheet in the other direction is equal to the desired circumference of the hollow body portion 12. A bottom portion can be fitted to the sidewalls resulting in a completed hollow body portion. This process is mechanized in many industries for mass production, particularly the paper cup industry.

Additional methods of forming the containers utilize scoring of the sheet as discussed above for folding of the sheet into a desired shape. Examples of containers formed by these methods are depicted in FIGS. 9A, 9B, 10A and 10B. Conventional containers formed from hydraulically settable sheets into the shapes shown in FIGS. 9A, 9B, 10A and 10B are frequently utilized with fruit juices and milk. Containers can be shaped as shown in FIGS. 9A, 9B, 10A and 10B with the same processes and machinery utilized to shape such containers from paper composites. After substances are deposited into such folded containers through a top opening, the opening is sealed closed. The stored substances are dispensed from FIGS. 9A and 9B in the same way that a conventional milk carton is utilized. In FIGS. 10A and 10B the stored substances are dispensed by penetrating a straw through an opening covered by foil. Straws can also be manufactured from the hydraulically settable material. As discussed below, the sheets can be laminated or coated with other materials and a liner can be utilized, as well.

The overlapping portions of such containers as depicted in FIGS. 9A and 10A are sealed with an adhesive. The overlapping portions in FIGS. 9B and 10B have been hermetically sealed together. The overlapping portions which have been hermetically sealed can be compressed together or crimped together. FIGS. 9C and 10C show a cross section of the hermetically sealed overlapping portions.

5. Formation of Structural Components by Extrusion.

The hollow body portion 12 of the container shown in FIG. 5 is formed directly by an extrusion process. After the hydraulically settable mixture is prepared, it is placed in an extruder and extruded through a die configured to produce an elongated hollow tube from which a plurality of hollow body portions 12 can be formed. After the tube has been extruded and allowed to cure, the tube is then cut into individual hollow body portions 12. The hollow body portions 12 are then combined in the manner described earlier in this specification with the various closure means 14 and bottom portions 18 to form a finished container. Continuous fibers can also be coextruded with the tube as reinforcement. Disks within the extruder rotating in opposite directions can be utilized for coextruding the continuous fibers to achieve a crisscrossing pattern of fiber overlay. Controlling the rotational speed and the forward extrusion speed permits control of the angle of the fibers. Controlling the angle permits optimal elasticity and tensile strength to be achieved. Additionally, the space between the fibers can be altered to achieve varying strengths. By properly spacing the fibers and yet achieving a desired strength, the amount of fiber utilized can be limited.

Other methods of forming the structural components of containers involve the use of more than one method in combination with another method. Methods which can be utilized in combination include laminates created by any combination of the described methods of manufacturing. For example a sheet can be convoluted or spiral wound around an extruded or molded tube or hollow body portion. Another example is a three layer laminate with an extruded or molded tube or hollow body portion providing the interior layer, a middle layer provided by a spiral wound or convoluted sheet and an exterior layer provided a another sheet which can be convoluted or a spiral wound sheet crisscrossing the middle spiral wound sheet. Another three layer laminate can be formed extruding a tube around a sheet which has been wound spirally into a tube and wrapping a second sheet around the extruded tube by spiral winding or convoluting.

D. Final Processing of the Container.

After the various structural components of the container are formed the components are subjected to several processing steps before assembly into a container. The processing steps may include coating the containers, applying a liner, applying printing or other indicia. These final processing steps may occur after the structural components have been formed or after the structural components are assembled into containers.

1. Coatings, Laminates and Liners.

The surface characteristics of the containers can be altered in a number of ways, such as coating the containers, creating laminates and utilizing liners. Utilization of these techniques may increase the tensile strength of the container and enhance the ability of the containers to act as an impermeable barrier to liquids and gases. Additionally, they may also provide protection against alkaline solutions, acidic solutions, sugar solutions, or oil-based solvents. They may also provide a smoother or glossier surface. They may even reinforce the hydraulically settable product, particularly at a bend or fold line in a sheet material that has been formed into a container. Coatings may also improve the weathering resistance of the containers and may provide the capacity to retain a fragmented container.

Some coatings can be applied to the surface of the product during the sheet forming or product molding process, in which case the process is an "on-machine" process. In an on-machine process, the coating may be applied as a liquid, gel, or even a thin film sheet. It may be preferable to apply the coating after the hydraulic product has been formed and dried to at least a limited extent, in which case the process is an "off-machine" process.

The object of the coating process is usually to achieve a uniform film with minimum defects on the surface of the product. The selection of a particular coating process depends on a number of substrate variables, as well as coating formulation variables. The substrate variables include the strength, wettability, porosity, density, smoothness, and uniformity of the matrix of the product. The coating formulation variables include total solids content, solvent base (including water solubility and volatility), surface tension, and rheology. Coating processes known in the art that may be used to coat the hydraulically settable sheets or products of the present invention include spraying, blade, puddle, air-knife, printing, and gravure coating. The amount of coating can be controlled by the volume of the spray or the dwell time of the structural components under the spray or both. In addition, coatings may be coextruded along with the container components in order to integrate the coating process with the extrusion process.

In some cases, it may be preferable for the coating to be elastomeric or deformable. Some coatings may also be used to strengthen places where the hydraulically settable material may be severely bent, such as the hinge of a folded container. In such cases, a pliable, possibly elastomeric, coating may be preferred. Resistance to acidity is important, for example, where the container is exposed to foods or drinks having a high acid content, such as soft drinks or juices. Where it is desirable to protect the container from basic substances, the containers can be coated with an appropriate polymer or wax, such as are used to coat paper containers. Besides these coatings, any FDA approved coating material would work depending on the application involved.

For example, an FDA-approved coating comprised of sodium silicate, which is acid resistant, is a particularly useful coating. Many silicate based coatings provide impermeable barriers and are acid resistant. Orthosilicates and siloxanes are particularly useful for container coatings due to their tendency to fill the pores of the hardened hydraulically settable matrix. Additionally, useful coatings are obtained from colloidal silica in organic polymer dispersions, films and fibers. These coating compositions provide water impermeable barriers and an increase in hardness and durability.

Biodegradable plastics provide particularly useful coatings. Biodegradable plastics, such as polylactic acid and Biopol, provide a barrier to liquids and gases, and are insoluble in water and acidic solutions.

Another useful coating material is calcium carbonate, which is acid resistant and also allows the printing of indicia on the surface of the containers. Other coatings which might be appropriate include acrylics, polyacrylates, polyurethanes, melamines, polyethylene, synthetic polymers, hydroxypropylmethylcellulose, polyethyleneglycol, kaolin clay, Zein®, polyvinyl chloride, polyvinyl alcohol, polyvinyl acetate, ceramics, waxes (such as beeswax or petroleum based wax).

Another type of coating that may be placed on the surface of the containers of the present invention is a reflective coating for reflecting heat into or out of the container. Such reflective coatings are well known in the art, although their applicability to hydraulically settable containers is novel.

Liners achieve the same purpose of coatings but liners are applied as a continuous sheet while coatings are applied by spraying, dipping, etc. Plastic liners, such as polyethylene, can be utilized to achieve properties such as impermeability and insolubility in various solutions. Foil liners can also be utilized. Laminates include multiple layers of sheets, coatings, or liners, with at least one layer formed from hydraulically settable materials. Laminates enable the production of containers having an interior with a coating or liner with different properties from the coating or liner on the exterior of the container.

2. Printing.

Another optional step in the manufacturing process is applying print or designs to the container through the use of a conventional printer, such as offset, Van Dam, laser, direct transfer contact, and thermographic printers. Additional methods include utilizing a relief printing, intaglio printing, stencil printing and hot stamping. Essentially any hand or mechanical means can be used. Of course, hydraulically settable products such as those disclosed herein are particularly well suited for such a use. In addition, decals, labels or other indicia can be attached or adhered to the containers using known methods in the art. Furthermore, as mentioned above, it is within the scope of the present invention to coat the containers with a government approved coating, most of which are currently used and well adapted for placing indicia thereon. In order to speed up the drying process, the structural components can be passed through a second drying tunnel in order to increase the rate of drying of the ink.

3. Assembly of the Structural Components into Containers.

Assembling the structural components into containers occurs as part of the process of "bottling" or "packaging" beverages in the container of the present invention. Application of this technology, for example to the container shown in FIG. 1 would at a very basic level involve moving the hollow body portion 12 along a conveyor to a first station where the hollow body portion 12 is filled with a predetermined amount of beverage. Next the filled hollow body portion 12 is moved further along the conveyor to a second station where a suitable adhesive is applied to the external threads 22 of the hollow body portion 12 and a top 24 is screwed onto the top of the filled hollow body portion 12 by rotating hollow body portion 12 and/or top 24 relative to one another. Finally, the container is moved still further along the conveyor to a third station where cap 26 is screwed onto top 24 by rotating cap 26 and/or top 24 relative to one another. Alternatively, top 24 and cap 26 could be assembled first and then applied to hollow body portion 12 as an assembly.

IV. Example of the Preferred Embodiments.

To date, numerous tests have been performed comparing the properties of containers of varying composition and manufactured by varying methods. Below are specific examples of hydraulically settable compositions which have been created according to the present invention.

EXAMPLE 1

Sealable liquid-tight, pressure-tight and thin-walled containers were formed by molding containing the following components:

|  | Weight Percent | Volume Percent |
| --- | --- | --- |
| Cement | 47.2 | 36.6 |
| Sand | 39.6 | 36.6 |
| Fibers | 3.3 | 3.0 |
| Water | 8.5 | 20.3 |
| Dispersant | 0.9 | 2.3 |
| Rheology modifying agent | 0.5 | 1.1 |
| Accelerator | 0.05 | 0.1 |
| Total | 100.0 | 100.0 |

Additionally, the tensile strength needed for these particular containers can be calculated utilizing the internal transverse pressure stress formula, weight and cost:

| Wall Thickness | 0.25 mm | 0.5 mm | 1 mm | 2 mm | 3 mm |
| --- | --- | --- | --- | --- | --- |
| Estimated Volume | 27.5 cm$^3$ | 55.0 cm$^3$ | 107.7 cm$^3$ | 206.3 cm$^3$ | 296.1 cm$^3$ |
| Estimated Weight | 66.0 g | 131.9 g | 258 g | 494.8 g | 710.2 g |
| Estimated Cost/Unit | $.0048 | $.0096 | $.019 | $.036 | $.052 |
| Tensile Strength | 25.8 MPa | 12.9 MPa | 6.5 MPa | 3.2 MPa | 2.2 MPa |

EXAMPLE 2

A container was formed by jiggering a cementitious mixture containing the following components:

| Portland White Cement | 2.0 kg |
| --- | --- |
| Water | 1.004 kg |
| Perlite | 0.702 kg |
| Tylose ® 4000 | 60 g |

The portland cement, Tylose®, and perlite were mixed for about 2 minutes; thereafter, the water was added and the mixture was blended for an additional 10 minutes. The resultant cementitious mixture had a water to cement ratio of approximately 0.5. The concentration of cement paste (cement and water) in this mixture was 79.8% by weight, with perlite comprising 18.6%, and the Tylose® being 1.6% by weight of the cementitious mixture.

The resultant cementitious material was then cast by jiggering into the shape of a container. This container had a wall thickness of 4.5 mm, and would insulate to 65° C., which means that the maximum temperature on the outside of the container would be 65° C. when the container is filled with hot water (88° C.). The container was designed to have a predetermined bulk density by adding a porous aggregate (in this case perlite).

Another porous aggregate such as calcium silicate microspheres or hollow glass spheres can be used (as seen in later examples). Because porous aggregates have a low specific gravity, they can impart a degree of insulation ability to the material within the containers. This and later examples demonstrate that it is possible to manufacture a lightweight container from cement which can be designed to have adequate insulation for a particular purpose. Because increasing the insulative effect of the container generally accompanies a reduction in strength, it is preferable to design the material to have only that range of insulation necessary for a given purpose. In addition, later examples will show that the container design can be altered in order to obtain an adequately insulating container without increasing the actual insulating effect of the material within the container.

In this example, the relatively large wall thickness of the containers resulted from an attempt to make the containers more insulating, not because the thickness was necessary in order for the container to have adequate strength. However, the resulting container had a good surface finish and was easily cast by jiggering. While the container was relatively dense (having a bulk specific gravity of about 1.6), it did demonstrate the concept that a cementitious mixture can be designed to have form stability in the green state and still be molded by conventional means. To make the material impermeable to liquids and gases an internal coating was applied.

EXAMPLE 3

A container was formed by jiggering a cementitious mixture containing the following components:

| Portland White Cement | 2.0 kg |
| --- | --- |
| Water | 1.645 kg |
| Perlite | 0.645 kg |
| Tylose ® 4000 | 20 g |
| Tylose ® FL 15002 | 15 g |
| Cemfill ® glass fibers (4.5 mm) | 370 g |

The cementitious mixture was prepared utilizing the procedures set forth with respect to Example 2 except that the fibers were added after mixing the cement, water, Tylose®, and perlite for about 10 minutes. The combined mix was then mixed for an additional 10 minutes. The resultant cementitious mixture had a water to cement ratio of approximately 0.82. The concentration of cement paste (cement and water) in this mixture was 77.6% by weight, with perlite comprising 13.7%, the Tylose® 4000 and FL 15002 comprising 0.43% and 0.32%, respectively, and the glass fibers being 7.9% by weight of the cementitious mixture.

The resultant cementitious mixture was then cast by jiggering into the shape of a container. The container had good surface finish, like the container of Example 2, but it also had a higher toughness and fracture energy than the container of Example 2 because of the addition of the glass fibers. The containers so obtained demonstrated an adequate amount of strength, and did not break when dropped onto a concrete or marble floor from heights of up to 2 meters, as would have been expected when dropping thin-walled cementitious objects from this height. To make the material impermeable to liquids and gases an internal coating was applied.

EXAMPLE 4

A container was formed by jiggering an extruded cementitious mixture containing the following components:

| | |
|---|---|
| Portland White Cement | 4.0 kg |
| Water | 1.179 kg |
| Calcium silicate microspheres | 1.33 kg |
| Tylose® FL 15002 | 30 g |
| Cemfill® glass fibers (4.5 mm; alkali resistant) | 508 g |

The cementitious mixture was prepared utilizing the procedures set forth with respect to Example 3, except that the microspheres were added in place of the perlite. The resultant cementitious mixture had a water to cement ratio of approximately 0.29, which is dramatically lower than that of Examples 2 and 3. This demonstrates that depending upon the aggregate system, significantly different water to cement ratios can be designed into the composition. The concentration of cement paste (cement and water) in this mixture was 73.5% by weight, with the microspheres comprising 18.9%, the Tylose® comprising 0.43%, and the glass fibers being 7.2% by weight of the cementitious mixture.

The resulting container did not have as good a surface finish as Examples 2 and 3, but it was lighter. The cementitious mixture could be readily jiggered and extruded and would insulate hot water to 63° C.

While early prototypes of the present invention, the containers prepared according to Examples 2–4 taught that the concepts tested therein were sound. These examples taught that adding porous, lightweight aggregates to the cementitious mixture alone does not generally result in a material having the same insulation ability as polystyrene. Neither the addition of perlite, nor the calcium silicate microspheres imparted the degree of insulation desired for substances which are heated. Therefore, other methods of imparting insulation other than by merely adding inorganic materials to the cement matrix were explored.

In the next series of examples, finely dispersed, microscopic, discontinuous air voids were introduced into the hydraulically settable matrix, which had the effect of greatly increasing the insulative ability of the container. To make the material impermeable to liquids and gases an internal coating was applied.

EXAMPLE 5

A container was formed by jiggering a cementitious mixture containing the following components:

| | |
|---|---|
| Portland White Cement | 2.52 kg |
| Water | 1.975 kg |
| Vermiculite | 1.457 kg |
| Vinsol resin | 2.5 g |
| Tylose® 4000 | 25 g |
| Tylose® FL 15002 | 75 g |
| Abaca fiber | 159 g |

The cementitious mixture was prepared by prewetting the abaca fiber (which had been pretreated by the manufacturer with sodium hydroxide so that greater than 85% of the cellulose was α-hydroxycellulose) and then combining the fibers with each of the other components except vermiculite. This mixture was mixed for about 10 minutes, and a further 10 minutes after the vermiculite was added. The resultant cementitious mixture had a water to cement ratio of approximately 0.78. The concentration of cement paste (cement and water) in this mixture was 72.3% by weight, with the vermiculite comprising 23.4%, the Tylose® 4000 and FL 15002 comprising 0.40% and 1.21%, respectively, the vinsol resin (an air entraining agent) comprising 0.04%, and the abaca fibers being 2.6% by weight of the cementitious mixture.

The container made in Example 5 was cast by jiggering to have a wall thickness of about 2.5 mm, which is substantially thinner than the wall thicknesses obtained for the containers in Examples 2–4. Nevertheless, the container of Example 5 was able to insulate down to 62° C. (a significant improvement over the earlier containers in light of the reduced wall thickness). The surface finish was very smooth, and the container had a high toughness and fracture energy. The container had a capacity of about 390 cc and weighed about 95 g. To make the material impermeable to liquids and gases an internal coating was applied.

EXAMPLE 6

A container was formed by jiggering a cementitious mixture containing the following components:

| | |
|---|---|
| Portland White Cement | 2.52 kg |
| Water | 2.31 kg |
| Vermiculite | 2.407 kg |
| Vinsol resin | 2.5 g |
| Tylose® 4000 | 25 g |
| Tylose® 15002 | 75 g |
| Abaca fiber | 159 g |
| Aluminum (<100 mesh) | 0.88 g |

The cementitious mixture was made utilizing the procedures set forth with respect to Example 5. The resultant cementitious mixture had a water to cement ratio of approximately 0.92. This mixture was readily cast by jiggering, even though it had a relatively high water to cement ratio. The concentration of cement paste (cement and water) in this mixture was 64.4% by weight, with the vermiculite comprising 32.1%, the Tylose® 4000 and 15002 comprising 0.33% and 1.0%, respectively, the vinsol resin (an air entraining agent) comprising 0.03%, the abaca fibers being 2.1%, and the amount of aluminum being about 0.01% by weight of the cementitious mixture.

The aluminum resulted in the incorporation of finely dispersed hydrogen bubbles within the cementitious mixture. Hence, the resultant container was even more lightweight and porous than the container of Example 5, weighting only 85 g. Nevertheless, the container had a smooth surface finish and there was no degradation in the toughness, fracture energy, or insulation capability. To make the material impermeable to liquids and gases an internal coating was applied.

EXAMPLE 7

A container was formed by jiggering a cementitious mixture containing the following components:

| | |
|---|---|
| Portland White Cement | 2.52 kg |
| Water | 1.65 kg |
| Vermiculite | 1.179 kg |
| Perlite | 0.262 kg |
| Vinsol resin | 5.0 g |
| Tylose® 4000 | 12.5 g |
| Tylose® FL 15002 | 37.5 g |
| Abaca fiber | 159 g |
| Aluminum (<100 mesh) | 1.5 g |

The cementitious mixture was made utilizing the procedures set forth with respect to Example 5. The resultant cementitious mixture had a water to cement ratio of approximately 0.65. The concentration of cement paste (cement and water) in this mixture was 71.6% by weight, with the perlite comprising 4.5%, the vermiculite comprising 20.2%, the Tylose® 4000 and 15002 comprising 0.21% and 0.64%, respectively, the vinsol resin (an air entraining agent) comprising 0.086%, the abaca fibers being 2.7%, and the amount of aluminum being about 0.026% by weight of the cementitious mixture.

The resulting container had properties and characteristics substantially similar to those of the container made in Example 6.

The containers of Examples 5–7 yielded better results, both in terms of strength and, especially, insulative ability compared to containers in the previous examples. Containers made in Examples 5–7 were able to insulate to 62° C. These examples demonstrate that the incorporation of microscopic air voids can greatly increase the container's insulating ability without appreciably decreasing the strength. They also show that aluminum can be used to generate the air bubbles which are entrained within the cementitious mixture.

These and other experiments have shown that perlite tends to reduce the strength of the container, while imparting the same level of insulation regardless of how the cement paste was either mixed or molded. On the other hand, because vermiculite is plate-shaped it is advantageous, both in terms of strength and insulation, to align the individual particles along parallel planes within the wall of the container. This may be achieved by jiggering, ram pressing, extrusion, or rolling the mixture.

Similarly, in order for the added fibers to be most effective, it has been found advantageous to align them within the hydraulically settable matrix as well. This may also be achieved using the above-mentioned molding processes. Such alignment imparts much greater strength and toughness to the resulting container.

It has also been discovered that where a more viscous hydraulic paste is involved, it takes from between 5 and 10 minutes of mixing to obtain good flocculation of the cement paste and the resulting plastic behavior. In addition, it takes Tylose® about 5 minutes to "react" with or gel in the presence of water in order to impart its thickening effect to the mixture. To make the material impermeable to liquids and gases an internal coating was applied.

EXAMPLE 8

A container was formed by molding a cementitious mixture containing the following components:

| | |
|---|---|
| cement | 4.0 kg |
| glass balls | 1.1 kg |
| abaca | 0.1 kg |
| water | 1.6 kg |
| Tylose FL 15002 | 0.1 kg |

The mixture formed a harder material and had a weight of 45 g. After an internal coating was applied, the container was pressure tested by applying an internal air pressure. The containers fractured at a pressure of 25–35 PSI.

EXAMPLE 9

A container was formed by molding a cementitious mixture containing the following components:

| | |
|---|---|
| cement | 3.0 kg |
| glass balls | 1.1 kg |
| abaca | 0.1 kg |
| water | 1.6 kg |
| Tylose FL 15002 | 0.1 kg |

The mixture formed a harder material and had a weight of 38 g. After an internal coating was applied, the container was pressure tested by applying an internal air pressure. The container fractured at a pressure of 25–35 PSI.

EXAMPLE 10

A container was formed by molding a cementitious mixture containing the following components:

| | |
|---|---|
| cement | 2.0 kg |
| glass balls | 1.1 kg |
| abaca | 0.1 kg |
| water | 1.6 kg |
| Tylose FL 15002 | 0.1 kg |

The mixture formed a harder material and had a weight of 35 g. After an internal coating was applied, the container was pressure tested by applying an internal air pressure. The container fractured at a pressure of 25–35 PSI.

EXAMPLE 11

A container was formed by molding a cementitious mixture containing the following components:

| | |
|---|---|
| cement | 1.0 kg |
| glass balls | 1.1 kg |
| abaca | 0.1 kg |
| water | 1.6 kg |
| Tylose FL 15002 | 0.1 kg |

The mixture formed a harder material and had a weight of 28 g. After an internal coating was applied, the container was pressure tested by applying an internal air pressure. The container fractured at a pressure of 25–35 PSI.

EXAMPLE 12

A container was formed by jiggering a cementitious mixture as described in Example 6 and coated with a melamine coating. The container was stronger than the containers formed in Examples 8–11. The container was pressure tested to fracture at about 50 PSI (3.4 bar), which is the pressure created by most cola beverages.

EXAMPLE 13

A container was formed from a preformed hydraulically settable sheet. The sheet was formed from a hydraulically settable mixture comprising:

| | |
|---|---|
| cement | 1.0 kg |
| perlite | 0.5 kg |
| tylose | 0.2 kg |
| fiber | 0.25 kg |
| water | 2.15 kg |

The sheet was cut into 1 inch wide pieces and spiral wound around a mandrel in a crisscrossing pattern. The thickness of the sheet was 0.42–0.46 mm in two layers. Kevlar fiber was also spiral wound around the sheet in a crisscrossing pattern. The Kevlar fibers had a diameter of 0.02 mm and was spaced apart by approximately 5 mm. The outer layer of the sheet had a thickness of about 0.25 mm. The total thickness was approximately 2 mm and weighed about 66 g. The container was coated inside and filled with a cola. The container was pressure tested to failure at 60 PSI.

EXAMPLE 14

A container was formed from a preformed hydraulically settable sheet. The sheet was formed from a hydraulically settable mixture described in Example 13. The sheet was convoluted into a cylinder with the fibers aligned in the circumferential direction and pressure tested to failure at 20 PSI. Kevlar fiber having a diameter of 0.02 mm were loosely spun around the matrix instead of integrally forming the fiber into the matrix or gluing the fibers to the matrix. The fibers were spaced about 10 mm apart and the container had an average wall thickness between about 0.30 to about 0.35 mm. The container was pressure tested to about 25 PSI.

EXAMPLE 15

A container was formed from a preformed hydraulically settable sheet. The sheet was formed from a hydraulically settable mixture comprising:

| | |
|---|---|
| cement | 1.0 kg |
| perlite | 0.1 kg |
| tylose | 0.5 kg |
| fiber | 0.25 kg |
| water | 2.2 kg |

The mixture was extruded and then passed between a series of pairs of rollers into a sheet having a thickness of 0.4 mm. The totally dried sheet was found to have superior strength and elongation properties. The extrusion and calendering processes had the effect of longitudinally orienting the fibers in a substantially unidirectional manner. Therefore, the sheets possessed a "strong" and a "weak" direction. The sheets were tested for tensile strength in the two directions, designated as 0° for the strong direction and 90° for the weak direction, along with the level of elongation before failure was measured and Young's Modulus of elasticity.

The tensile strength was tested as 39.05 MPa in the strong direction and 18.86 MPa in the weak direction; the elongation was 1.97% in the strong direction and 1.23% in the weak direction; and the modulus of elasticity was 3935 in the strong direction and 2297 in the weak direction, which is comparable to normal paper.

The sheet was convoluted into a cylinder and pressure tested to failure at 30 PSI. Kevlar fibers having a diameter of 0.02 mm were loosely spun around the matrix instead of integrally forming the fiber into the matrix or gluing the fibers to the matrix. The fibers were spaced about 10 mm apart and the container had an average wall thickness between about 0.36 to about 0.40 mm. The container was pressure tested to more than 60 PSI.

EXAMPLE 16

A container was formed from a preformed hydraulically settable sheet as described in Example 15, however a laminate was applied to increase the strength and impermeability of the container.

EXAMPLE 17

A container was formed by molding a cementitious mixture. Two sheets formed from hydraulically settable materials were added between two half container molds and formed into a container by applying internal air pressure, almost blow molding the mixture, while the two layers were pulled in from the sides. The two layers were cut by the mold during pressure and seamed together by applying mold pressure. Any fresh or rewetted paper sheet can be used.

EXAMPLE 18

A container was formed by continuous isostatic pressing of a hydraulically settable mixture. The mixture comprised fifty percent cement and fifty volume percent silica sand. Additionally, 5 mm long glass fibers were added to constitute two percent of the total mix volume. The tube formed by this process was later cured in controlled humidity.

EXAMPLE 19

A container was formed by continuous isostatic pressing a hydraulically settable mixture as described in Example 18, with the additional reinforcement of continuous filament winding.

V. Summary.

From the foregoing, it will be appreciated that the present invention provides novel containers for storing, dispensing, and any other purposes for which conventional containers are utilized. More particularly, the present invention relates to containers and methods for producing containers which are readily and economically formed from hydraulically settable binders such as hydraulic cement and gypsum.

The present invention provides novel containers and methods for producing containers which can be produced at relatively low cost.

The present invention also provides novel containers and methods for manufacturing containers which do not result in severe ecosystem disturbance, deforestation, generation of the wastes involved in the manufacture of paper products, the complications related to recycling paper products and landfill problems associated with paper products.

In addition, the present invention provides novel containers and methods for manufacturing containers having a chemical composition compatible with the earth into which they eventually might be discarded.

The present invention further provides novel containers and methods for manufacturing containers having a hydraulically settable matrix with predetermined desirable properties and qualities. Properties and qualities considered desirable include the ability to preserve and protect substances such that loss or alterations to the substances is minimized yet achieved in a manner which is inexpensive and safe. Some of these specific properties and qualities include the ability to withstand a pressure differential between the exterior and the interior of the containers, the ability to withstand high longitudinal and transverse internal pressure stress, high tensile strength, minimal gas and liquid permeability, minimal ingress of oxygen resulting in oxidation of contained substances, and minimal loss of carbonation, minimal impartment of foreign flavors to contained substances, minimal corrosion due to pH level of substances. It is also desirable for the containers to be light-weight, thin-walled, inexpensive, and safe in terms of the manufacture, distribution and utilization of the containers.

Additionally, the present invention provides novel containers and methods for manufacturing such containers from economical hydraulically settable materials such as hydraulic cement and gypsum without undesirable properties such as low tensile strength and leaching of chemicals.

Further, the present invention provides novel containers and methods for manufacturing such containers which can be commercially formed from hydraulically settable materials and which will rapidly obtain form stability and maintain their shape without external support so that they can be handled quickly after formation.

The present invention further provides novel containers and methods for manufacturing containers that have sufficient form stability to be handled without deformation directly after forming for subsequent curing.

Further, the present invention provides novel containers and methods for manufacturing containers that do not adhere to the forming apparatus and can be removed from the forming apparatus directly after forming without degradation to the containers.

The present invention further provides novel containers and methods of manufacturing containers where finishing work on the surface of the containers is not required.

The present invention also provides novel containers and methods of manufacturing containers using procedures and equipment already used to make containers.

The present invention may be embodied in other specific forms without departing from its spirit or essential characteristics. The described embodiments are to be considered in all respects as illustrative only and not restrictive. The scope of the invention is, therefore, indicated by the appended claims rather than by the foregoing description. All changes which come within the meaning and range of equivalency of the claims are to be embraced within their scope.

What is claimed and desired to be secured by United States Patent is:

1. An article of manufacture comprising:
    a sealable container having a liquid-tight barrier, at least a substantial portion of said sealable container being formed from a substantially hardened hydraulically settable sheet having a thickness of up to about 1 cm and being characterized in that it may be bent, folded or rolled to significantly mechanically deform said sheet without substantial rupture of said sheet, said hydraulically settable sheet including a coating on at least a portion thereof and being formed from a hydraulically settable mixture comprising a hydraulically settable binder, a rheology-modifying agent, fibers and water.

2. An article of manufacture as defined in claim 1, wherein the coating on at least a portion of the hydraulically settable sheet prevents leaching of any material into or out of the matrix.

3. An article of manufacture as defined in claim 1, wherein the coating on at least a portion of the hydraulically settable sheet renders such portion impermeable to gases and liquids.

4. An article of manufacture as defined in claim 1, wherein the coating on at least a portion of the hydraulically settable sheet strengthens such portion.

5. An article of manufacture as defined in claim 1, wherein the coating comprises a material selected from the group consisting of sodium silicate, orthosilicates, siloxanes, colloidal silica in organic polymer dispersions, colloidal silica in films, colloidal silica in fibers, biodegradable plastics, calcium carbonate, acrylics, polyacrylates, polyurethanes, melamines, polyethylene, synthetic polymers, hydroxypropylmethylcellulose, polyethyleneglycol, kaolin clay, prolamine, polyvinyl chloride, polyvinyl alcohol, polyvinyl acetate, ceramics, waxes, and mixtures or derivatives thereof.

6. An article of manufacture as defined in claim 1, wherein the coating comprises a liner on at least a portion of the hydraulically settable sheet.

7. An article of manufacture as defined in claim 1, wherein said hydraulically settable sheet has a thickness of up to about 5 mm.

8. An article of manufacture as defined in claim 1, wherein said hydraulically settable sheet has a thickness of up to about 3 mm.

9. An article of manufacture as defined in claim 1, wherein said hydraulically settable sheet has a thickness of up to about 1 mm.

10. An article of manufacture as defined in claim 1, wherein the liquid-tight barrier is also pressure-tight, wherein the sealable container has an interior and an exterior, wherein the hydraulically settable sheet can withstand a differential in pressure between the exterior and the interior of the sealable container of up to about 10 MPa.

11. An article of manufacture as defined in claim 10, wherein the hydraulically settable sheet can withstand a differential in pressure between the exterior and the interior of the sealable container up to about 1 MPa.

12. An article of manufacture as defined in claim 1, wherein the hydraulically settable binder has concentration in a range from about 5% to about 90% by weight of the hydraulically settable mixture.

13. An article of manufacture as defined in claim 1, wherein the hydraulically settable binder has concentration in a range from about 8% to about 60% by weight of the hydraulically settable mixture.

14. An article of manufacture as defined in claim 1, wherein the hydraulically settable binder has concentration in a range from about 10% to about 45% by weight of the hydraulically settable mixture.

15. An article of manufacture as defined in claim 1, wherein the hydraulically settable binder comprises a hydraulic cement.

16. An article of manufacture as defined in claim 15, wherein the hydraulic cement is a portland cement.

17. An article of manufacture as defined in claim 1, wherein the hydraulically settable binder comprises gypsum.

18. An article of manufacture as defined in claim 1, wherein the fibers are selected from the group consisting of abaca, wood, cellulose, and hemp fibers, and mixtures of the foregoing.

19. An article of manufacture as defined in claim 1, wherein the fibers are selected from the group consisting of metal, glass, carbon, ceramic, and silica fibers, and mixtures of the foregoing.

20. An article of manufacture as defined in claim 1, wherein the fibers include plastic or polymeric fibers.

21. An article of manufacture as defined in claim 1, wherein the fibers have an average aspect ratio greater than about 10:1.

22. An article of manufacture as defined in claim 1, wherein the fibers have an average aspect ratio greater than about 900:1.

23. An article of manufacture as defined in claim 1, wherein the fibers have an average aspect ratio greater than about 3000:1.

24. An article of manufacture as defined in claim 1, wherein the fibers have a concentration in a range from about 0.2% to about 50% by volume of the hydraulically settable mixture.

25. An article of manufacture as defined in claim 1, wherein the fibers have a concentration in a range from about 0.5% to about 30% by volume of the hydraulically settable mixture.

26. An article of manufacture as defined in claim 1, wherein the fibers have concentration in a range from about 1% to about 15% by volume of the hydraulically settable mixture.

27. An article of manufacture as defined in claim 1, wherein the fibers include continuous fibers.

28. An article of manufacture as defined in claim 27, wherein the continuous fibers are selected from the group consisting of aramid fibers, glass fibers, carbon fibers, cellulose fibers, and mixtures of the foregoing.

29. An article of manufacture as defined in claim 1, wherein the rheology-modifying agent comprises a cellulosic material.

30. An article of manufacture as defined in claim 29, wherein the cellulosic material is selected from the group consisting of methylhydroxyethylcellulose, hydroxymethylethylcellulose, methylcellulose, hydroxyethylcellulose, carboxymethylcellulose, ethylcellulose, hydroxyethyl-propylcellulose, and mixtures or derivatives thereof.

31. An article of manufacture as defined in claim 1, wherein the rheology-modifying agent comprises wood flour.

32. An article of manufacture as defined in claim 1, wherein the rheology-modifying agent comprises a starch or a derivative thereof.

33. An article of manufacture as defined in claim 32, wherein the starch or derivative thereof is selected from the group consisting of amylopectin, amylose, sea-gel, starch acetates, starch hydroxyethyl ethers, ionic starches, long-chain alkyl starches, dextrins, amine starches, phosphate starches, dialdehyde starches, and mixtures or derivatives thereof.

34. An article of manufacture as defined in claim 1, wherein the rheology-modifying agent comprises a polysaccharide material selected from the group consisting of alginic acid, phycocolloids, agar, gum arabic, guar gum, locust bean gum, gum karaya, gum tragacanth, and mixtures or derivatives thereof.

35. An article of manufacture as defined in claim 1, wherein the rheology-modifying agent comprises a protein or a derivative thereof.

36. An article of manufacture as defined in claim 35, wherein the protein or derivative thereof is selected from the group consisting of prolamine, gelatin, glue, casein, and mixtures or derivatives thereof.

37. An article of manufacture as defined in claim 1, wherein the rheology-modifying agent comprises a synthetic material selected from the group consisting of polyvinyl alcohol, polyvinyl pyrrolidone, polyvinylmethyl ether, polyacrylic acids, polyacrylic acid salts, polyvinyl-acrylic acids, polyvinylacrylic acid salts, polyacrylimides, ethylene oxide polymers, synthetic clay, latex, and mixtures or derivatives thereof.

38. An article of manufacture as defined in claim 1, wherein the rheology-modifying agent has a concentration less than about 50% by weight of the hydraulically settable mixture.

39. An article of manufacture as defined in claim 1, wherein the hydraulically settable mixture further comprises an aggregate material.

40. An article of manufacture as defined in claim 39, wherein the aggregate material is selected from the group consisting of mica, clay, kaolin, glass beads, calcium carbonate, ceramic, alumina, clay, sand, calcite, bauxite, dolomite, granite, quartz, gravel, rock, limestone, reacted cement particles, sandstone, gypsum, silica, ground quartz, and mixtures of the foregoing.

41. An article of manufacture as defined in claim 39, wherein the aggregate material is selected from the group consisting of perlite, vermiculite, diatomaceous earth, exfoliated rock, hollow glass spheres, sodium silicate macrospheres, exfoliated rock, lightweight concrete, porous ceramic spheres, tabular alumina, aerogel, lightweight expanded clay, expanded fly ash, expanded slag, pumice, and mixtures thereof.

42. An article of manufacture as defined in claim 39, wherein the aggregate material is selected from the group consisting of cork, polymers, plastic particles, seeds, starches, gelatins, and agar materials.

43. An article of manufacture as defined in claim 39, wherein the aggregate material has a concentration in a range from about 0.01% to about 80% by weight of the hydraulically settable mixture.

44. An article of manufacture as defined in claim 39, wherein the aggregate material has a concentration in a range from about 3% to about 60% by weight of the hydraulically settable mixture.

45. An article of manufacture as defined in claim 39, wherein the aggregate material has a concentration in a range from about 20% to about 50% by weight of the hydraulically settable mixture.

46. An article of manufacture as defined in claim 1, wherein the sealable container comprises structural components including a hollow body portion having side walls connected to a bottom portion and an open end and closure means for engaging the open end of the hollow body portion to seal substances within the sealable container.

47. An article of manufacture as defined in claim 1, wherein the sealable container comprises structural components including a hollow body portion having side walls connected to a bottom portion and an open end and closure means for engaging the open end of the hollow body portion for sealing substances within the sealable container and for dispensing substances.

48. An article of manufacture as defined in claim 1, wherein the sealable container has structural components comprising a hollow body portion having side walls connected to a bottom portion and an open end and closure means for engaging the open end of the hollow body portion for sealing substances within the sealable container, for dispensing substances, and for resealing substances within the sealable container.

49. An article of manufacture as defined in claim 48, wherein the closure means is a lid.

50. An article of manufacture as defined in claim 48, wherein the closure means is a foil covering.

51. An article of manufacture as defined in claim 1, wherein the sealable container has a substantially circular cross-section.

52. An article of manufacture as defined in claim 1, wherein the sealable container has a substantially rectangular cross-section.

53. An article of manufacture as defined in claim 1, wherein the sealable container further includes a liner.

54. An article of manufacture as defined in claim 1, wherein the hydraulically settable sheet further includes a second sheet laminated thereto.

55. An article of manufacture comprising a sealable container having a liquid-tight barrier, at least a substantial portion of the sealable container being fashioned from a laminated sheet by bending, folding or rolling the laminated sheet, the laminated sheet including a substantially hardened hydraulically settable sheet having a thickness less than about 3 mm and a second sheet laminated thereto, the laminated sheet being characterized in that it may be bent, folded or rolled to significantly mechanically deform the sheet without substantial rupture of the laminated sheet, the hydraulically settable sheet being formed from a hydraulically settable mixture comprising a hydraulically settable binder, a rheology-modifying agent, a fibrous material, an aggregate material, and water.

56. An article of manufacture as defined in claim 55, wherein the hydraulically settable sheet has a thickness of less than about 1 mm.

57. An article of manufacture as defined in claim 55, wherein the second sheet comprises a coating material.

58. An article of manufacture comprising a sealable container having a liquid-tight barrier, at least a substantial portion of said sealable container being formed from a hydraulically settable mixture comprising a hydraulically settable binder selected from the group consisting of portland cement, slag cement, calcium aluminate cement, silicate cement, phosphate cement, white cement, high alumina cement and magnesium oxychloride cement, water, and a rheology-modifying agent, the hydraulically settable mixture being characterized in that the portion of the sealable container formed from the hydraulically settable mixture achieves form stability while in a green state in about ten minutes or less after the hydraulically settable mixture is first formed into a desired configuration, the hydraulically settable mixture in the desired configuration hardening into a hydraulically settable matrix having a thickness of up to about 1 cm and a density less than about 1.6 g/cm$^3$, the hydraulically settable matrix including a coating on at least a portion thereof.

59. An article of manufacture as defined in claim 58, wherein the hydraulically settable mixture further comprises a fibrous material in a concentration in a range from about 0.5% to about 30% by volume of the hydraulically settable mixture.

60. An article of manufacture as defined in claim 58, wherein the hydraulically settable mixture further includes means for creating a discontinuous phase of finely dispersed, nonagglomerated voids within the hydraulically settable matrix.

61. An article of manufacture as defined in claim 58, wherein the hydraulically settable matrix includes a discontinuous phase comprising finely dispersed, nonagglomerated voids.

62. An article of manufacture as defined in claim 58, wherein the hydraulically settable matrix has a thickness less than about 3 mm.

63. An article of manufacture as defined in claim 58, wherein the hydraulically settable mixture further includes an aggregate material.

64. An article of manufacture as defined in claim 58, wherein the hydraulically settable matrix is substantially rigid.

65. An article of manufacture as defined in claim 58, wherein the hydraulically settable matrix is substantially flexible.

66. An article of manufacture as defined in claim 58, wherein the coating on at least a portion of the hydraulically settable matrix includes a polymeric sheet laminated thereto.

67. An article of manufacture as defined in claim 58, further including a laminate material on at least a portion of the hydraulically settable matrix.

* * * * *

UNITED STATES PATENT AND TRADEMARK OFFICE
CERTIFICATE OF CORRECTION

PATENT NO. : 5,714,217  Page 1 of 4
DATED : February 3, 1998
INVENTOR(S) : Per Just Andersen; Simon K. Hodson It is certified that error appears in the above-identified patent and that said Letters Patent is hereby corrected as shown below:

On the Cover Page: Item [56] page 2, delete "4,367,860".

Cover Page, Inventors, change "Just Andersen" to --Per Just Andersen--

Cover Page, Assignee, after "E. Khashoggi Industries" insert --, LLC--

References Cited, please add the following U.S. Patent Documents, Foreign Patent Documents and Other Publications:

| | | |
|---|---|---|
| 3,979,217 | 9/1976 | Sutton |
| 3,998,651 | 12/1976 | Baudouin et al. |
| 4,085,001 | 4/1978 | Fukuwatari et al. |
| 4,115,135 | 9/1978 | Goeman |
| 4,244,781 | 1/1981 | Heckman |
| 4,313,997 | 2/1982 | Ruff et al. |
| 4,562,218 | 12/1985 | Fornadel et al. |
| 4,623,150 | 11/1986 | Moehlman et al. |
| 4,637,860 | 1/1987 | Harper et al. |
| 5,076,986 | 12/1991 | Delvaux et al. |
| 5,316,624 | 5/1994 | Racine |
| 5,338,349 | 8/1994 | Farrar |
| 5,366,549 | 11/1994 | Imaizumi et al. |
| WO 93/20990 | 10/1993 | WIPO |
| 63-551 | 1/1988 | Japan |
| 63-552 | 1/1988 | Japan |

M.F. Ashby, *Overview No. 80, On the Engineering Properties of Materials,* Acta metall. Vol. 37, No.5. pp. 1273-1293, (1989).

UNITED STATES PATENT AND TRADEMARK OFFICE
CERTIFICATE OF CORRECTION

PATENT NO. : 5,714,217
DATED : February 3, 1998
INVENTOR(S) : Per Just Andersen; Simon K. Hodson It is certified that error appears in the above-identified patent and that said Letters Patent is hereby corrected as shown below:

Clauson-Kaas, Strabo, Chatterji, *Ekstrudering af Fiberbeton-delrapport,* English Translation - *Extrusion of Fiber Concrete - Interim Report,* Department of Building Technology, The Technological Institute of Denmark, (Sept. 1, 1987).

Yudenfreund, Skalny, Mikahil, and Brunauer, *Hardened Portland Cement Pastes of Low Porosity, II. Exploratory Studies. Dimensional Changes,* Cement and Concrete Research, Vol. 2, pp. 331-348, (1972).

James E. Kline, *Paper and Paperboard Properties,* Paper and Paperboard Manufacturing and Converting Fundamentals, pp. 19-28 (2d. ed. 1982).

J. Francis Young, *Macro-Defect-Free Cement: A Review,* Mat. Res. Soc. Symp. Proc. Vol. 179, Materials Research Society, (1991).

S.P. Shah, *Recent Trends in the Science and Technology of Concrete,* NSF Center for Advanced Cement-Based Materials, Northwestern University, Evanston, Illinois, USA, pp. 1-18.

Page 3, Right Column, Other Publications, line 7, after "Just" change "Anderson" to --Andersen--

Page 4, Left Column, line 60, after "*Ekstrudering*" change "*afFiberbeton*" to "*af Fiberbeton*"

Page 5, Left Column, line 59, after "and" change "concretes" to --Concretes--

UNITED STATES PATENT AND TRADEMARK OFFICE
CERTIFICATE OF CORRECTION

PATENT NO. : 5,714,217
DATED : February 3, 1998
INVENTOR(S) : Per Just Andersen; Simon K. Hodson It is certified that error appears in the above-identified patent and that said Letters Patent is hereby corrected as shown below:

Page 5, Right Column, line 24, after the "Strabo" publication ending in "85.538 (Oct. 1987). insert the following:
   *English Translation* - Strabo, et al., *Extrusion of Fiber Concrete,* Danish Technological Institute, Department of Building Technology, TR-Project 1985-133/177-85.538 (October 1987).

Col. 6, line 10, before "such" change "object" to --objects--

Col. 9, line 35, after "thin-" change "wailed" to --walled--

Col. 11, line 1, before "higher" change "cremes" to --creates--

Col. 12, line 30, after "surface" delete the comma and insert a semicolon

Col. 22, line 59, after "portion" change "6" to --12--

Col. 26, line 19, after "walls" change "6" to --16--

Col. 37, line 54, change "$Al_2O_3.3SiO_2.2H_2O$" to --$Al_2O_3 \cdot 3SiO_2 \cdot 2H_2O$--

Col. 37, line 56, change "$Al_2O_3.4SiO_2.H_2O$" to --$Al_2O_3 \cdot 4SiO_2 \cdot H_2O$--

Col. 39, line 17, after "of" change "Anderson" to --Andersen--

Col. 46, lines 12-13, after "from" make "Händle" one word

Col. 56, line 11, before "side" change "fight" to --right--

Col. 63, line 30, after "about" change "20°C." to "-20°C.--

UNITED STATES PATENT AND TRADEMARK OFFICE
CERTIFICATE OF CORRECTION

PATENT NO. : 5,714,217

DATED : February 3, 1998

INVENTOR(S) : Per Just Andersen; Simon K. Hodson

It is certified that error appears in the above-identified patent and that said Letters Patent is hereby corrected as shown below:

Col. 68, line 58, after "provided" delete "a" and insert --by--

Col. 74, line 45, after "Example 5," change "weight" to --weigh--

Col. 76, line 61, change "tylose" to --Tylose--

Col. 77, line 28, change "tylose" to --Tylose--

Signed and Sealed this

Eleventh Day of May, 1999

Attest:

Q. TODD DICKINSON

*Attesting Officer*      *Acting Commissioner of Patents and Trademarks*